US009571974B2

(12) United States Patent
Choi et al.

(10) Patent No.: US 9,571,974 B2
(45) Date of Patent: Feb. 14, 2017

(54) DEVICE SEARCHING METHOD AND ELECTRONIC DEVICE SUPPORTING THE SAME

(71) Applicant: Samsung Electronics Co., Ltd., Suwon-si, Gyeonggi-do (KR)

(72) Inventors: Jong Mu Choi, Seongnam-si (KR); Jae Hwan Kim, Suwon-si (KR); Jin Woo Lee, Seoul (KR); Bu Seop Jung, Suwon-si (KR); Bo Kun Choi, Seoul (KR); Yo Han Lee, Seongnam-si (KR); Yong Joon Jeon, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/887,853

(22) Filed: Oct. 20, 2015

(65) Prior Publication Data
US 2016/0112839 A1   Apr. 21, 2016

(30) Foreign Application Priority Data

Oct. 20, 2014   (KR) .................. 10-2014-0141497

(51) Int. Cl.
*H04B 7/00*   (2006.01)
*H04W 4/02*   (2009.01)
*H04W 8/00*   (2009.01)
*H04W 4/00*   (2009.01)

(52) U.S. Cl.
CPC ............. *H04W 4/023* (2013.01); *H04W 4/008* (2013.01); *H04W 8/005* (2013.01)

(58) Field of Classification Search
USPC ........................................ 455/41.2
See application file for complete search history.

(56) References Cited

U.S. PATENT DOCUMENTS

| | | | |
|---|---|---|---|
| 8,886,195 B2 | 11/2014 | Srinivasan et al. | |
| 8,954,121 B2 | 2/2015 | Kanj et al. | |
| 9,066,370 B2 | 6/2015 | Srinivasan et al. | |
| 9,125,083 B2 | 9/2015 | Townend et al. | |
| 2013/0217450 A1 | 8/2013 | Kanji et al. | |
| 2013/0229270 A1 | 9/2013 | Srinivasan et al. | |
| 2013/0229976 A1 | 9/2013 | Srinivasan et al. | |
| 2013/0237272 A1 | 9/2013 | Prasad | |
| 2013/0308451 A1 | 11/2013 | Townend et al. | |
| 2015/0289188 A1 | 10/2015 | Srinivasan et al. | |
| 2016/0020861 A1* | 1/2016 | Jin .................. | H04B 17/11 455/456.1 |
| 2016/0066013 A1* | 3/2016 | Li .................. | H04N 21/2541 725/75 |
| 2016/0086228 A1* | 3/2016 | Babb .................. | G06Q 30/0267 705/14.64 |
| 2016/0099758 A1* | 4/2016 | Bell .................. | H04B 5/0037 307/104 |

* cited by examiner

*Primary Examiner* — Creighton Smith
(74) *Attorney, Agent, or Firm* — Jefferson IP Law, LLP

(57) ABSTRACT

An electronic device is provided. The electronic device includes a first communication module configured to support a first communication method, a second communication module configured to support a second communication method, a memory configured to store data used for operations of the first communication module and the second communication module, and a processor electrically connected to the first communication module, the second communication module, and the memory.

20 Claims, 57 Drawing Sheets

DEVICE SEARCHING METHOD AND ELECTRONIC DEVICE SUPPORTING THE SAME

CROSS-REFERENCE TO RELATED APPLICATION(S)

This application claims the benefit under 35 U.S.C. §119 (a) of a Korean patent application filed on Oct. 20, 2014 in the Korean Intellectual Property Office and assigned Serial number 10-2014-0141497, the entire disclosure of which is hereby incorporated by reference.

TECHNICAL FIELD

The present disclosure relates to a device search and connection.

BACKGROUND

An electronic device such as an existing smartphone provides a communication function based on at least one communication module. For example, an electronic device of the related art includes a wireless communication module and based on this, supports a wireless communication function.

Since the electronic device of the related art establishes a communication channel based on a wireless communication module, it is difficult to check where the other party electronic device is located exactly.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a device searching method for checking the location of the other party electronic device and an electronic device supporting the same.

Another aspect of the present disclosure is to provide a device searching method for supporting various services based on checking the location of the other party electronic device and an electronic device supporting the same.

In accordance with an aspect of the present disclosure, an electronic device is provided. The electronic device includes a first communication module configured to support a first communication method, a second communication module configured to support a second communication method, a memory configured to store data used for operations of the first communication module and the second communication module, and a processor electrically connected to the first communication module, the second communication module, and the memory.

In accordance with another aspect of the present disclosure, a device searching method is provided. The device searching method includes recognizing an approach of an external electronic device based on a first communication method, recognizing a location by at least one of transmitting a specified signal to and receiving the specified signal from the approach-recognized external electronic device based on a second communication method, and correcting location or direction information recognized based on state information itself.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
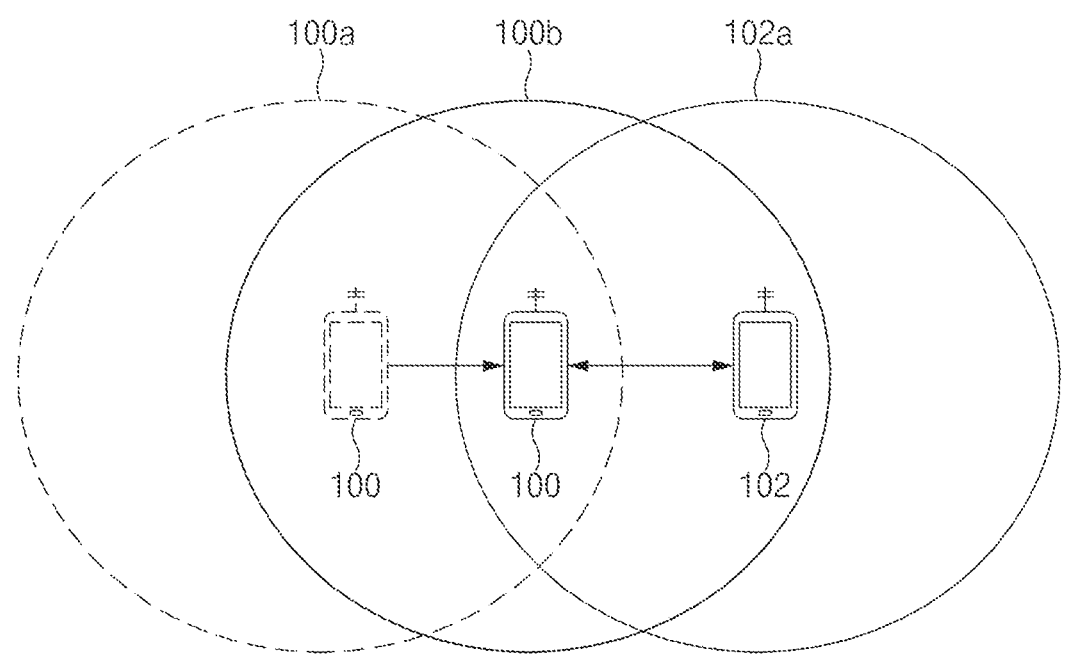
FIG. 1 is a view illustrating a device searching environment according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," and "have", or "may include," or "may comprise" and "may have" used herein indicates disclosed functions, operations, or existence of elements but does not exclude other functions, operations or elements.

For instance, the expression "A or B", or "at least one of A or/and B" may indicate include A, B, or both A and B. For instance, the expression "A or B", or "at least one of A or/and B" may indicate (1) at least one A, (2) at least one B, or (3) both at least one A and at least one B.

The terms such as "1st", "2nd", "first", "second", and the like used herein may refer to modifying various different elements of various embodiments of the present disclosure, but do not limit the elements. The expressions may be used to distinguish one element from another element. For instance, "a first user device" and "a second user device" may indicate different users regardless of the order or the importance. For example, a first component may be referred to as a second component and vice versa without departing from the scope of the present disclosure.

In various embodiments of the present disclosure, it will be understood that when a component (for example, a first component) is referred to as being "(operatively or communicatively) coupled with/to" or "connected to" another component (for example, a second component), the component may be directly connected to the other component or connected through another component (for example, a third component). In various embodiments of the present disclosure, it will be understood that when a component (for example, a first component) is referred to as being "directly connected to" or "directly access" another component (for example, a second component), another component (for example, a third component) does not exist between the component (for example, the first component) and the other component (for example, the second component).

The expression "configured to" used in various embodiments of the present disclosure may be interchangeably used with "suitable for", "having the capacity to", "designed to", "adapted to", "made to", or "capable of" according to a situation, for example. The term "configured to" may not necessarily mean "specifically designed to" in terms of hardware. Instead, the expression "a device configured to" in some situations may mean that the device and another device or part are "capable of". For example, "a processor configured to perform A, B, and C" in a phrase may mean a dedicated processor (for example, an embedded processor) for performing a corresponding operation or a generic-purpose processor (for example, a central processing unit (CPU) or application processor (AP)) for performing corresponding operations by executing at least one software program stored in a memory device.

All the terms used herein, which include technical or scientific terms, may have the same meaning that is generally understood by a person skilled in the art. In general, the terms defined in the dictionary should be considered to have the same meaning as the contextual meaning of the related art, and, unless clearly defined herein, should not be understood abnormally or as having an excessively formal meaning. In any cases, even the terms defined in this specification cannot be interpreted as excluding embodiments of the present disclosure.

According to various embodiments of the present disclosure, electronic devices may include at least one of smartphones, tablet personal computers (PCs), mobile phones, video phones, electronic book (e-book) readers, desktop PCs, laptop PCs, netbook computers, workstation server, personal digital assistants (PDAs), portable multimedia player (PMPs), Moving Picture Experts Group phase 1 or phase 2 (MPEG-1 or MPEG-2) audio layer 3 (MP3) players, mobile medical devices, cameras, and wearable devices (for example, smart glasses, head-mounted-devices (HMDs), electronic apparel, electronic bracelets, electronic necklaces, electronic appcessories, electronic tattoos, smart mirrors, and smart watches).

According to some embodiments of the present disclosure, an electronic device may be smart home appliances. The smart home appliances may include at least one of, for example, televisions (TV), digital video disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™ or Google TV™), game consoles (for example, Xbox™ and PlayStation™), electronic dictionaries, electronic keys, camcorders, and electronic picture frames.

According to some embodiments of the present disclosure, an electronic device may include at least one of various medical devices supporting call forwarding service (for example, various portable measurement devices (for example, glucometers, heart rate meters, blood pressure meters, temperature meters, etc.), magnetic resonance angiography (MRA) devices, magnetic resonance imaging (MRI) devices, computed tomography (CT) devices, medical imaging devices, ultrasonic devices, etc.), navigation devices, global positioning system (GPS) receivers, event data recorders (EDRs), flight data recorders (FDRs), vehicle infotainment devices, marine electronic equipment (for example, marine navigation systems, gyro compasses, etc.), avionics, security equipment, vehicle head units, industrial or household robots, financial institutions' automatic teller's machines (ATMs), or stores' point of sales (POS) or internet of things (for example, bulbs, various sensors, electric or gas meters, sprinkler systems, fire alarms, thermostats, street lights, toasters, exercise equipment, hot water tanks, heaters, boilers, etc.).

In various embodiments of the present disclosure, an electronic device may include at least one of part of furniture or buildings/structures supporting call forwarding service, electronic boards, electronic signature receiving devices, projectors, and various measuring instruments (for example, water, electricity, gas, or radio signal measuring instruments). An electronic device according to various embodiments of the present disclosure may be one of the above-mentioned various devices or a combination thereof. Additionally, an electronic device according to an embodiment of the present disclosure may be a flexible electronic device. Additionally, an electronic device according to an embodiment of the present disclosure is not limited to the above-mentioned devices and may include a new kind of an electronic device according to the technology development.

Hereinafter, an electronic device according to various embodiments of the present disclosure will be described in more detail with reference to the accompanying drawings. The term "user" in this disclosure may refer to a person using an electronic device or a device using an electronic device (for example, an artificial intelligent electronic device).

FIG. 1 is a view illustrating a device searching environment according to various embodiments of the present disclosure.

Referring to FIG. 1, a device searching environment according to various embodiments of the present disclosure may include an electronic device 100 and an external electronic device 102.

At least one of the electronic device 100 and the external electronic device 102 may be movable. Accordingly, a distance range that the electronic device 100 or the external electronic device 102 is communicable using a specified communication module may vary. According to an embodiment of the present disclosure, when the electronic device 100 is in a first communicable range 100*a* and the external electronic device 102 is in a second communicable range 102*a*, there may be a situation that the electronic device 100 and the external electronic device 102 may not be communicable each other because a distance therebetween is out of a distance range.

According to various embodiments of the present disclosure, when the electronic device 100 moves to have the second communicable range 100*b*, the external electronic device 102 located in the second communicable range 100*b* may perform communication with the electronic device 100. At least one of the electronic device 100 and the external electronic device 102 may perform a mutual location calculation through a specified method. For example, the electronic device 100 or the external electronic device 102 may perform a location calculation by performing a specified signal transmission/reception several times and may detect the other side party location based on an average value of a calculation result.

According to various embodiments of the present disclosure, the electronic device 100 may collect information on a distance to the external electronic device 102 and a direction of the external electronic device 102 by using a plurality of communication modules. Alternatively, the electronic device 100 may collect detail information on a distance or a direction of the external electronic device 102 by using a connected another electronic device (for example, a companion electronic device). The electronic device 100, for example, may support checking whether the electronic device 100 approaches within a specified distance of the external electronic device 102 by using a specified communication module, recognizing a distance or a direction with the external electronic device 102 after approach recognition, and determining an accurate distance or direction with the external electronic device 102. While supporting the above-mentioned operations, the electronic device 100 may sequentially use communication modules having different communication ranges. Alternatively, the electronic device 100 may sequentially use communication modules driven with relatively low power to minimize the power consumption of the communication modules used for measuring approach recognition, distance or direction recognition, and distance or direction measurement.

Figure 2:
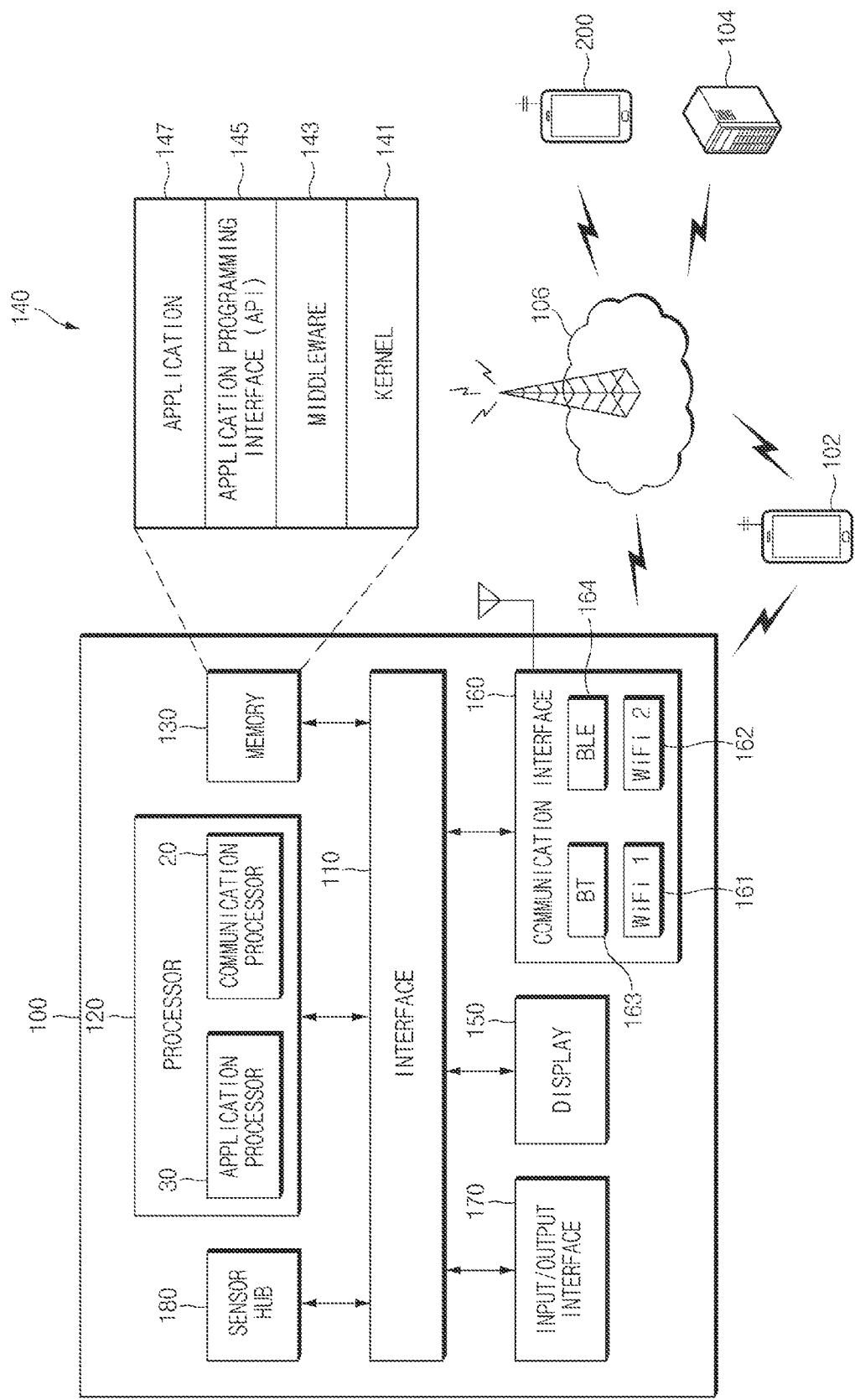
FIG. 2 is a view illustrating an electronic device operating environment according to various embodiments of the present disclosure.

FIG. 2 is a view illustrating an electronic device operating environment according to various embodiments of the present disclosure.

Referring to FIG. 2, the electronic device operating environment 140 may include an electronic device 100, an external electronic device 102, a network 106, an external electronic device 200, and a server device 104.

In the electronic device operating environment, the electronic device 100 may perform communication with the external electronic device 102 based on the communication interface 160. According to an embodiment of the present disclosure, the electronic device 100 may include a communication module 161 supporting a first frequency band (for example, a WiFi communication module WiFi 1 operating based on a 2.4 GHz band) and a communication module 162 WiFi 2 supporting a second frequency band (for example, a WiFi Direct communication module operating based on a 5 GHz band). Additionally, the electronic device 100 may include a communication module 163 (for example, a Bluetooth communication module) and a communication module 164 (for example, a low energy Bluetooth communication module) and may activate at least one communication module according to a setting to perform a distance or direction recognition or a direction measurement of the external electronic device 102.

The network 106 may include telecommunications network, for example, at least one of internet, telephone network, and mobile communication network. The network 106 may support a communication channel establishment relating to communication service operation of the electronic device 100. The electronic device 100 may establish a voice call channel or a video call channel with the external electronic device 200 through the network 106. According to an embodiment of the present disclosure, the network 106 may support a communication service of the electronic device 100 with the external electronic device 200 as being connected to the external electronic device 200.

The external electronic device 102, for example, may establish a communication channel with the electronic device 100 based on a wireless communication module. According to an embodiment of the present disclosure, the external electronic device 102, for example, may perform signal transmission/reception with the electronic device 100 based on at least one of a Bluetooth communication module, a low energy Bluetooth communication module, a first WiFi Direct communication module, and a second WiFi Direct communication module. According to an embodiment of the present disclosure, the external electronic device 102 may transmit (or broadcast) specified signals to be received by the electronic device 100.

The external electronic device 200 may be the same or different type of the external electronic device 102 or the electronic device 100. The external electronic device 200 may transmit a call (for example, a voice call or a video call) connection request message to the electronic device 100 via the network 106 or may establish a communication channel to request message transmission.

The server device 104 may include a group of one or more servers. According to various embodiments of the present disclosure, all or part of operations executed on the electronic device 100 may be executed on another one or more electronic devices (for example, the electronic device 102 or 200 or the server device 104). The server device 104 may establish a communication channel with the electronic device 100 or the external electronic device 200 in relation to communication service support.

According to an embodiment of the present disclosure, when the electronic device 100 performs a certain function or service automatically or by a request, it may request at least part of a function relating thereto from another device (for example, the external electronic device 200 or 102 or the server device 104) instead of or in addition to executing the function or service by itself. The other electronic devices (for example, the external electronic device 200 or 102 or the server device 104) may execute the requested function or an additional function and may deliver an execution result to the electronic device 100. The electronic device 100 may provide the requested function or service by processing the received result as it is or additionally. For this, for example, cloud computing, distributed computing, or client-server computing technology may be used.

The electronic device 100 may include an interface 110, a processor 120, a memory 130, an input/output interface 170, a display 150, or a communication interface 160. Additionally or alternatively, the electronic device 100 may include a sensor hub 180. According to an embodiment of the present disclosure, the electronic device 100 may omit at least one of the components or may additionally include a different component.

The interface 110, for example, may include a circuit for connecting the components 120 to 180 to each other and delivering a communication (for example, control message and/or data) between the components 120 to 180. For example, the interface 110 may receive an input signal corresponding to the activation of the communication interface 160 from the input/output interface 170 and may deliver it to the processor 120. The interface 110 may deliver a control signal of the processor 120 relating to the activation of the communication interface 160 to the communication interface 160. According to various embodiments of the present disclosure, the interface 110 may deliver to the communication interface 160 control signals relating to the activations of the first communication module 161 (for example, a first frequency band WiFi Direct communication module), the second communication module 162 (for example, a second frequency band WiFi Direct communication module), the third communication module 163 (for example, a Bluetooth module), and the fourth communication module 164 (for example, a low energy Bluetooth module).

The processor 120 may include at least one of an AP 30, a communication processor (CP) 20, and a CPU. The processor 120, for example, may execute calculation or data processing for control and/or communication of at least one another component of the electronic device 100. According to various embodiments of the present disclosure, the processor 120 may perform data processing or control signal processing relating to at least one application execution.

According to an embodiment of the present disclosure, the AP 30 may support the activation of at least one of the first to fourth communication modules 161, 162, 163, and 164 of the communication interface 160 in correspondence to an input signal occurrence or in correspondence to the scheduling of a job (for example, a task, a processor, and so on) set to be executed on the electronic device 100. The AP 30 may receive a signal that at least one external electronic device 102 transmits by controlling one of the first to fourth communication modules 161 to 164. Alternatively, the AP 30 may transmit a specified signal to the external electronic device 102 by using at least one of the first to fourth communication modules 161 to 164. According to various embodiments of the present disclosure, the AP 30 may perform an approach recognition, a distance recognition or a direction recognition, and a distance measurement or a direction measurement of the external electronic device 102 based on signals at least one of transmitted to and received from the external electronic device 102 through at least one communication module.

The CP 20, for example, may separately operate at least one of communication modules (for example, the first to fourth communication modules 161 to 164) in correspondence to a control of the AP 30 or according to a setting. According to an embodiment of the present disclosure, the CP 20 may check whether a specified signal that the external electronic device 102 broadcasts is received (for example, approach recognition) by using the fourth communication module 164 according to a setting. When a specified signal is received based on the fourth communication module 164, the CP 20 may perform a specified signal transmission/reception with the external electronic device 102 by operating the third communication module 163. The CP 20 may perform a distance or direction recognition or a distance or direction measurement with respect to the external electronic device 102 based on a specified signal transmission/reception.

The sensor hub 180 may be a processor designed to allow relatively low power driving in comparison to the processor 120. The sensor hub 180, for example, may be connected at least one sensor, activate necessary sensors according to the operation of the electronic device 100, and collect sensor information to provide it to the processor 120. According to various embodiments of the present disclosure, the sensor hub 180 may be prepared in a form of being included in the processor 120. The sensor hub 180 may receive a control for the communication interface 160 while (or before) the AP 30 is in a sleep state and may perform an approach recognition of the external electronic device 102, a distance or direction recognition with respect to the external electronic device 102, or a distance or direction measurement with respect to the external electronic device 102.

The memory 130 may include volatile and/or nonvolatile memory. The memory 130, for example, may store instructions or data relating to at least one another component of the electronic device 100. The memory 130 may store software and/or programs. The programs may include a kernel 141, a middleware 143, an application programming interface (API) 145, and/or an application program (or an application) 147. At least part of the kernel 141, the middleware 143, or the API 145 may be called an operating system (OS).

The kernel 141, for example, may control or manage system resources (for example, the interface 110, the processor 120, the memory 130, and so on) used for performing operations or functions implemented in other programs (for example, the middleware 143, the API 145, or the application program 147). Additionally, the kernel 141 may provide an interface for controlling or managing system resources by accessing an individual component of the electronic device 100 from the middleware 143, the API 145, or the application program 147. According to an embodiment of the present disclosure, the kernel 141 may provide an interface for controlling and managing system resources relating to approach recognition processing of the external electronic device 102 based on a fourth communication module and an interface for controlling and managing system resources relating to a distance and direction detection of the external electronic device 102 based on a third communication module.

The middleware 143, for example, may serve as an intermediary role for exchanging data as the API 145 or the application program 147 communicates with the kernel 141. Additionally, in relation to job requests received from the application program 147, the middleware 143, for example, may perform a control (for example, scheduling or load balancing) for the job requests by using a method of assigning a priority for using a system resource (for example, the interface 110, the processor 120, the memory 130, and so on) of the electronic device 100 to at least one application program among the application programs 147. For example, the middleware 143 may perform operation processing of the fourth communication module 164, recognition processing of the external electronic device 102 based on the fourth communication module 164, operation processing of the third communication module 163, and distance and direction calculation processing with respect to the external electronic device 102 based on the third communication module 163.

The API 145, as an interface for allowing the application 147 to control a function provided from the kernel 141 or the middleware 143, may include at least one interface or function (for example, an instruction) for file control, window control, image processing, or character control. According to an embodiment of the present disclosure, the API 145 may include a signal transmission/reception operation control API based on at least one of the communication modules 163 and 164 included in the communication interface 160 and an API relating to a transmitted/received signal analysis and approach recognition or distance and direction detection based on the transmitted/received signal analysis.

The application 147 may include various applications supported by the electronic device 100. For example, the application 147 may include a data communication related web surfing function application, a call function application, a content streaming application, and a voice search function application. According to the execution of the application 147, the electronic device 100 may support a user function. Accordingly, at least one function provided by the application 147 may be limited in correspondence to a control of the AP 30 or the CP 20 or the sensor hub 180.

According to various embodiments of the present disclosure, the application 147 may include at least one communication based application operated based on the communication module 164 or the third communication module 163. For example, the application 147 may include an application relating to a distance or direction detection of the external electronic device 102. According to various embodiments of the present disclosure, the application 147 may include various service applications according to a distance and direction analysis of the external electronic device 102. For example, the application 147 may include an application for providing specified information according to a distance and a direction between the electronic device 100 and the external electronic device 102 and an application relating to a hardware control of the external electronic device 102.

The input/output interface 170, for example, may serve as an interface for delivering instructions or data inputted from a user or another external device to another component(s) of the electronic device 100. Additionally, the input/output interface 170 may output instructions or data received from another component(s) of the electronic device 100 to a user or another external device. According to an embodiment of the present disclosure, the input/output interface 170 may generate an in signal relating to an application execution based on a distance and a direction with respect to the external electronic device 102 or an input signal relating to the deactivation of a corresponding application. The input/output interface 170, for example, may generate an input signal for requesting a specified service execution based on the external electronic device 102 of which distance or direction is measured.

The display 150, for example, may include a liquid crystal display (LCD), a light emitting diode (LED) display, an organic LED (OLED) display, a microelectromechanical systems (MEMS) display, or an electronic paper display. The display 150 may display various content (for example, text, image, video, icon, symbol, and so on) to a user. The display 150 may include a touch screen, and for example, may receive a touch, gesture, proximity, or hovering input by using an electronic pen or a user's body part.

According to various embodiments of the present disclosure, the display 150 may output a screen relating to the activation or operation of the fourth communication module 164, a screen for guiding the approach recognition of the external electronic device 102, a screen relating to the activation or operation of the third communication module 163, and a screen for guiding the distance or direction of the external electronic device 102. According to various embodiments of the present disclosure, the display 150 may output a screen relating to at least one service execution relating to the distance or direction of the external electronic device 102.

The communication interface 160, for example, may set communication between the electronic device 100 and an external device (for example, the external electronic device 200 or 102 or the server device 104). The communication interface 160 may include the communication modules 161 to 164.

The first communication module 161, for example, may be a first frequency band based WiFi Direct communication module or WiFi module. The second communication module 162, for example, may be a second frequency band (higher than the first frequency band) based WiFi Direct communication module or WiFi module. The third communication module 163, for example, may be a Bluetooth communication module. The fourth communication module 164, for example, may be a low energy Bluetooth communication module.

According to various embodiments of the present disclosure, the communication interface 160 may communicate with an external device (for example, the external electronic device 200 or the server device 106) in connection to the network 106 through wireless communication or wired communication. The wireless communication may use long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM) as a cellular communication protocol, for example. The wired communication, for example, may include at least one of universal serial bus (USB), high definition multimedia interface (HDMI), recommended standard 232 (RS-232), and plain old telephone service (POTS).

Figure 3:
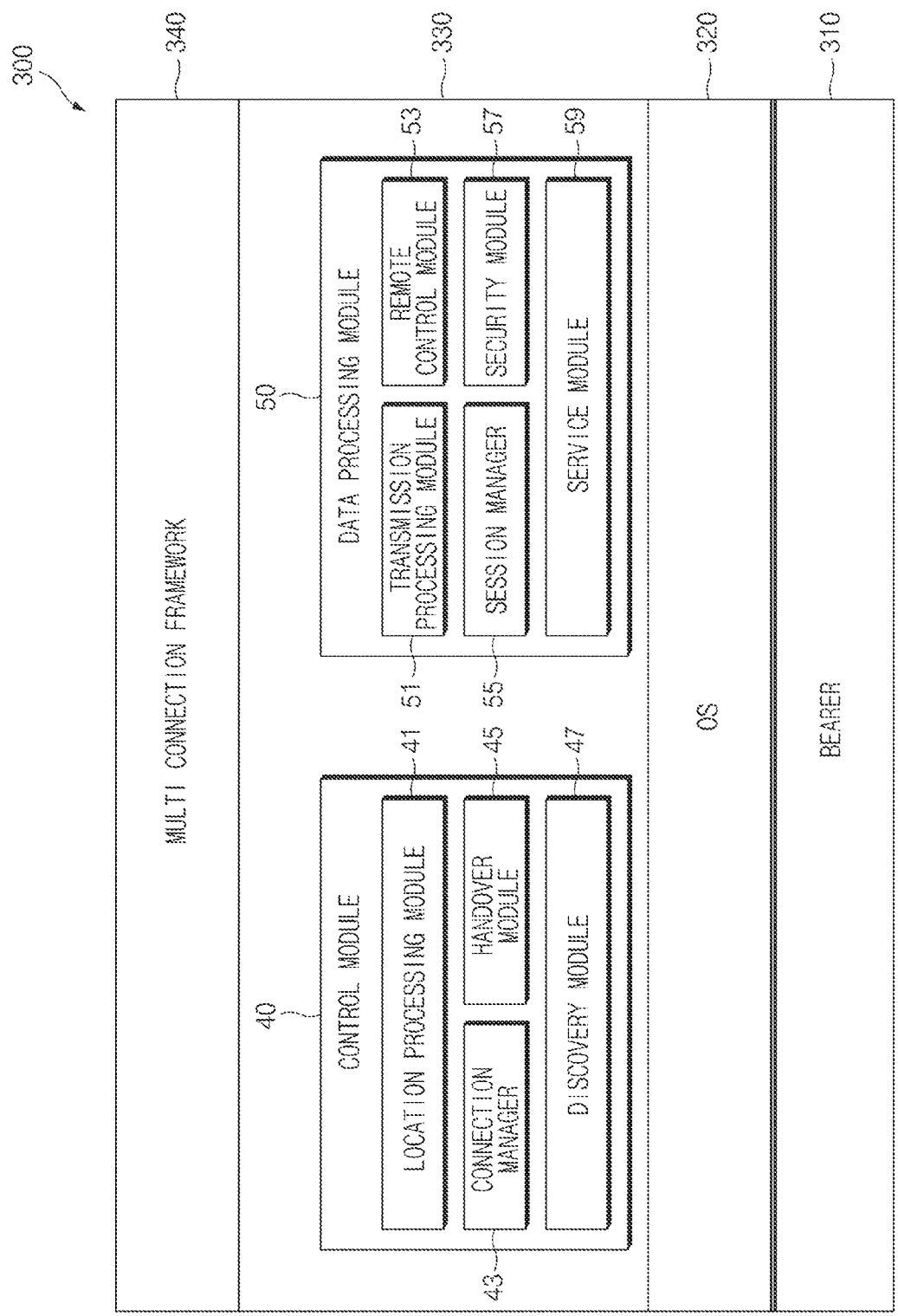
FIG. 3 is a view illustrating a program module according to various embodiments of the present disclosure.

FIG. 3 is a view illustrating a program module according to various embodiments of the present disclosure.

Referring to FIG. 3, the program module 300 may include a bearer area 310, an OS area 320, a module area 330, and a multi connection framework area 340.

The bearer area 310 (for example, a connectivity bearer layer) may include an area of the communication interface 160. For example, the bearer area 310 may be an area corresponding to hardware such as the communication module 161, the communication module 162, and the other communication module 163. At least one communication module disposed in the bearer area 310 may perform data transmission/reception in correspondence to a control of the OS area 320. According to an embodiment of the present disclosure, the bearer area 310 may receive a specified signal that the external electronic device 102 transmits in correspondence to a control of the OS area 320. Additionally, the bearer area 310 may at least one of transmit a specified signal to and receive the specified signal from the external electronic device 102.

The OS area 320 may control the management of at least one communication module included in the bearer area 310 in correspondence to a request delivered from the module area 330. For example, the OS area 320 may support interfacing between at least one module of the module area 330 and a communication module of the bearer area 310.

The module area 330 may include a control module 40 and a data processing module 50. The control module 40 (for example, a control plane) may include a location processing module 41 (for example, a proximity and presence module), a connection manager 43, a handover module 45 (for example, a seamless handover module), and a discovery module 47 (for example, a device/service discovery module).

The location processing module 41 may mange whether there is the external electronic device 102 to be connected around and may measure a target device specific distance and angle. For example, the location processing module 41 may collect signals by controlling at least one communication module (for example, at least one of the first to fourth communication modules 161 to 164) or a microphone included in the bearer area 310 and may calculate the location of a target device, a distance from itself, or an angle based on the collected signals.

Once a device is found, the connection manager 43 manages connection procedure content used for performing a procedure for connecting to a corresponding device according to service or a user's intention. For example, when two devices to be connected support various connection bearers (for example, communication modules), the connection manager 43 may select an optimal bearer or may optimize a connection method in the same bearer.

When a service provided according to the characteristics of the bearer area 310 or the current connectivity is transferred to another bearer (for example, another communication module) or another device, the handover module 45 may detect this automatically and switch the connectivity. For example, when the external device 102 is changed in correspondence to a movement of the electronic device 100, the handover module 45 may process changing of the external electronic device 102.

The discovery module 47 (for example, a device/service discovery module) may process a search procedure for checking whether there is a device around. The discovery module 47 may search for a device supporting service before connection among found devices. The search procedure may include a synchronous method of determining whether there is a device as all electronic devices notify their presences periodically and an asynchronous method in which an electronic device sends a search request message at a specific timing and performs searching.

The data processing module 50 may include a transmission processing module 51 (for example, a messaging/data transfer module), a remote control module, a session manager 55, a security module 57, and a service module 59 (for example, a service discovery module).

The transmission processing module 51 may provide quality of service (QoS) according to data or media delivered to a module responsible for a data transmission method after a session is set. The transmission processing module 51 may select a method of transmitting data to several electronic devices at a time or a method of transmitting one data to allow several electronic devices to receive the data simultaneously according to a setting or an event. Additionally, the transmission processing module 51 may manage an additional technique (for example, forward error correction (FEC), automatic repeat request (ARQ), and so on) for securing the reliability with respect to the transmission.

The remote control module 53 may serves as a role for controlling a device after the device is connected. For example, the remote control module 53 may define a protocol for exchanging a control command such as driving a washing machine or playing media and may control operations.

After a device is connected, the session manager 55 may open or close a dialog or a session for data exchange between two devices. The session manager 55 may dynamically participate in a dialog.

The security module 57 may manage functions relating to security such as encryption of data to be transmitted and authentication between connected devices. The service module 59 may search for a device supporting specified service among connected devices. The service may include notification for delivering data that a sensor detects periodically or in correspondence to an event occurrence under a print, file sharing, media streaming, or Internet of things (IoT) environment.

The multi connection framework area 340 includes a service level association and processes service connection with a device. For example, a procedure for search for a device may include device discovery and service discovery. The multi connection framework area 340 may associate discoveries to be performed once by associating a device discovery result and a service discovery result to combine two discovery procedures.

The multi connection framework area 340 may interoperate with the sensor hub 180 and some functions may be driven in the sensor hub 180. In a structure without the sensor hub 180, the multi connection framework area 340 may be driven by a host processor such as the AP 30. When a multi core processor configured with several processors is driven as a host processor, it may interoperate a high speed core among several cores in an AP according to a multi connectivity framework driving state or a core designed with low power consumption may be responsible for a multi connectivity framework. According to various embodiments of the present disclosure, multi connectivity framework driving may interoperate with a plurality of cores (for example, APs). Additionally, the electronic device 100 including a multi core AP may change the operating position of a multi connectivity framework in correspondence to a turn-on state or a turn-off state of an AP chip.

According to the above-mentioned embodiments of the present disclosure, an electronic device may include: a first communication module configured to support a first communication method; a second communication module configured to support a second communication method; a memory configured to store data used for operations of the first communication module and the second communication module; and a processor electrically connected to the first communication module, the second communication module, and the memory. The processor may recognize an approach of an external electronic device based on the first communication method and after recognizing a location by at least one of transmitting a specified signal to and receiving the specified signal from the approach-recognized external electronic device based on the second communication method, may correct location or direction information recognized based on state information itself calculated using sensor information collected from a sensor module.

According to the above-mentioned embodiments of the present disclosure, an electronic device may include: a first communication module configured to support a first communication method; a second communication module configured to support a second communication method; and a processor configured to recognize an approach of an external electronic device based on the first communication method and after recognizing a location by at least one of transmitting a specified signal to and receiving the specified signal from the approach-recognized external electronic device based on the second communication method, correct location or direction information associated with the approach recognized based on state information itself calculated using sensor information collected from a sensor module.

According to various embodiments of the present disclosure, the processor may operate the first communication module to at least one of transmit and receive a specified pattern signal based on a Bluetooth low energy (BLE).

According to various embodiments of the present disclosure, the processor may transmit a location measurement request message to the external electronic device, and when receiving a location measurement response from the external electronic device, calculate a relative location based on a location value calculated by the external electronic device and a location value calculated based on the location measurement response signal.

According to various embodiments of the present disclosure, the processor may transmit a location measurement request message including a location measurement value based on the location measurement response signal to the external electronic device a specified number of times.

According to various embodiments of the present disclosure, the processor may calculate a location based on a phase difference of signals received using a multi antenna or calculate a location based on a phase difference of signals transmitted from the external electronic device.

According to various embodiments of the present disclosure, the processor may at least one of transmit and receive the specified signal a specified number of times or until a specified event occurs and calculate an average value of a plurality of collected location measurement values as a location value.

According to various embodiments of the present disclosure, the processor may transmit a message for guiding a location measurement stop to the external electronic device according to a setting.

According to various embodiments of the present disclosure, the processor may obtain changed state information by using sensor information obtained by at least one sensor based on sensor information corresponding to a specified state.

According to various embodiments of the present disclosure, the processor may correct a calculated location according to the state information.

According to various embodiments of the present disclosure, the processor may display a location according to the correction value.

According to the above-mentioned embodiments of the present disclosure, an electronic device includes a memory for storing an instruction relating to operations of a plurality of communication modules and a processor electrically connected to the memory. The processor may recognize an approach of an external electronic device by operating at least one first communication module among the plurality of communication modules in a first communication method, and after recognizing the location of itself by at least one of transmitting a specified signal to and receiving the specified signal from an approach-recognized external electronic device as operating at least one communication module (for example, the same communication module as the first communication module or at least one second communication module different from the first communication module) among a plurality of communication modules in a second communication method, may correct recognized location or direction information associated with the approach based on its state information calculated using sensor information collected from a sensor module.

According to various embodiments of the present disclosure, the processor may adjust the approach recognition, the location recognition, and a correction execution period in correspondence to the size of a movement state check based on the sensor information.

According to various embodiments of the present disclosure, when the movement state checked based on the sensor information is greater than a specified value, the processor may perform the approach recognition, the location recognition, and the correction execution period to be relatively short.

According to various embodiments of the present disclosure, when the movement state checked based on the sensor information is less than a specified value, the processor may perform the approach recognition, the location recognition, and the correction execution period to be relatively long.

Figure 4:
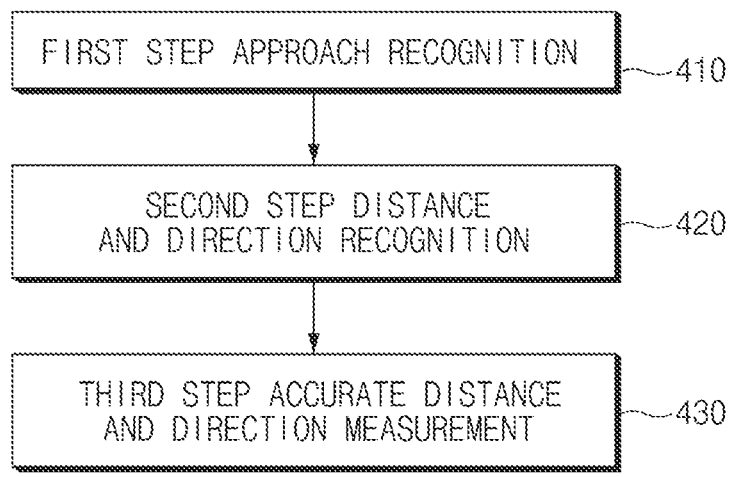
FIG. 4 is a flowchart illustrating a device searching method according to various embodiments of the present disclosure.

FIG. 4 is a flowchart illustrating a device searching method according to various embodiments of the present disclosure.

Referring to FIG. 4, in the device searching method, the electronic device 100 may perform an approach recognition operation in operation 410, an accurate distance direction recognition operation in operation 420, and a location determination operation in operation 430.

The approach recognition operation in operation 410 may be an operation for determining whether the electronic device 100 approaches a specified location. For example, the electronic device 100 may be determined using BLE provided from the external electronic device 102 at a specified location. The external electronic device 102 may include BLE Tag and wireless local area network (WLAN) AP at a specified location and may output a specified signal (for example, an advertisement packet).

When approach recognition is checked, in operation 420, the electronic device 100 request a second step entry from the external electronic device 102 in order for accurate distance or direction recognition. During this operation, the electronic device 100 may transmit a signal corresponding to an entry request to the external electronic device 102.

In operation 430, the electronic device 100 may determine the current state based on at least one sensor and based on this, may perform a location determination. For example, the electronic device 100 may determine a direction state of the electronic device 100 such as an arrangement state with respect to the ground or an arrangement state with respect to the front, based on sensing information collected through a sensor. The electronic device 100 may perform a location determination by performing a location estimation of the external electronic device 102 according to a direction state.

Figure 5:
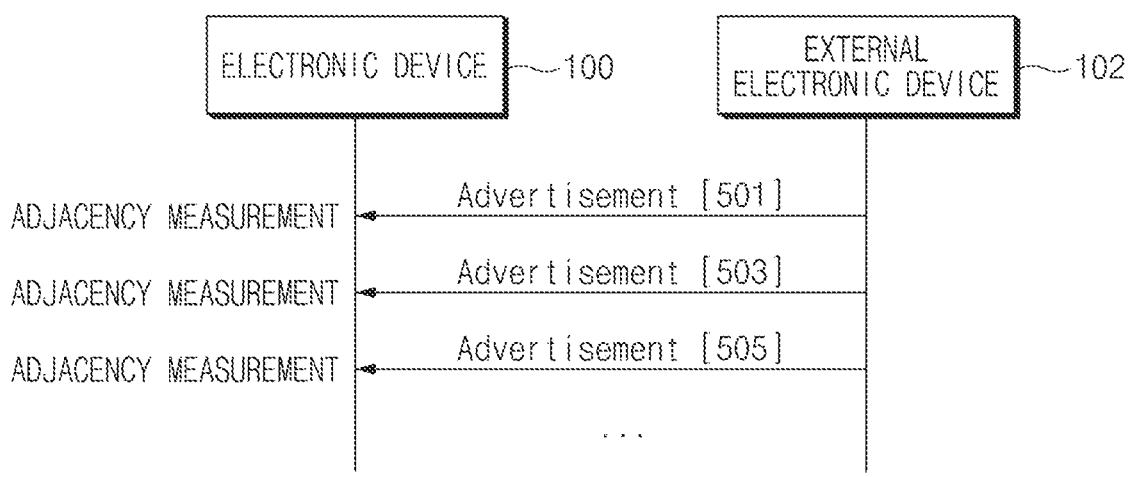
FIG. 5 is a view illustrating an approach recognizing method according to various embodiments of the present disclosure.

FIG. 5 is a view illustrating an approach recognizing method according to various embodiments of the present disclosure.

Referring to FIG. 5, in operations 501, 503, and 505, the external electronic device 102 may transmit an advertisement packet in a predetermined period or in real time. The advertisement packet, for example, may be a low power BLE signal. The electronic device 100 may monitor a low power BLE signal in a predetermined period. In relation to this, the electronic device 100 may set a state for receiving a low power BLE signal by activating the fourth communication module 164. The electronic device 100 may receive the monitored BLE signals and may check whether there is a specified BLE signal among corresponding signals.

If detecting a specified signal (for example, a previously registered specific BLE signal) during operations 501 to 505, the electronic device 100 may determine this as entering a specified location and thus may enter operation 403 described with reference to FIG. 4.

According to various embodiments of the present disclosure, during the determining of the specified location entry, the electronic device 100 may determine whether the intensity of a BLE signal is greater than a specified intensity and when the intensity of a BLE signal is greater than the specified intensity, may determine it as a corresponding location entry. According to various embodiments of the present disclosure, the external electronic device 102 may deliver place related information in addition to a BLE signal or may transmit uniform resource locator (URL) information for obtaining place related information or information relating to a WLAN signal associated with corresponding BLE together.

According to various embodiments of the present disclosure, if there is no specified BLE signal detection by monitoring a BLE signal for a specified time, the electronic device 100 may output a notification about this. Then, the electronic device 100 may perform a control to return to a specified function (for example, a home screen or a function performed right before a device searching function).

Figure 6:
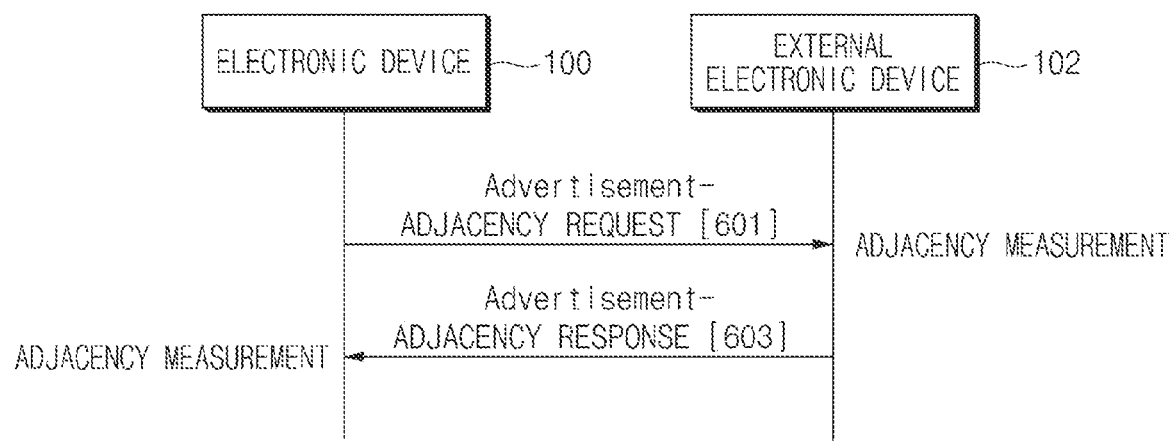
FIG. 6 is a view illustrating an approach checking method based on an adjacency measurement according to an embodiment of the present disclosure.

FIG. 6 is a view illustrating an approach checking method based on an adjacency measurement according to an embodiment of the present disclosure.

Referring to FIG. 6, according to various embodiments of the present disclosure, the electronic device 100 or the external electronic device 102 may determine whether the other party approaches at a predetermined time point. In relation to this, according to an embodiment of the present disclosure, in operation 601, when it is necessary to detect whether a specific device (for example, the external electronic device 102) is adjacent, the electronic device 100 may insert the address of at least one external electronic device 102 to be checked for adjacency into a BLE advertisement packet and then may transmit it. Upon the receipt of a BLE advertisement packet relating to the adjacency checking, the external electronic device 102 may measure the adjacency and in response to this, may transmit a BLE advertisement packet to the electronic device 100 in operation 603.

In the above operation, when the address of the external electronic device 102 is specified, the electronic device 100 may write the address in a packet and transmit it. Additionally, when not specifying the external electronic device 102, the electronic device 100 may write a message for requesting an adjacency check in a packet having an address write omitted and may then transmit it. Upon the receipt of a packet relating to an adjacency check request, the external electronic device 102 may determine whether it is adjacent by using characteristics such as the signal intensity of a request packet before sending a response and only when it is adjacent, may send a response to the electronic device 100.

The adjacency request packet, as mentioned above, may include information of the external electronic device 102 to be checked on whether it is adjacent and a reference value for determining the degree of adjacency. For example, the electronic device 100 may write a signal intensity reference value set to make a response only when a value is greater than a specific signal intensity value in an adjacency request packet and then may transmit it. In correspondence to this, only when the signal intensity of a received adjacency request packet is greater than a signal intensity reference value, the external electronic device 102 may transmit an adjacency response packet to the electronic device 100.

In order to improve the accuracy of adjacency, the external electronic device 102 may write a reference value obtained when an adjacency request packet is received in an adjacency response packet to be transmitted and transmit it. The electronic device 100 may determine the accuracy of adjacency by comparing a corresponding value of an adjacency response packet with a value extracted from a received signal.

For example, when an adjacency request packet that the electronic device 100 transmits is received as a value of −50 dBm, the external electronic device 102 may write information relating to −50 dBm in an adjacency response packet and then may transmit it to the electronic device 100. Upon the receipt of an adjacency response message, the electronic device 100 may measure a signal intensity for this. For example, a signal intensity for an adjacency response message that the electronic device 100 receives may be −60 dBm. In this case, it is known that a distance between the electronic device 100 and the external electronic device 102 is between −50 dBm and −60 dBm.

Additionally, information for defining a method that a corresponding device performs in a second step (for example, accurate distance or direction recognition) may be written in an advertisement response or request packet. Based on this information, when requesting a second step entry, the electronic device 100 may select one of methods commonly supported by the electronic device 100 and the external electronic device 102 and then may notify it to the external electronic device 102 to perform a second step. For example, in relation to a second step distance measuring method, the electronic device 100 may support WLAN multi-input multi-output (MIMO) and Audio based processing and the external electronic device 102 may support only WLAN MIMO based processing. In this case, the electronic device 100 may request the external electronic device 102 in order to perform WLAN MINO based second step processing through information exchange relating to a distance measurement method. If there are commonly supported methods, the electronic device 100 may select an optimal method specified based on variables such as accuracy, measurement time, and current consumption according to an application in execution and then may perform it. Additionally, when the current remaining battery is less than a specified value as exchanging remaining battery information, the electronic device 100 may stop second step processing.

As mentioned above, in relation to the first operation for determining a specific location entry, the electronic device 100 may use various techniques other than BLE. For example, the electronic device 100 may perform the first operation based on physical information and logical information.

In relation to the physical information, the electronic device 100 may use a reception intensity as a microphone receives radio signals, specific sound waves, or ultrasonic signals through WLAN (e.g., Wi-Fi and HyberLan), Zigbee, Z-Wave, and ultra-wideband (UWB), which are communication standard techniques other than BLE for configuring a personal communication network using a low power digital radio. Alternatively, the electronic device 100 may operate a method of determining approach recognition by using radio frequency (RF)-Tag and near field communication (NFC) signals and a method of determining an approach to a specific location by using a Light Fidelity (LiFi) communication technique for communicating data through image information inputted from a camera or flashing light in an apparatus for emitting light such as LED. Alternatively, the electronic device 100 may determine an approach to a specific location by using a variety of sensor information from vibration, temperature, pressure, altitude, smell, and magnetic sensors. Alternatively, in the case of outdoor, the electronic device 100 may check an approach to a specific location by directly utilizing GPS information. Alternatively, the electronic device 100 may determine the location by utilizing 3rd generation (3G) and 4th generation (4G) communication network cell Identification (ID) information and WLAN access point (AP) database (DB).

In relation to the logical information, the electronic device 100 may use a context awareness technique using life logging. For example, the electronic device 100 may monitor a device usage pattern of a user and based on information collected through this, may estimate the location of the electronic device 100 at a specific time and a specific pattern. According to an embodiment of the present disclosure, the electronic device 100 may estimate that it is located at a company at a corresponding time based on data accumulated for a worker going to the company at 9:00 am in a specified period. Alternatively, the electronic device 100 may identify the location thereof by analyzing a specific sound pattern of sound obtained based on a low power microphone in an Always-on state. For example, the electronic device 100 may estimate whether it is located in a bus or located at a bus station at a specified predetermined location through bus noise. According to various embodiments of the present disclosure, the electronic device 100 combines the above-mentioned context awareness technique with a Log based context awareness technique to more accurately estimate the location. According to various embodiments of the present disclosure, the electronic device 100 may estimate the current location of the electronic device 100 by using manually-inputted information or shared schedule information received from another electronic device.

Figure 7:
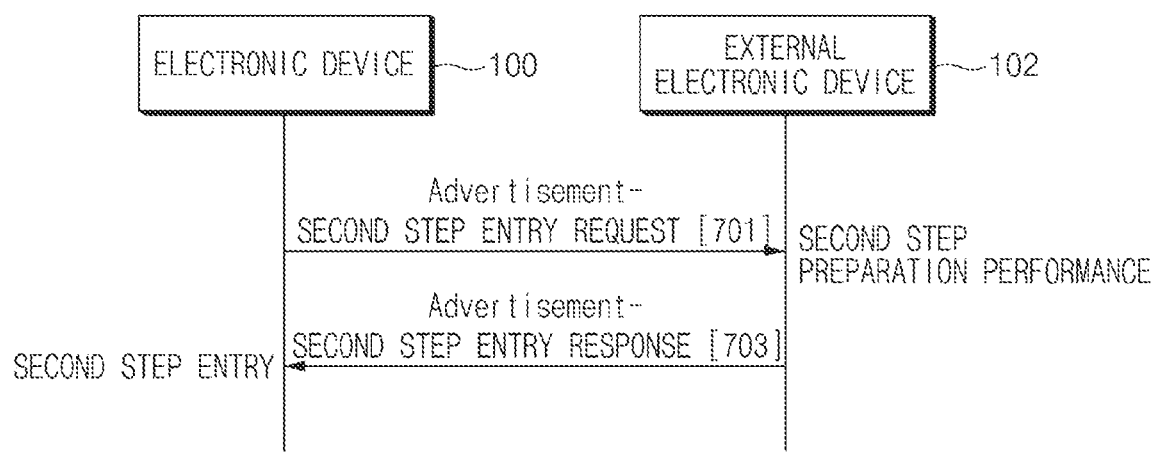
FIG. 7 is a view illustrating an accurate distance or direction recognition preparing method according to various embodiments of the present disclosure.

FIG. 7 is a view illustrating an accurate distance or direction recognition preparing method according to various embodiments of the present disclosure.

Referring to FIG. 7, when it is determined that the electronic device 100 is located at a specific location based on the first step operation, the electronic device 100 may perform a second step operation. Before entering the second step, the electronic device 100 may predefine a method to be used in the second step by using a communication channel used in the first step. For example, when the second step procedure is performed after the first step is performed through BLE, the electronic device 100 may enter the second step after exchanging a WLAN channel and media access control (MAC) information by using a BLE advertisement packet to explicitly perform a second step function.

According to an embodiment of the present disclosure, in operation 701, the electronic device 100 may transmit an advertisement packet for requesting the second step entry to the external electronic device 102. The entry request packet may include information used for a second step measurement procedure. For example, a measurement method using WLAN MIMO may be written in the entry request packet. As a second step detection method, the electronic device 100 may write WLAN MIMO setting information in a packet and transmit it to the external electronic device 102 and may transmit channel information for exchanging packets via WLAN and the WLAN MAC address of the electronic device 100 to the external electronic device 102.

Upon the receipt of the second step entry request packet, the external electronic device 102 may supply power to a WLAN communication module and may process a channel for exchanging packets to be in a reception standby state. Once a preparation performance is completed, in operation 703, the external electronic device 102 may transmit a second step entry response corresponding to the preparation completion to the electronic device 100 by using BLE advertisement. The second step entry response message may include the WLAN MAC address of the electronic device 100. Accordingly, the electronic device 100 and the second electronic device 102 may perform Unicast based mutual communication by using WLAN MIMO after entering the second step.

The electronic device 100 receiving the second entry response packet may supply power to a WLAN communication module and may perform a second step measurement procedure after maintaining a reception standby state for exchanging packets.

Figure 8:
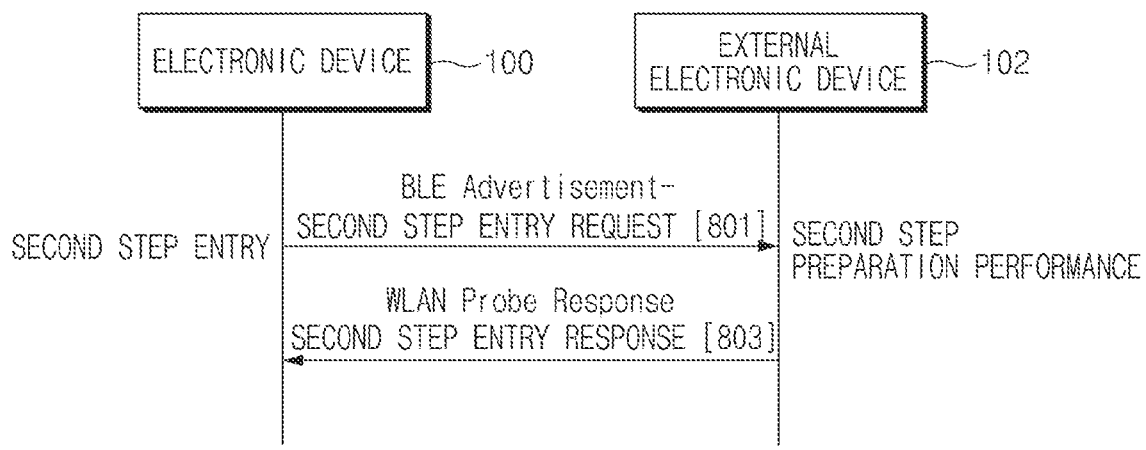
FIG. 8 is a view illustrating an accurate distance or direction recognition preparing method according to another embodiment of the present disclosure.

FIG. 8 is a view illustrating an accurate distance or direction recognition preparing method according to another embodiment of the present disclosure.

Referring to FIG. 8, in relation to a second step preparing method corresponding to a second step entry, in operation 801, the electronic device 100 may transmit a BLE advertisement second step entry request from the external electronic device 102, for example. Information for setting as WLAN MIMO a second step detecting method in correspondence to a specified setting, information for exchanging packets via WLAN, and the WLAN MAC address of the electronic device 100 may be written in the transmitted BLE advertisement second step entry request packet. After transmitting the second step entry request packet, the electronic device 100 may supply power to a WLAN communication module and may maintain a channel for exchanging packets to be in a reception standby state.

The external electronic device 102 receiving the second step entry request packet may supply power to a WLAN communication module and activate it and then transmits a second step entry response to a second step entry WLAN channel in response to a preparation completion in operation 803. According to an embodiment of the present disclosure, the external electronic device 102 may transmit a WLAN Probe Response as a second step entry response to the electronic device 100. The electronic device 100 receiving the second step entry response may perform a second step measurement procedure.

Figure 9:
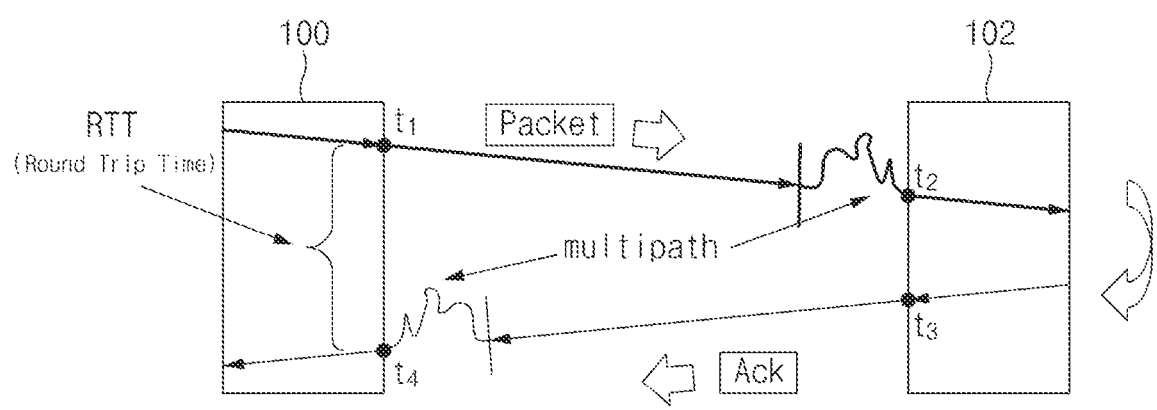
FIG. 9 is a view relating to a distance between devices or direction calculation according to various embodiments of the present disclosure.

FIG. 9 is a view relating to a distance between devices or direction calculation according to various embodiments of the present disclosure.

Referring to FIG. 9, a second step operation, as a distance or direction recognition step, may estimate an accurate location and direction for a target. In relation to this, the electronic device 100 may use MIMO utilizing a multi antenna. A distance between an WLAN based access point (AP) (for example, the external electronic device 102) and an electronic device may be obtained by using at least one of round trip time (RTT) of a transmitted/received signal, a radio signal strength indicator (RSSI), modulation and coding scheme (MCS) information, time of flight (ToF), angle of arrival (AoA), and angle of departure (AoD). When an estimation algorithm is used, the electronic device 100 may relatively accurately estimate a physical distance in addition to a relative distance.

In order for a distance and angle measurement between two devices (for example, the electronic device 100 and the external electronic device 102) when they are not connected to each other (for example, Pre-association), the electronic device 100 or the external electronic device 102 may use message such as Probe Request and Probe Response. Alternatively, the electronic device 100 or the external electronic device 102 may perform exchanging newly defined messages.

When attempting to measure a distance to the external electronic device 102, the electronic device 100 may transmit a specific message and may collect a time difference at which an acknowledgement (Ack) (that is, a feedback for a corresponding message) is received from the external electronic device 102. The electronic device 100 may estimate an actual distance that a radio wave radiates by calculating an actual time (t1−t2+t3−t4) taken for radiating a radio wave with the collected times and multiplying it by a radio wave transmission speed ($2.8 \times 10^{8}$ m/sec). Since the calculated distance in such a manner may include various errors such as multi-path according to a measured environment, the electronic device 100 may increase the accuracy by exchanging a plurality of signals and an average thereof. Additionally, since the accuracy may be higher as an RF message exchange bandwidth is higher, the electronic device may vary a repeated measurement frequency in correspondence to a band that two (for example, the electronic device 100 or the external electronic device 102) support. For example, when the bandwidth of a wireless communication channel is broad, the electronic device 100 may reduce a repetition frequency for a time difference detection and when the bandwidth of a wireless communication channel is narrow, may increase a repetition frequency in order to the accuracy.

According to various embodiments of the present disclosure, the electronic device 100 may estimate a distance between two devices by using ToF, RSSI, signal-to-noise ratio (SNR), and signal-to-noise-plus-interference ratio (SINR) of a received message. Alternatively, the electronic device 100 may improve the accuracy of detected information by using a combination of two or more variables (ToF, RSSI, SNR, and SINR).

Figure 10:
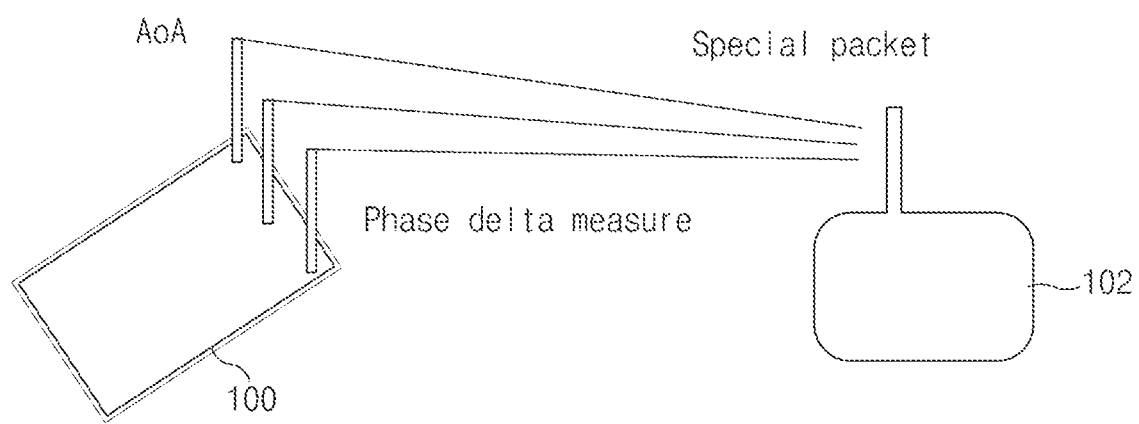
FIG. 10 is a view illustrating a distance or direction recognition based on a plurality of antennas according to various embodiments of the present disclosure.

FIG. 10 is a view illustrating a distance or direction recognition based on a plurality of antennas according to various embodiments of the present disclosure.

Referring to FIG. 10, upon the receipt of transmission signals by using WLAN MIMO, the electronic device 100 may receive a signal where a phase difference occurs in two or more antennas. The electronic device 100 may estimate a direction of the other party device (for example, the external electronic device 102) by analyzing a phase difference of two signals. For example, the electronic device 100 may perform a direction measurement by utilizing AoA.

According to various embodiments, when a transmission electronic device (for example, the external electronic device 102) configured with a plurality of antennas transmits the same signal to a reception device configured with one antenna, a reception electronic device (for example, the external electronic device 102) may detect a phase difference of signals transmitted from the plurality of antennas. For example, the external electronic device 102 may measure a direction of the electronic device 100 by utilizing AoD.

Figure 11:
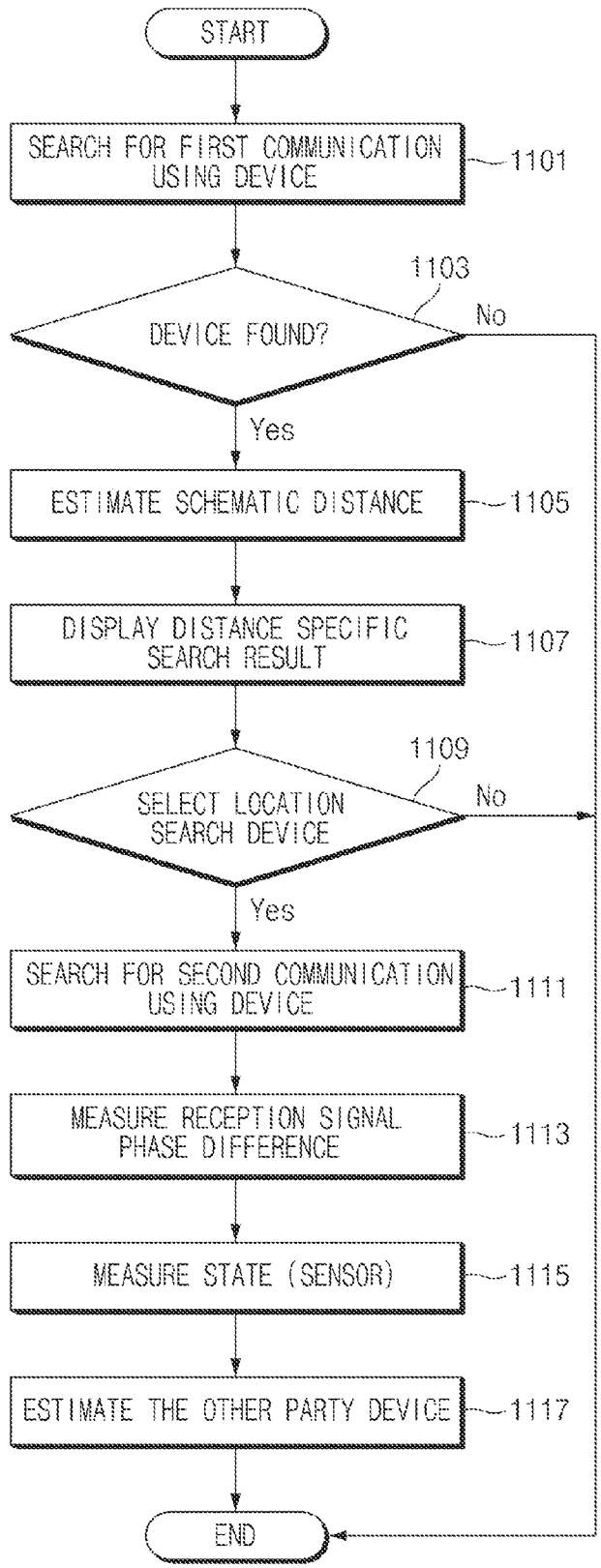
FIG. 11 is a view illustrating a device searching method according to various embodiments of the present disclosure.

FIG. 11 is a view illustrating a device searching method according to various embodiments of the present disclosure.

Referring to FIG. 11, in the device searching method, in operation 1101, the electronic device 100 may search for a device (for example, the external electronic device 102) by using a first communication (for example, a communication channel based on the fourth communication module 164). In operation 1103, the electronic device 100 may check whether a device is found. If a device is found, the electronic device 100 may perform a schematic distance estimation in operation 1105. For example, the electronic device 100, as described above, may perform a schematic distance estimation based on a transmission/reception signal intensity of a BLE signal.

After the distance estimation, the electronic device 100 may display a distance specific search result in operation 1107. In operation 1109, the electronic device 100 may check whether an event for selecting a found device of a specific location occurs. When an event for selecting a found device of a specific location occurs, in operation 1111, the electronic device 100 may perform a selection device search by using a second communication (for example, a communication channel based on the third communication module 163 or a communication channel based on the first communication module 161 or the second communication module 162).

In operation 1113, the electronic device 100 may measure a reception signal phase difference. In relation to this, the electronic device 100 may transmit a specified signal based on a plurality of antennas or the external electronic device 102 may receive a specified signal transmitted based on a plurality of antennas.

In operation 1115, the electronic device 100 may perform a state measurement based on at least one sensor. For example, the electronic device 100 may measure a direction state in which the current electronic device 100 faces based on the ground surface or a horizontal direction.

Based on the measured direction state, in operation 1117, the electronic device 100 may perform a location estimation of the other party device (for example, the external electronic device 102). Description is made with reference to the drawings in relation to the location estimation.

Figure 12:
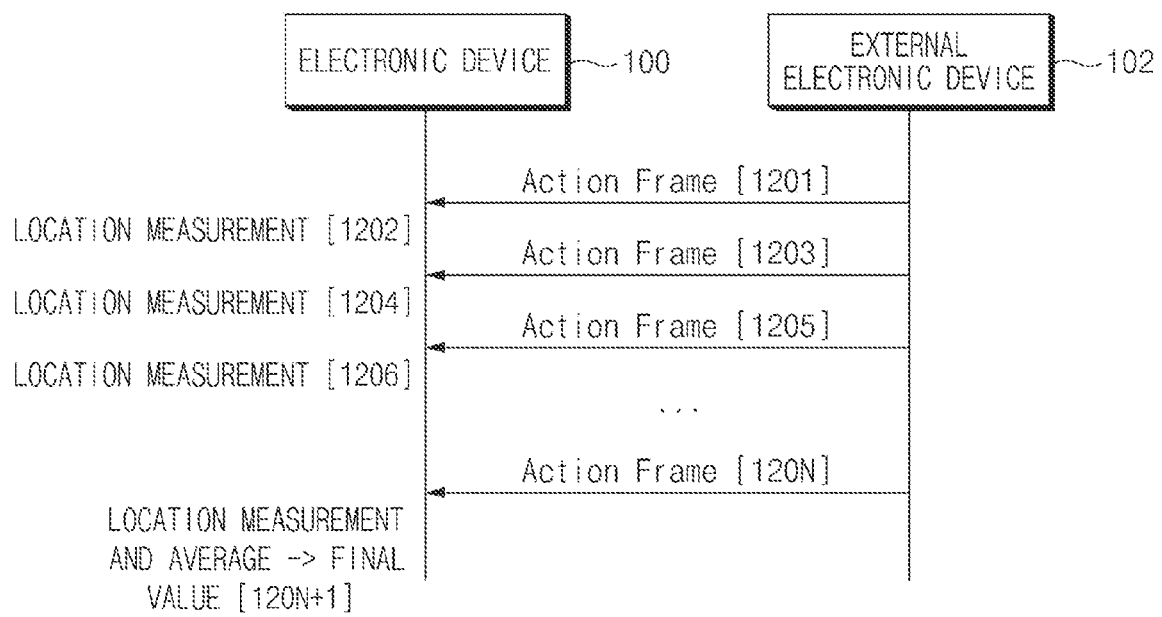
FIG. 12 is a view illustrating relating to a location measurement according to various embodiments of the present disclosure.

FIG. 12 is a view illustrating a location measurement according to various embodiments of the present disclosure.

Referring to FIG. 12, the electronic device 100 may determine a distance or a direction between the electronic device 100 and a target (for example, the external electronic device 102) in a second step and then may enter a third step. In the third step, the electronic device 100 may output location determination information based on external information such as vehicle information, map information, or building Information stored in an electronic device or a server and information integrated through the first step or the second step.

In relation to an angle estimating method similar to a distance measuring method, since several error factors are included, the electronic device 100 may perform a location measurement several times based on an action frames 1201, 1203, 1205-120N received from the external electronic device 102 during a specified number of times during operation 1202, 1204, and 1206 to operation 120N+1 and may obtain an average of a measurement result to improve the reliability. At this point, the electronic device 100 may adjust a measurement frequency according to the size of a bandwidth of a communication channel that operates currently. According to various embodiments of the present disclosure, the electronic device 100 may use a message used in a distance measurement process identically in an angle estimation operation or may operate a specified new message in transmission/reception with the external electronic device 102.

According to various embodiments of the present disclosure, the electronic device 100 may operate a specific message provided from institute of electrical and electronics engineers (IEEE) 802.11 that is the standard of WLAN technique or a field of a packet (for example, vendor specific information element (VSIE) Field) as a field for writing a value for measuring a distance and angle between devices.

For example, the electronic device 100 or the external electronic device 102 may deliver a message transmitted/received between devices in a RTT based distance measurement or t1 and t3 corresponding to an absolute time value at which a packet is transmitted, by using a Vendor Specific Field. The electronic device 100 or the external electronic device 102, which receives this, may analyze the received signal to calculate propagation delay and may estimate a distance between the two devices finally.

According to various embodiments of the present disclosure, if the external device 102 delivers Probe Response periodically, by using the RSSI and phase difference of a signal each time the electronic device 100 receives a corresponding packet (for example, an Action Frame of WLAN), the electronic device 100 entering the second step may measure a distance and a direction between the electronic device 100 and the external electronic device 102 and then may obtain an average value of repeatedly measured values to obtain a final value.

Figure 13:
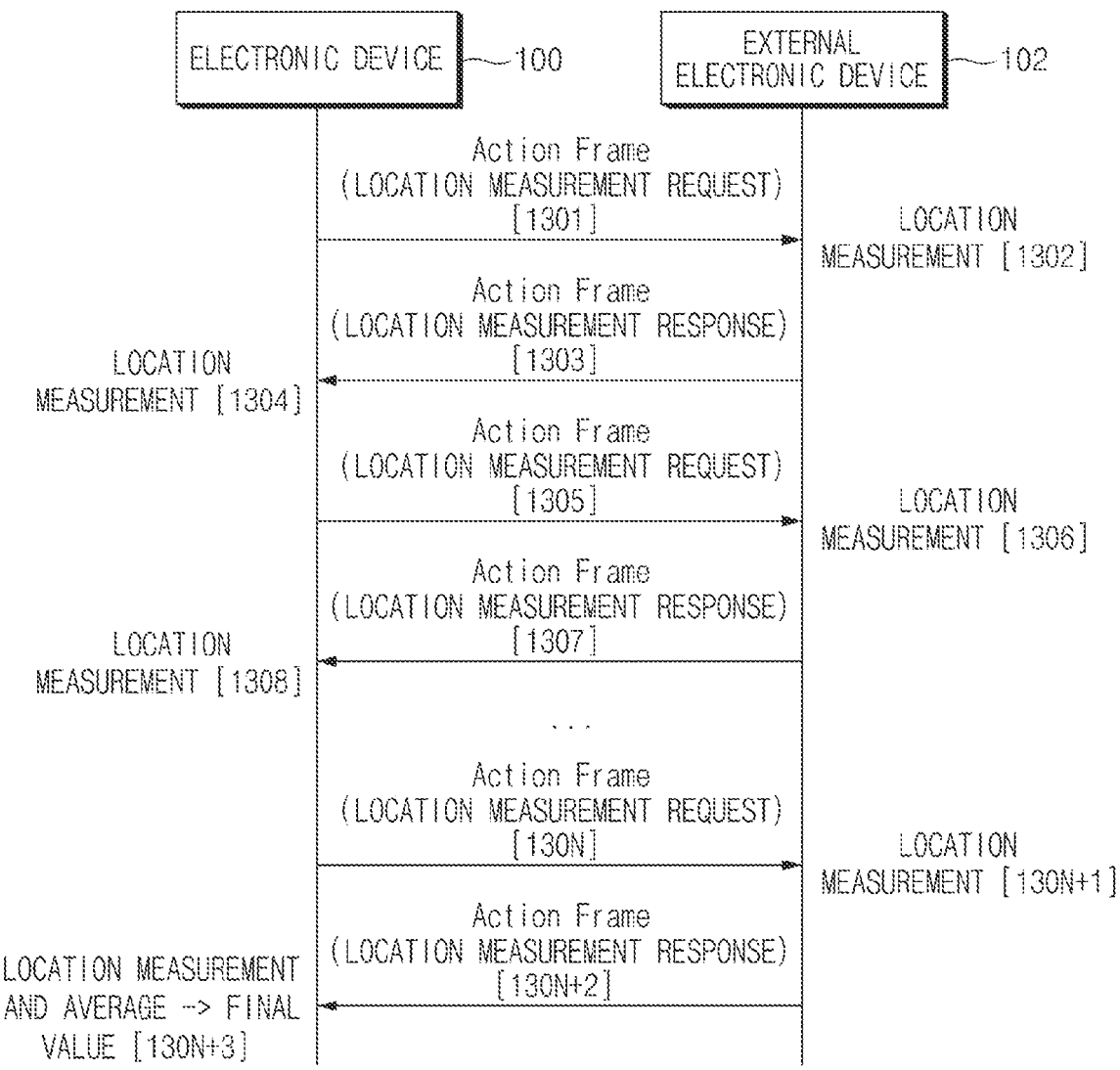
FIG. 13 is a view illustrating a location measuring method according to various embodiments of the present disclosure.

FIG. 13 is a view illustrating a location measuring method according to various embodiments of the present disclosure.

Referring to FIG. 13, in relation to the location measuring method, the electronic device 100 may exchange and compare data mutually measured with the external electronic device 102 in order to minimize measurement errors and improve the reliability of a measurement result.

For example, in operation 1301, the electronic device 100 may transmit a measurement request action frame to the external electronic device 102. The external electronic device 102 receiving the action frame from the electronic device 100 may measure a distance and a direction by using the received action frame in operation 1302 and may write a measured value in an action frame corresponding to a measurement response and then transmit it to the electronic device 100 in operation 1303. The electronic device 100 receiving the action frame corresponding to a location measurement response from the external electronic device 102 may perform a location measurement on the external electronic device 200 as receiving a measurement response packet in operation 1304. During this operation, the electronic device 100 may improve the reliability for a distance or a direction with respect to the external electronic device 102 based on the measured value for the external electronic device 200 and a distance and direction value (for example, a measured direction value is a value inversed in the opposite direction) explicitly displayed in the location measurement response packet that the external electronic device 200 transmits.

The electronic device 100 and the external electronic device 102 may perform a repeat operation such as operation 1305 to operation 1308 and operation 130N to operation 130N+3 and may determine an average value of the calculated values as a final value. The number of repetitions may be a specified value and may be adjusted according to a bandwidth size with respect to the external electronic device 102. From the second repetition, the electronic device 100 may write a location (or distance or direction) value with respect to the external electronic device 102, which is measured by the electronic device 100, in the location measurement request action frame and then may transmit it to the external electronic device 102. Correspondingly, the external electronic device 102 may obtain the location of the electronic device 100 based on a location value that the electronic device 102 provides.

Figure 14:
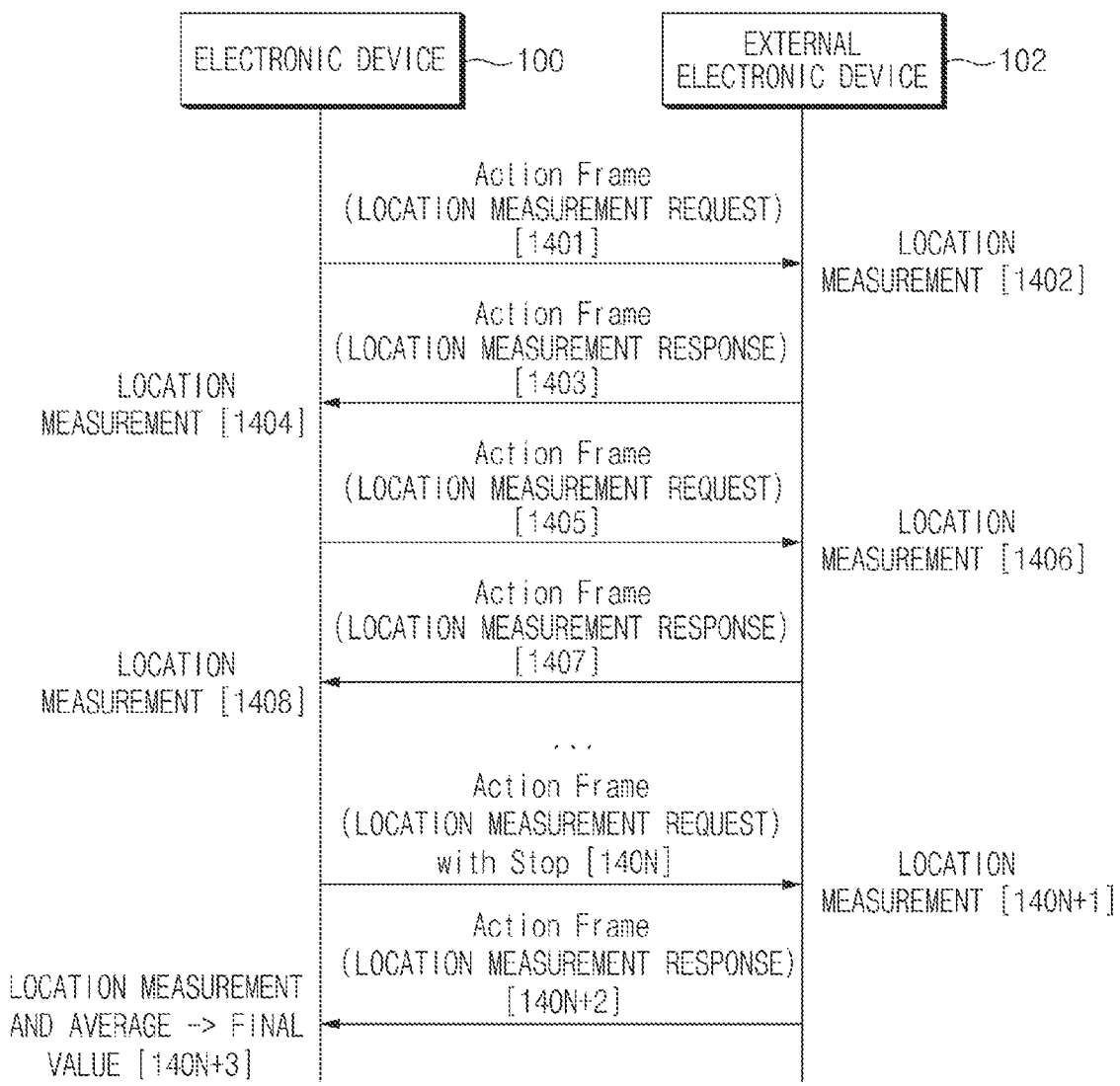
FIG. 14 is a view illustrating a location measuring method according to another embodiment of the present disclosure.

FIG. 14 is a view illustrating a location measuring method according to another embodiment of the present disclosure.

Referring to FIG. 14, when a reliable value is obtained (for example, a value measured more than n times is identical within an error range) earlier than the predetermined number of repetitions while a location measurement is performed repeatedly, the measurement may be terminated in advance.

For example, in operation 1401, the electronic device 100 may transmit an action frame (for example, a location measurement request) to the external electronic device 102. The external electronic device 102 may perform a location measurement in response to the request of the electronic device 100 in operation 1402. For example, the external electronic device 102 may perform a location measurement using a multi antenna based on the reception of the action frame (for example, a location measurement request) that the electronic device 100 transmits. In relation to the location measurement result, in operation 1403, the external electronic device 102 may transmit an action frame (for example, a location measurement response) to the electronic device 100. The electronic device 100 may perform a location measurement based on a location value that the external electronic device 102 measures by using the action frame (for example, a location measurement request) and a location value using the action frame (for example, a location measurement response) that the external electronic device 102 transmits.

In order to obtain the location measurement reliability, in operation 1405, the electronic device 100 may transmit an action frame (for example, a location measurement request) to the external electronic device 102. During this operation, the electronic device 100 may write the location measurement value obtained in operation 1404 in a corresponding location measurement request message and then may transmit it to the external electronic device 102. The external electronic device 102 may perform a location measurement based on the received action frame (for example, a location measurement request) in operation 1406 and may write a measurement result in an action frame (for example, a location measurement response) to transmit it to the electronic device 100 in operation 1407. The electronic device 100 may perform the above-performed operation in operation 1408 repeatedly. The electronic device 100 and the external electronic device 102 may perform the above operation repeatedly during a specified number of times or until the reliability for location measurement satisfies a specified condition.

If a location measurement is repeated for a predetermined number of times or the reliability for location measurement satisfies the specified condition, the electronic device may transmit to the external electronic device 102 an action frame (for example, a location measurement request) with stop message for requesting a location measurement request stop in operation 140N. For example, the action frame (for example, a location measurement request) with stop message may be a message for performing a location measurement until this message reception and stopping a location measurement procedure. The external electronic device 102 may perform a location measurement based on the received action frame (for example, a location measurement request) with stop message in operation 140N+1 and may write a measurement result in an action frame (for example, a location measurement response) to transmit it to the electronic device 100 in operation 140N+2. The electronic device 100 may calculate a location measurement and an average value and based on this, may determine a final location value in operation 140N+3.

According to various embodiments of the present disclosure, the electronic device 100 and the external electronic device 102 may measure the other party location by using an array microphone. For example, the electronic device 100 and the external electronic device 102 may collect sound waves or ultrasonic waves generated from a specific location by using an array microphone and may identify a specified frequency pattern among the collected sounds. The electronic device 100 or the external electronic device 102 may determine the other party location and direction information by measuring an arrival time difference of signals corresponding to a specified frequency pattern and the intensity of a sound wave.

Figure 15:
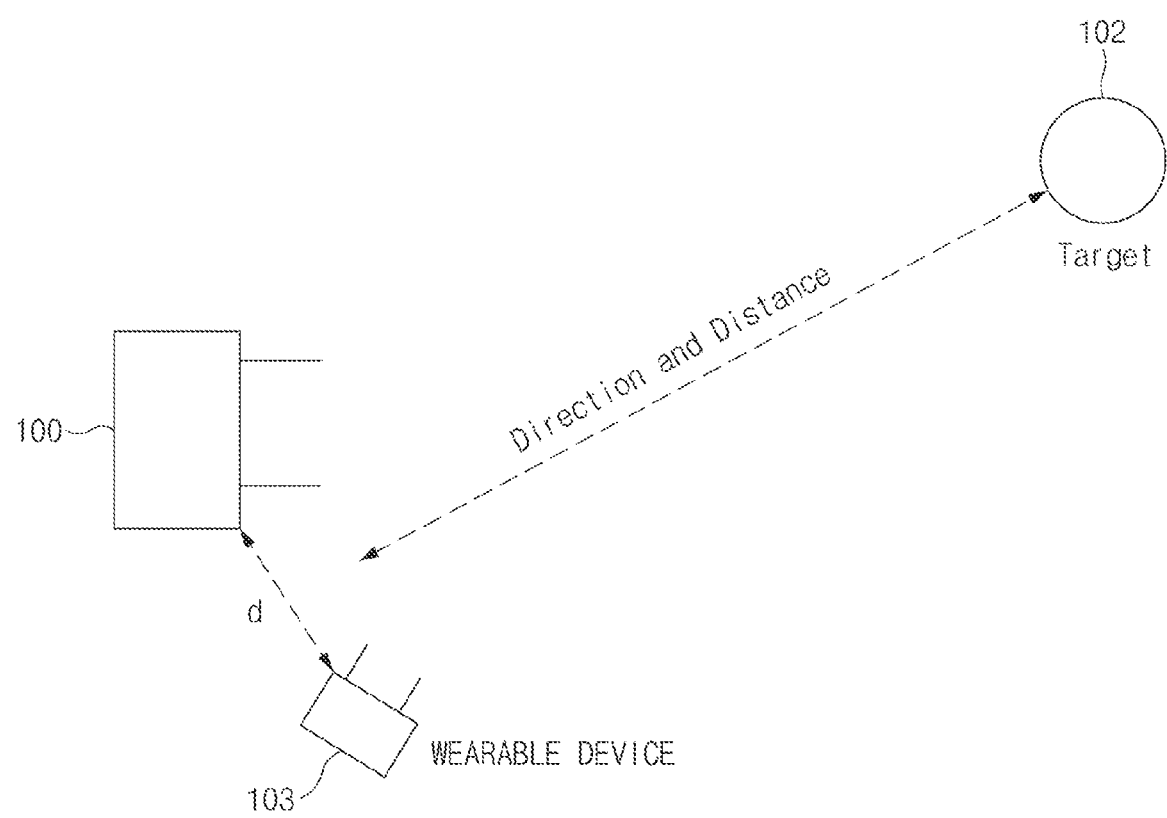
FIG. 15 is a view illustrating a location measurement using a connection device according to various embodiments of the present disclosure.

FIG. 15 is a view illustrating a location measurement using a connection device according to various embodiments of the present disclosure.

Referring to FIG. 15, in order to the accuracy of direction and distance information with respect to a target, the electronic device 100 may use a connection device 103 and may utilize an additional antenna for a bearer (for example, a communication module) connected to the same hardware chipset in the electronic device. For example, if a WLAN antenna is one or more and an additional antenna for Bluetooth exists in the same chip, the electronic device 100 may be prepared to share WLAN and BT antennas in a chip. When performing a location measurement, the electronic device 100 may utilize the plurality of shared antennas. The connection device 103 may interoperate with the electronic device 100 such as a wearable device or a tablet and may be another device of which location information is known to the electronic device 100. If the connection device 103 is the wearable device 103, the multi antenna of the electronic device 100 and the multi antenna of the wearable device 103 operate integrally, thereby improving the accuracy of a distance or direction measurement with respect to the external electronic device 102. If the wearable device 103 is used additionally, a direction and a distance d between the wearable device 103 and the electronic device 100 may be measured by using the multi antenna of the electronic device 100 and an antenna distance between the electronic device 100 and the wearable device 103 may be obtained by using the measured direction and distance d. The electronic device 100 may improve the accuracy of an estimation on a distance or a direction from the electronic device 100 to a target (for example, the external electronic device 102) by using a signal phase shift (for example, a difference between a signal that the electronic device 100 receives from the target (for example, the external the external electronic device 102) and a signal that the wearable device 103 receives) inputted to the antenna of the electronic device 100 and the additional antenna of the wearable device 103.

Figure 16:
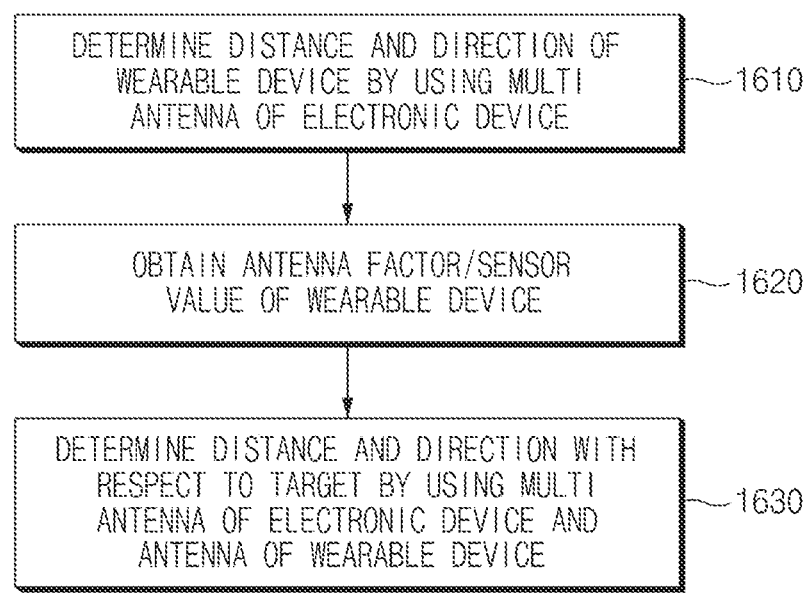
FIG. 16 is a view illustrating a location measuring method using a connection device according to various embodiments of the present disclosure.

FIG. 16 is a view illustrating a location measuring method using a connection device according to various embodiments of the present disclosure.

Referring to FIG. 16, in operation 1610, the electronic device 100 may perform a distance or direction determination of the wearable device 103 by using the multi antenna of the electronic device 100. In operation 1620, the electronic device 100 may obtain an antenna factor and a sensor value of the wearable device 103. In operation 1630, the electronic device may determine a distance or a direction with respect to a target (for example, the external electronic device 102) by using the multi antenna of the electronic device 100 and the antenna of the wearable device 103. For example, the electronic device may determine a distance or a direction with respect to a target (for example, the external electronic device 102) by using a phase shift obtained from the multi antenna of the electronic device 100 and a phase shift obtained from the antenna of the wearable device 103.

FIG. 17 is a view illustrating a screen interface relating to a location display according to various embodiments of the present disclosure.

Figure 17A:
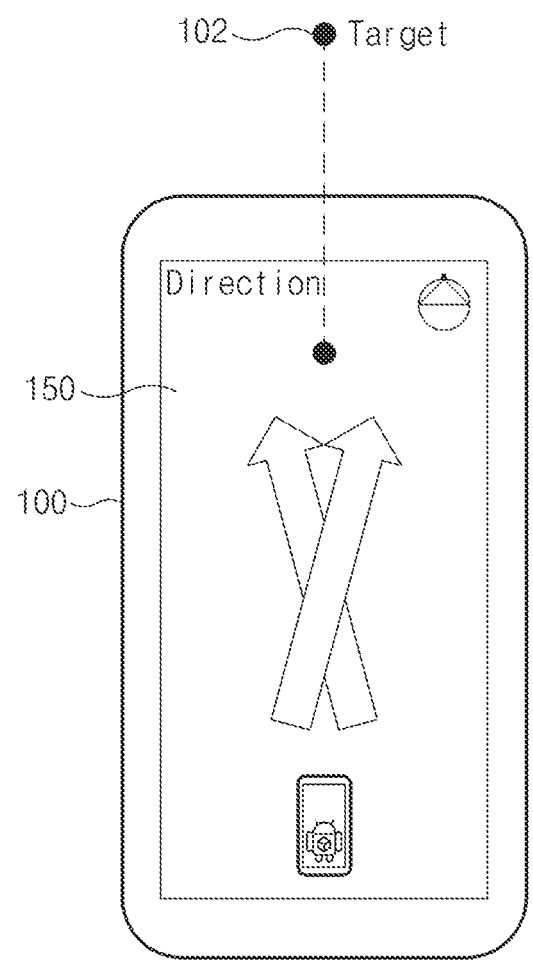
FIGS. 17A and 17B are views illustrating a screen interface relating to a location display according to various embodiments of the present disclosure.
Figure 17B:
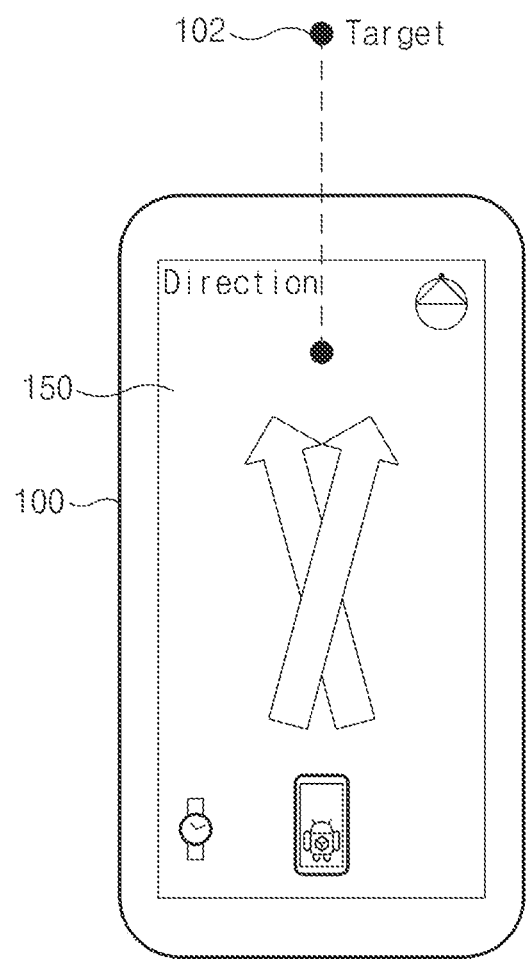

Referring to FIGS. 17A and 17B, as shown in FIG. 17A, the electronic device 100 may display a location value of the external electronic device 102, which is measured based on a single device, on the display 150. For example, the electronic device 100 may display a direction of the external electronic device 102 (for example, a target) by using a plurality of arrows in correspondence to an error range.

Additionally, as shown in FIG. 17B, when a location value of the external electronic device 102 is measured through the collaboration with the wearable device 103, the electronic device 100 may display a measurement value corresponding thereto on the display 150. For example, the electronic device 100 may display a direction of the external electronic device 102 (for example, a target) by using a single arrow having relatively no error range. Herein, the electronic device 100 may display at a lower end of the display 150 that the direction is displayed through the collaboration with the wearable device 103.

Figure 18A:
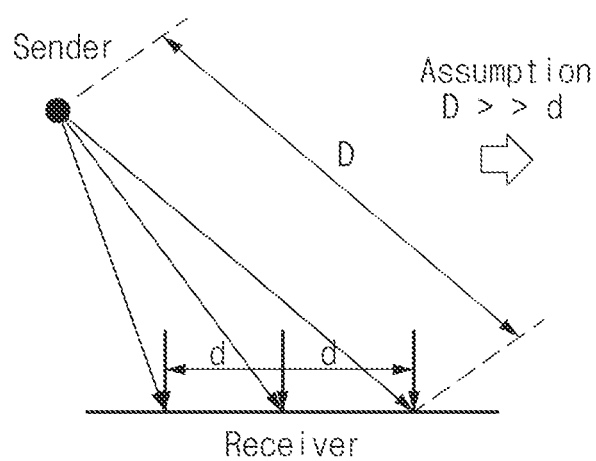
FIGS. 18A and 18B are views illustrating a directivity determination using sensor information according to various embodiments of the present disclosure.
Figure 18B:
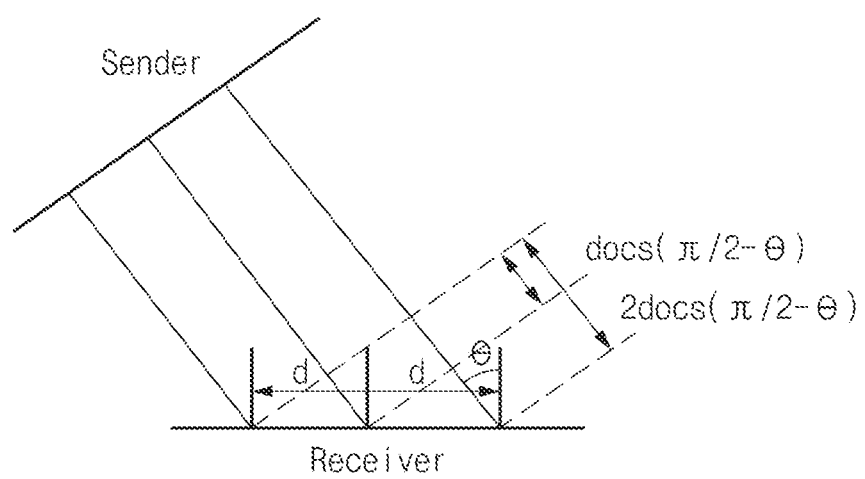

FIGS. 18A and 18B are views illustrating a directivity determination using sensor information according to various embodiments of the present disclosure.

Referring to FIGS. 18A and 18B, a method of determining the directivity of a device (for example, the electronic device 100 or the external electronic device 102) may determine the location of the other party device by using a difference (for example, a phase difference in MIMO) of obtained information. Such a determination method may correspond to a case that a point to be measured and a form are fixed. After checking in what form a measurement is performed currently, the electronic device 100 may process a correction on the current measurement form during a process for measuring an actual direction.

For example, in a WLAN transmission/reception environment using a multi antenna technique, the electronic device 100 or the external electronic device 102 may receive signals by using a multi antenna or may receive signals transmitted from a multi antenna in order to determine the direction of a received signal. The electronic device 100 or the external electronic device 102 may perform a calculation for determining the direction of a transmission electronic device by calculating a phase difference of a received signal.

As shown in the FIG. 18A and the FIG. 18B, when the number of Senders is q and the number of antennas of a receiving device is p, signals that the electronic device 100 or the external electronic device 102 receives are as follows.

$$Y(t) = AS(t) + \eta(t) \quad \text{Equation 1}$$

where A is the same as the following Equation 2

$$A = [\alpha(\theta_1), \ldots, \alpha(\theta_q)] \quad \text{Equation 2}$$

Additionally, a distance difference between a transmission device and a reception electronic device is represented in a phase difference as shown in the following Equation 3.

$$a(\theta_i) = \left[1 \quad e^{-j\frac{2\pi d \sin\theta_i}{\lambda}} \quad \ldots \quad e^{-j(p-1)\frac{2\pi d \sin\theta_i}{\lambda}}\right]^1 \quad \text{Equation 3}$$

During the above calculation process, information on the antenna position of a device that receives signals may be used. The antenna position information may be used with a fixed value.

Figure 19:
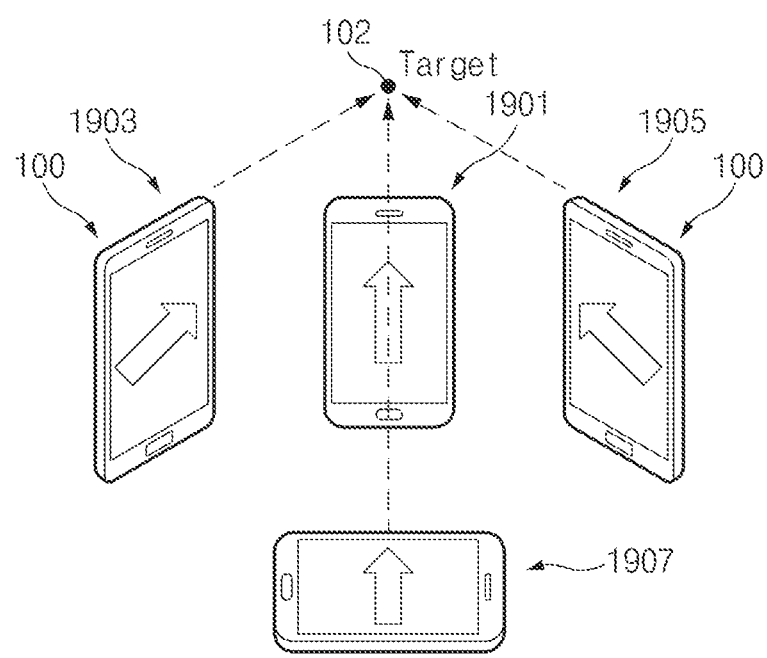
FIG. 19 is a view illustrating a direction determination of an electronic device according to various embodiments of the present disclosure.

FIG. 19 is a view illustrating a direction determination of an electronic device according to various embodiments of the present disclosure.

Although a phase difference used for a location measurement is described with reference to FIG. 18 under the assumption that antenna location information is fixed, the direction of at least one of the electronic device 100 or the external electronic device 102 may be changed. Correspondingly, it is necessary to apply the current state (for example, direction information) of the electronic device 100.

The electronic device 100 may determine which direction it faces currently, at what speed it moves, or whether it lies or stands by utilizing a sensor (for example, an acceleration sensor, a gyro sensor, a barometer, a proximity sensor, an illumination sensor, a gesture sensor, and so on). For example, if the electronic device 100 lies horizontal to the horizon and lies in a state 1901 that the direction of an upper end points to the north direction, the electronic device 100 may measure how the upper end of the electronic device 100 rotates to north, south, east or west, or left or right based on a horizontal plane by using an earth magnetic sensor. For example, the electronic device 100 may obtain a sensing value corresponding to a left predetermined angle rotation state 1903, a right predetermined angle rotation state 1905, the front 90° rotation and left or right direction 90° rotation state 1907. The electronic device may apply the obtained angle value to a phase difference calculation operation of the other party device.

For example, the electronic device 100 may display the display 150 in a vertical direction by using the direction of the external electronic device 102 as the north direction as shown in a state 1901. The electronic device 100 may display the direction of the external electronic device 102 in the upper right direction in a state 1903. The electronic device 100 may display the direction of the external electronic device 102 in the upper left direction in a state 1905. For example, the electronic device 100 may display a form indicating that the direction of the external electronic device 102 is in the north, on the display 150 in a horizontal direction.

Figure 20A:
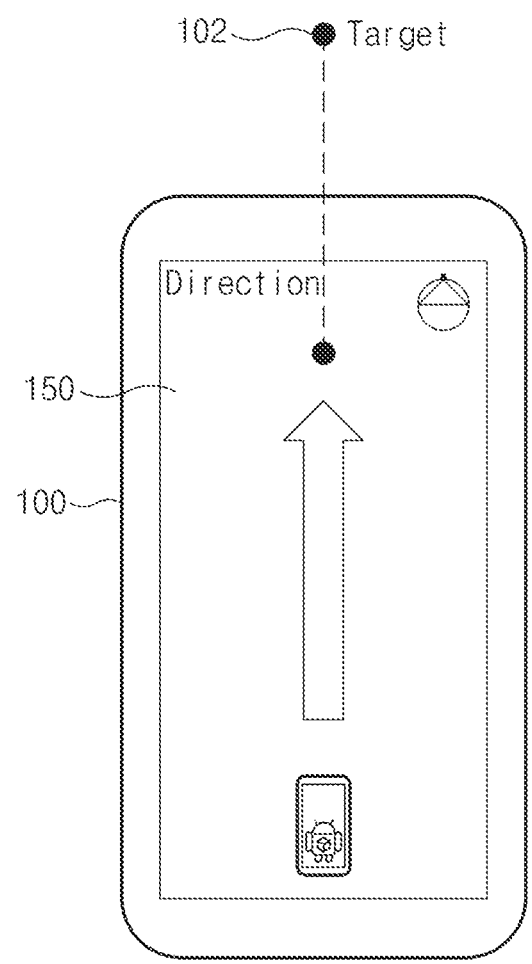
FIGS. 20A and 20B are views illustrating a converted location display according to various embodiments of the present disclosure.
Figure 20B:
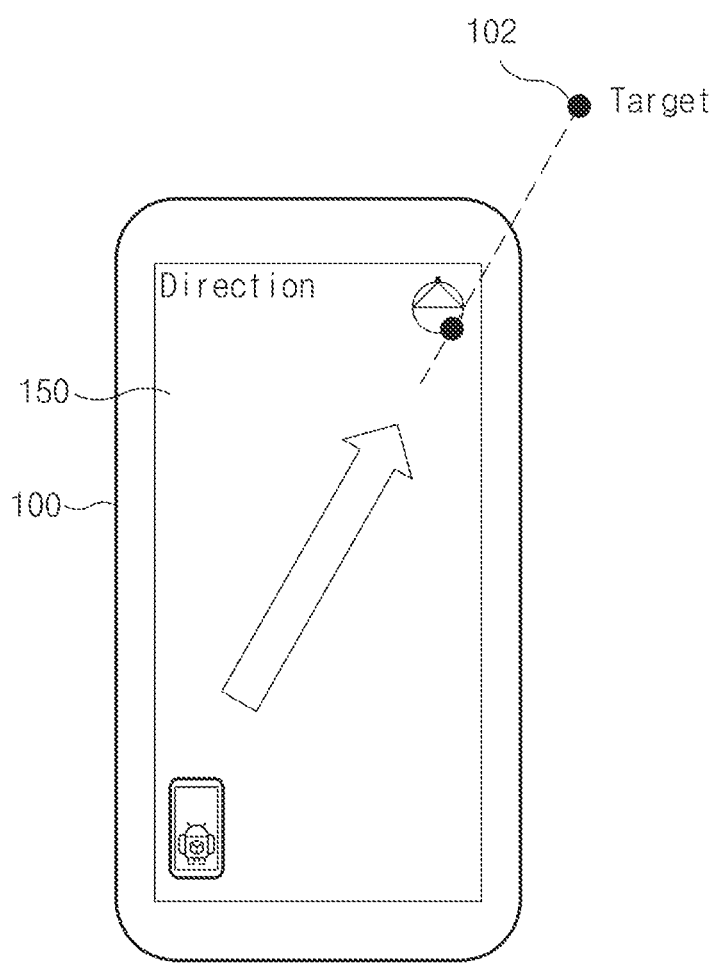

FIGS. 20A and 20B are views illustrating a converted location display according to various embodiments of the present disclosure.

Referring to FIGS. 20A and 20B, the electronic device 100 may measure the location of the external electronic device 102 based on the above-described methods as shown in FIG. 20A and may display this on the display 150. For example, if it is measured that the external electronic device 102 is disposed in the north direction, the electronic device 100 may output direction information corresponding thereto through an arrow as shown in FIG. 20B.

According to various embodiments of the present disclosure, the external electronic device 102 may change its location. For example, the external electronic device 102 may move in the right direction by a predetermined distance as shown in a state 2003. The electronic device 100 may perform a location measurement on the external electronic device 102 in a predetermined period or in real time and when the location of the external electronic device 102 is changed, may re-perform a location measurement corresponding thereto. The electronic device 100 may display the changed location information of the external electronic device 102 on the display 150. During this operation, the electronic device 100 may obtain information on its current state through sensor information and may display direction information in consideration of its direction state and a direction with respect to the external electronic device 102.

Figure 21:
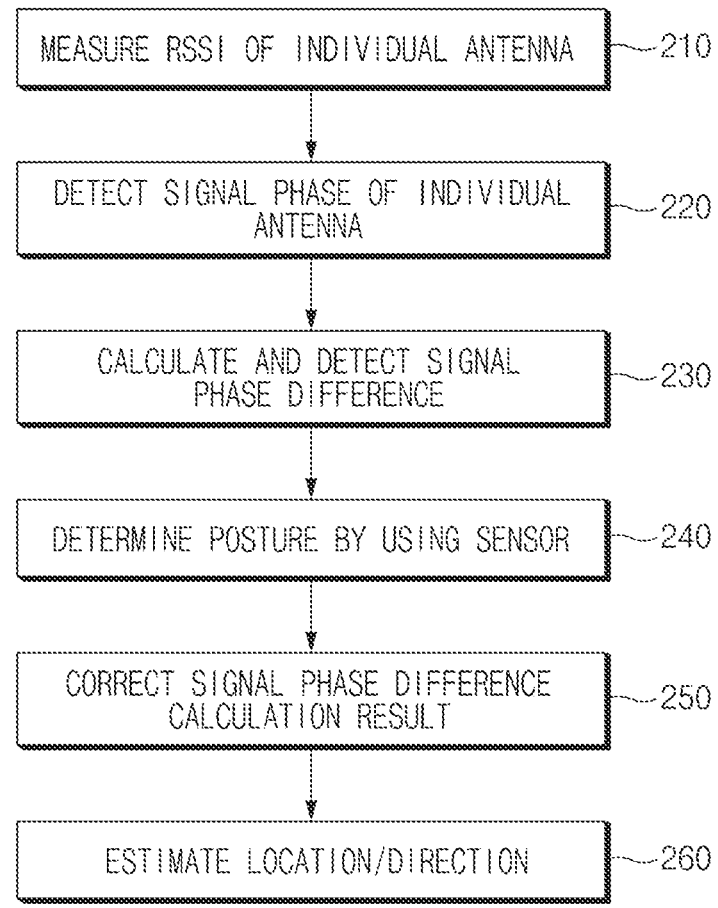
FIG. 21 is a view illustrating a converted location display according to various embodiments of the present disclosure.

FIG. 21 is a view illustrating a converted location display according to various embodiments of the present disclosure.

Referring to FIG. 21, in relation to the phase difference location determining method, in operation 210, upon the receipt of signals, the electronic device 100 may measure the RSSI of an individual antenna. In relation to this, the electronic device 100 may include a multi antenna and may receive a signal of a specified pattern transmitted from the multi antenna. In operation 220, the electronic device 100 may perform a signal phase detection of an individual antenna. In operation 230, the electronic device 100 may perform a signal phase difference calculation and detection.

In operation 240, the electronic device 100a may perform a posture determination of an electronic device by using a sensor. For example, the electronic device 100 may check a changed sensor value based on a specified sensor value of sensors for a specific state to determine the current state. In operation 250, the electronic device 100 may perform a signal phase difference calculation result correction. For example, the electronic device 100 may partially correct a direction according to the calculated phase difference calculation based on the current direction information. In operation 260, the electronic device 100 may perform a location and direction estimation. During this operation, the electronic device 100 may display an estimated location and direction value.

Figure 22:
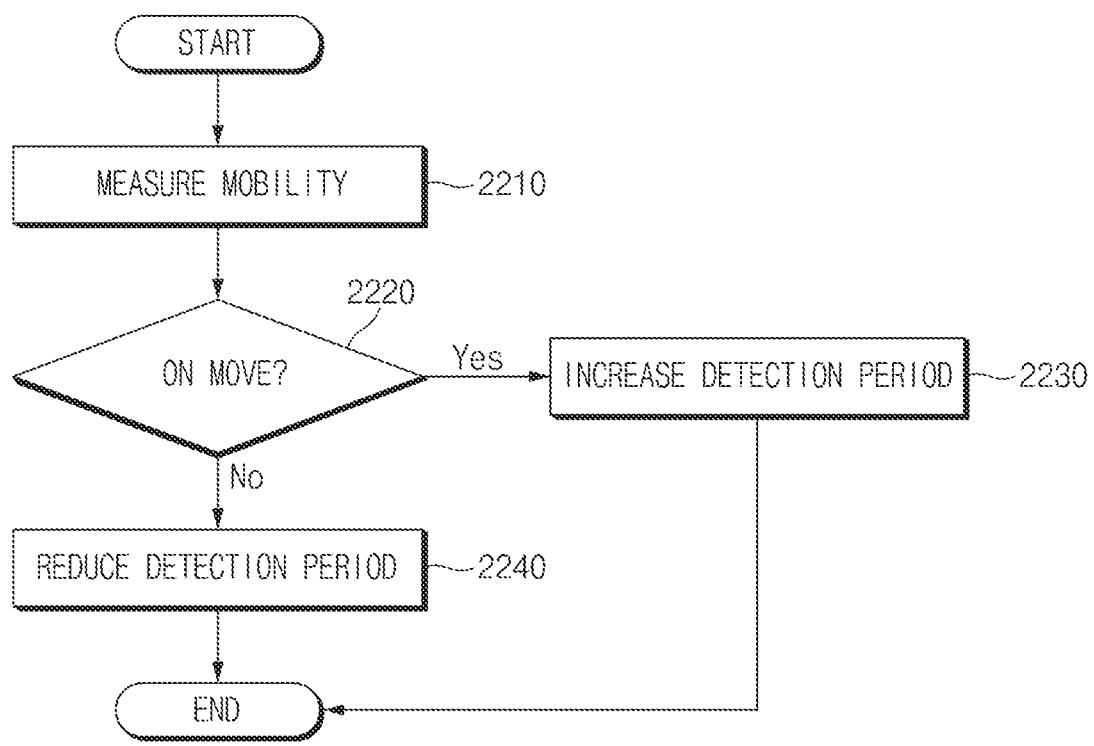
FIG. 22 is a view illustrating a low power location determining method according to various embodiments of the present disclosure.

FIG. 22 is a view illustrating a low power location determining method according to various embodiments of the present disclosure.

Referring to FIG. 22, in relation to the low power location determining method, the electronic device 100 may perform a calculation and trace by using a low power processor such as the sensor hub 180 in a direction and distance determination operation with a target (for example, the external electronic device 102). For example, the electronic device 100 may perform basic calculation and monitoring through the sensor hub 180 and if there is a user's request or there is a meaningful change in a monitored value, or a specific event occurs, may activate an AP to perform an additional calculation and control. For example, the sensor hub 180 only monitors the proximity with respect to a target (for example, the external electronic device 102), and if the target is located within a specific distance, an AP may be activated to obtain more accurate distance or direction information.

In relation to the distance or direction determining method using a low power processor, a multi-processor with a big-little core may be used instead of the sensor hub 180. For example, if it is not necessary to use a high-performance core, the electronic device 100 using a multi core may perform a monitoring on a distance or direction determination in a low power core, and may process information by activating a high-performance core if necessary. For example, a period for searching for the location of a device may be adjusted according to a state that the electronic device 100 moves by using an acceleration sensor.

According to an embodiment of the present disclosure, the electronic device 100 may perform a mobility measurement in operation 2210. In operation 2220, the electronic device 100 may check whether it moves based on the measured value. If it moves, in operation 2230, the electronic device 100 may increase the other party location detection period. If it does not move, in operation 2240, the electronic device 100 may reduce the other party location detection period.

Based on the above-mentioned operation manner, since it is possible that a distance and an angle between devices (for example, the external electronic device 102) to be measured are changed, the electronic device 100 may increase the measurement frequency to improve the accuracy. Additionally, in the case of a fixed environment, the electronic device 100 may lower the frequency relatively to save a resource such as current consumption.

According to various embodiments of the present disclosure, a device searching method may include: recognizing an approach of an external electronic device based on a first communication method; recognizing a location by at least one of transmitting a specified signal to and receiving the specified signal from the approach-recognized external electronic device based on a second communication method; and correcting location or direction information recognized based on state information itself.

According to various embodiments of the present disclosure, the recognizing of the approach may include receiving a signal of a BLE based specified pattern.

According to various embodiments of the present disclosure, the recognizing of the location may include: transmitting a location measurement request message to the external electronic device; receiving a location measurement response from the external electronic device; and calculating a relative location based on a location value calculated by the external electronic device and a location value calculated based on the location measurement response signal.

According to various embodiments of the present disclosure, the method may further include transmitting a location measurement request message including a location measurement value based on the location measurement response signal to the external electronic device a specified number of times.

According to various embodiments of the present disclosure, the recognizing of the location may include at least one of: receiving a first set of signals by using a multi antenna and calculating a location based on a phase difference of the first set of received signals; and receiving a second set of signals transmitted by using a multi antenna and calculating a location based on a phase difference of the second set of received signals.

According to various embodiments of the present disclosure, the recognizing of the location may include at least one of transmitting and receiving the specified signal a specified number of times or until a specified event occurs and calculating an average value of a plurality of collected location measurement values as a location value.

According to various embodiments of the present disclosure, the method may further include transmitting a message for guiding a location measurement stop to the external electronic device.

According to various embodiments of the present disclosure, the method may further include obtaining changed state information by using sensor information obtained by at least one sensor based on sensor information corresponding to a specified state.

According to various embodiments of the present disclosure, the method may further include at least one of collecting a calculated location according to the state information; and displaying a location according to the correction value.

According to various embodiments of the present disclosure, the method may further include: checking whether a distance or direction with respect to the external electronic device satisfies a specified condition; and performing a specified service activation in correspondence to a specified condition satisfaction and outputting information according to the specified service activation.

As mentioned above, according to various embodiments of the present disclosure, a device searching method may include: recognizing the approach of an external electronic device by operating at least one first communication module among a plurality of communication modules in a first communication method; recognizing a location by at least one of transmitting a specified signal to and receiving the specified signal from an external electronic device of which approach is recognized by operating at least one communication module (for example, a communication module identical to the first communication module or at least one second communication module different from the first communication module) among the plurality of communication modules in a second communication method; and correcting recognized location or direction information based on its state information.

According to various embodiments of the present disclosure, the method may include: checking a movement state based on the sensor information; recognizing the approach and the location in correspondence to the size of the movement state; and adjusting a performance period of a correction operation.

According to various embodiments of the present disclosure, the method may perform a performance period of checking a movement state based on the sensor information; recognizing the approach and the location when a movement is greater than a specified value; and performing a correction operation to be relatively short.

According to various embodiments of the present disclosure, the method may perform a performance period of checking a movement state based on the sensor information; recognizing the approach and the location when a movement is less than a specified value; and performing a correction operation to be relatively long.

Figure 23:
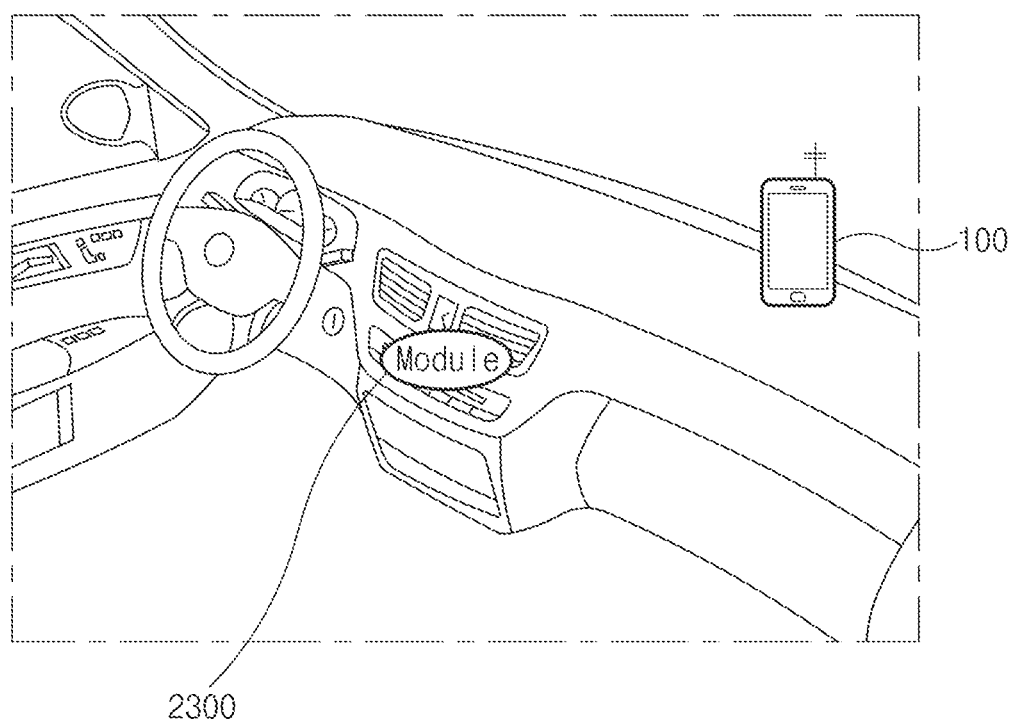
FIG. 23 is a view illustrating a location determination between vehicles according to various embodiments of the present disclosure.

FIG. 23 is a view illustrating a location determination between vehicles according to various embodiments of the present disclosure.

Referring to FIG. 23, for example, an electronic control module 2300 for communicating with the electronic device 100 may be disposed in a vehicle. For example, the electronic control module 2300 may be an adaptive location information providing module for providing BLE and WLAN signals to a center fascia. The electronic device 100 may estimate user's boarding position information while boarding a vehicle based on communication with the electronic control module 2300.

The estimated boarding information may be utilized as basic information for another operation in the electronic device 100. For example, a method of switching to a driver mode automatically by identifying a driver and a passenger from users connected to Bluetooth of a vehicle or controlling the usage of an electronic device during driving may be applied. Additionally, as determining an object's approach distance or direction by using closed-circuit television (CCTV) through the above-mentioned location determination technique, the actual monitoring range of the CCTV may be expanded. According to various embodiments of the present disclosure, the above-mentioned location determination technique may find the location and direction a user having the electronic device 100 fast in disaster situations such as fire, sinking, landslides, and earthquakes.

Figure 24:
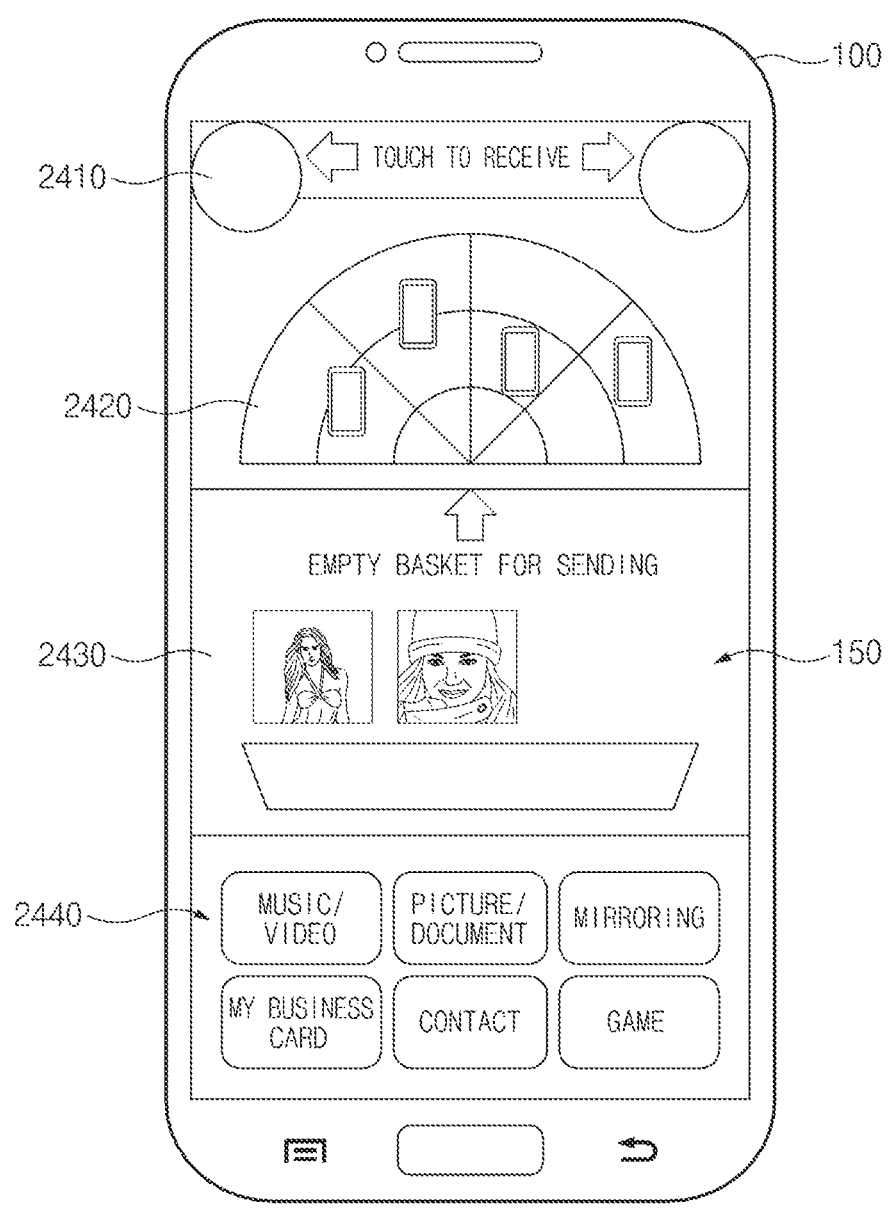
FIG. 24 is a view illustrating an external electronic device display according to various embodiments of the present disclosure.

FIG. 24 is a view illustrating an external electronic device display according to various embodiments of the present disclosure.

Referring to FIG. 24, the electronic device 100 may search for a plurality of external electronic devices and may differently display the found devices. For example, the electronic device 100 may provide a search range 2420, and may display the locations of external devices found in the search range 2420 as images or icons. During this operation, the electronic device 100 may visually display the distribution and locations of the found external electronic devices.

According to various embodiments of the present disclosure, the electronic device 100 may display an area 2440 for content items provided based on a communication connection with external electronic devices. Additionally, the electronic device 100 may receive profile information (for example, picture information) from the found external electronic devices and may output this to a specified area 2430. According to various embodiments of the present disclosure, external electronic devices may transmit content such as specific advertisements or images to the electronic device 100. In relation to this, the electronic device 100 may output an item 2410 for determining whether to receive content transmitted from external electronic devices.

Figure 25:
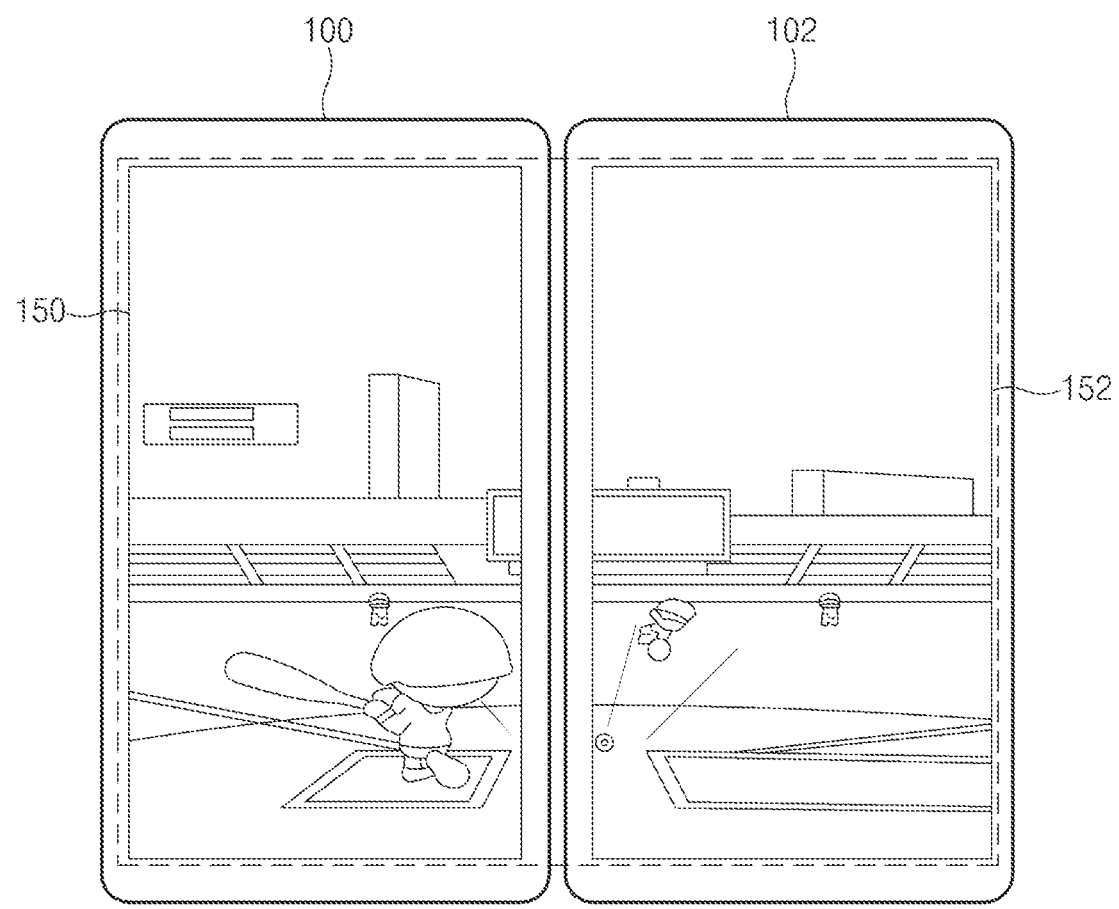
FIG. 25 is a view illustrating a screen display according to the other party location determination according to various embodiments of the present disclosure.

FIG. 25 is a view illustrating a screen display according to the other party location determination according to various embodiments of the present disclosure.

Referring to FIG. 25, the electronic device 100 and the external electronic device 102 may perform a mutual location determination and may control content display in correspondence to the determination value. For example, the electronic device 100 may determine a distance or a direction with respect to the external electronic device 102 in correspondence to a specified event occurrence. When a distance or a direction with respect to the external electronic device 102 satisfies a condition corresponding to a specified distance or direction, the electronic device 100 may play specified content automatically. The played content screen may be outputted to the display 150. According to various embodiments of the present disclosure, the electronic device 100 may automatically transmit content in playback to at least one external electronic device 102 within a specified distance or direction.

In a standby state or a specified content playback or specific screen (for example, a home screen) output state, if a distance or a direction with respect to the electronic device 100 satisfies a specified condition, the external electronic device 102 may receive and output content that the electronic device 100 transmits. For example, the external electronic device 102 may output the received content to the display 152.

Figure 26:
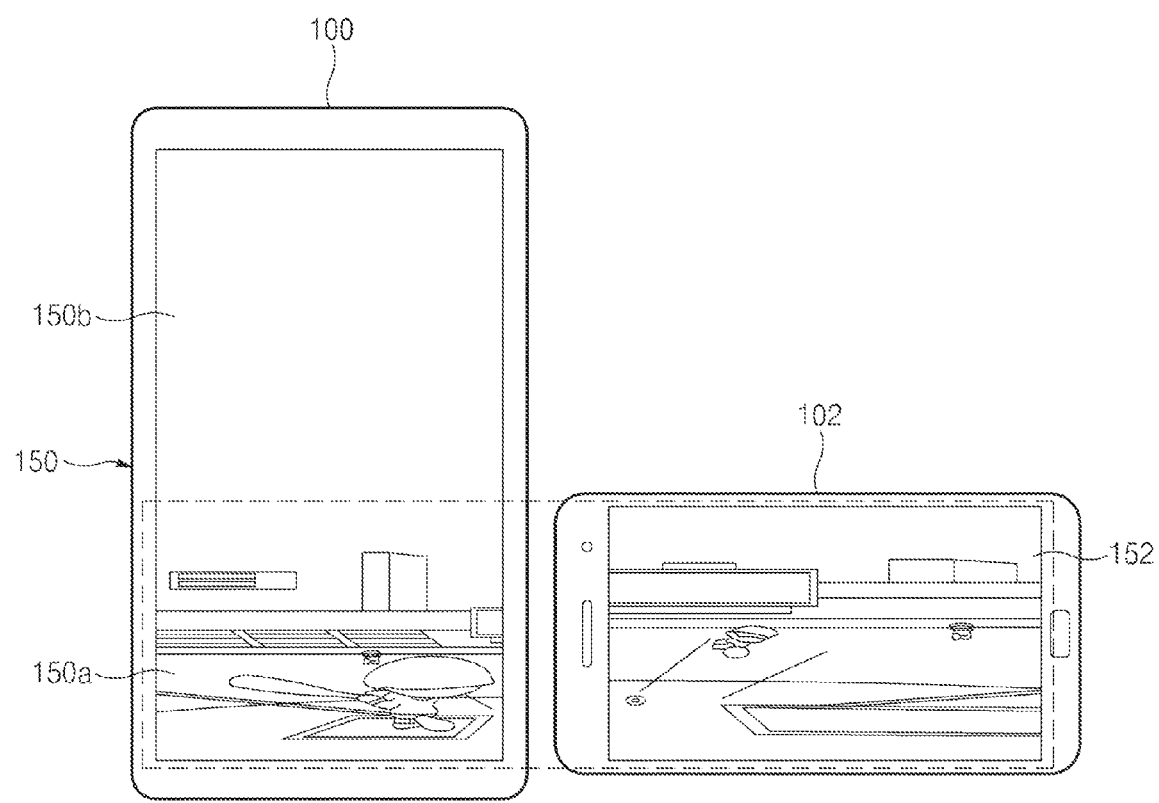
FIG. 26 is a view illustrating a screen display depending on the other party location determination according to various embodiments of the present disclosure.

FIG. 26 is a view illustrating a screen display depending on the other party location determination according to various embodiments of the present disclosure.

Referring to FIG. 26, if a specified distance or direction condition is satisfied, the electronic device 100 or the external electronic device 102 may share content. Correspondingly, the electronic device 100 and the external electronic device 102 may divide a screen relating to a specified content playback and output it. During this operation, the external electronic device 102 may deliver its current state, for example, information corresponding to a horizontal arrangement state, to the electronic device 102. The electronic device 100 may adjust an output direction of a screen shared with the external electronic device 102 in a content playback screen and then, may output it to the external electronic device 102. Additionally, the electronic device 100 may adjust the output direction of content outputted to the display 150 to correspond to a vertical arrangement state of the external electronic device 102. Correspondingly, the electronic device 100 and the external electronic device 102 may display a continuous content playback screen on the display 150 and the display 152 in a continuous form.

According to an embodiment of the present disclosure, the electronic device 100 may dispose a continuous content area 150*a* to be aligned with the external electronic device 102 in relation to a continuous screen output with respect to the external electronic device 102. Correspondingly, the electronic device 100 may output an empty area 150*b* to the display 150.

Figure 27:
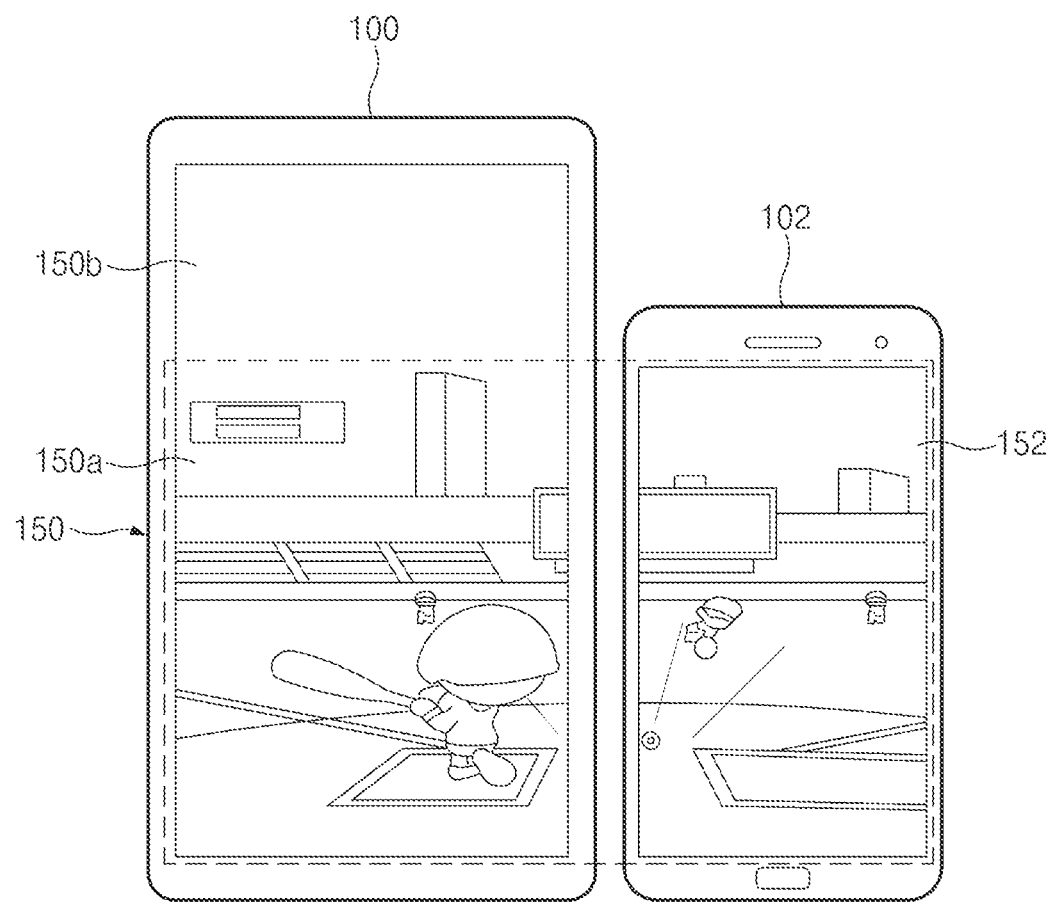
FIG. 27 is a view illustrating a screen display depending on the other party location determination and device characteristics according to various embodiments of the present disclosure.

FIG. 27 is a view illustrating a screen display depending on the other party location determination and device characteristics according to various embodiments of the present disclosure.

Referring to FIG. 27, when the external electronic device 102 is within a specified distance or direction, the electronic device 100 may receive device characteristic information such as a model name, a screen size, and an available resolution, from the external electronic device 102. Alternatively, the electronic device 100 may transmit the device characteristic information to the external electronic device 102.

The electronic device 100 or the external electronic device 102 may consult with the screen ratio of content to be played and as shown in the drawing, may output it to the display 150 or the display 152. For example, the electronic device 100 may check the size of the display 152 of the external electronic device 102, and may output an area according to content playback to a partial area of the display 150 in relation to the continuous content display function execution. The external electronic device 102 may output a partial area in a playback screen of content shared with the electronic device 100 to the display 152 in full screen. As mentioned above, the electronic device 100 may adjust the aspect ratio according to a content playback in correspondence to the specified condition satisfaction of a distance or a direction with respect to the external electronic device 102. The electronic device 100 may output a continuous content area 150*a* continuous from the external electronic device 102 and correspondingly, may output an empty area 150*b* to the display 150.

Figure 28:
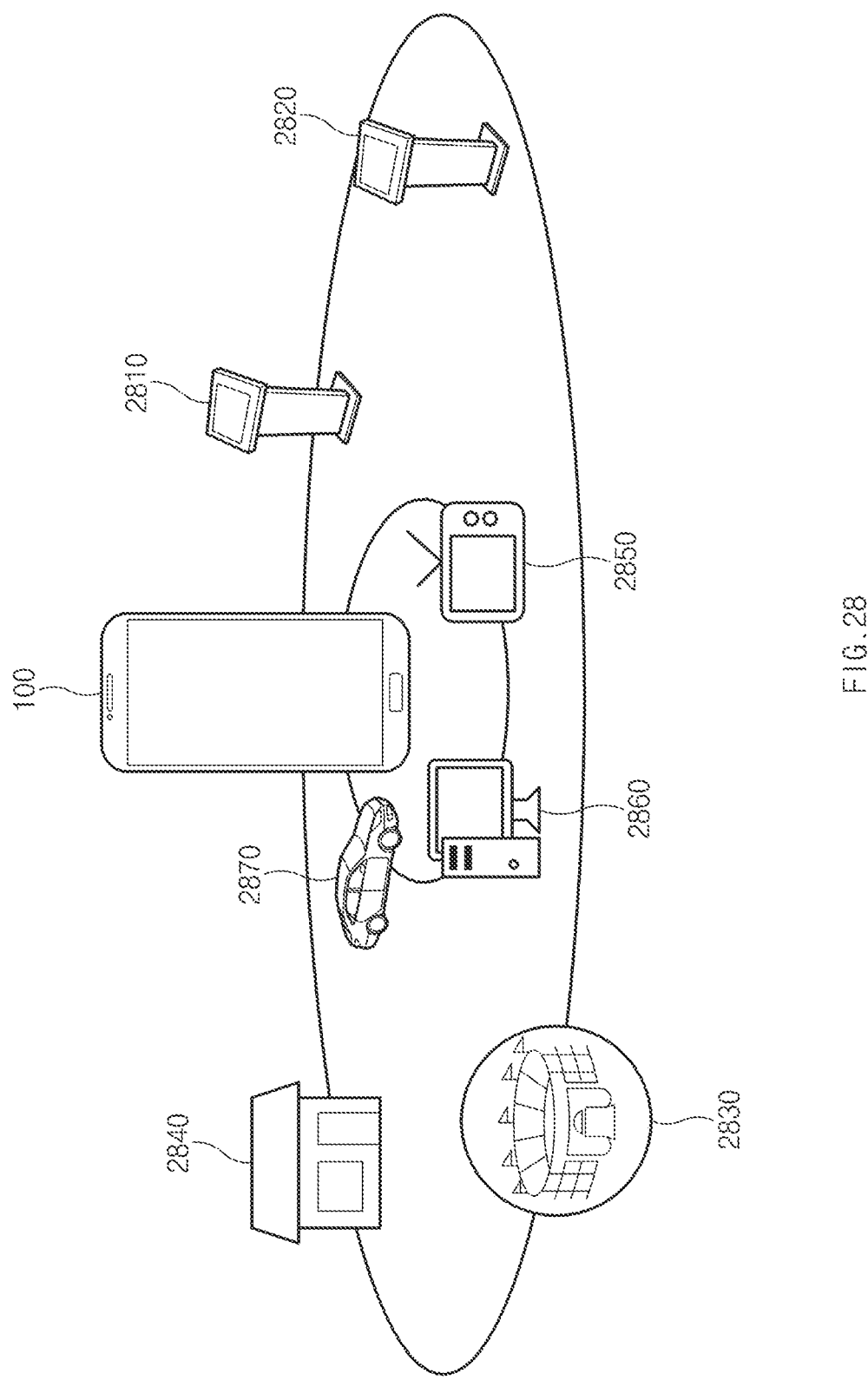
FIG. 28 is a view illustrating a peripheral device search notification according to various embodiments of the present disclosure.

FIG. 28 is a view illustrating a peripheral device search notification according to various embodiments of the present disclosure.

Referring to FIG. 28, the electronic device 100 may move a predetermined zone where at least one external electronic device is disposed. In this case, when entering a specified distance or direction with respect to a specific external electronic device, the electronic device 100 may receive specified information from an external electronic device. For example, when the electronic device 100 is disposed at a predetermined location, it may perform a location determination on external electronic devices 2850, 2860, and 2870. If the external electronic devices 2850, 2860, and 2870 are disposed within a specified distance or direction, the electronic device 100 may at least one of transmit and receive a distribution location or specified information of corresponding external electronic devices.

According to various embodiments of the present disclosure, the electronic device 100 may be located at a specified distance or direction (for example, 50 meters to the west) with respect to the external electronic device 2810. In this case, the electronic device 100 may receive kiosk information about a movie ticket discount with smartphone payment, from the external electronic device 2810. Additionally, the electronic device 100 may be located at a specified distance or direction (for example, 100 meters to the east) with respect to the external electronic device 2820. In this case, the electronic device 100 may receive parking fee information from the external electronic device 2820. The electronic device 100 may be located at a specified distance or direction (for example, 150 meters to the south) with respect to the external electronic device 2830. In this case, the electronic device 100 may receive seat information in a baseball stadium from the external electronic device 2830. For this, the electronic device 100 may transmit its identification information or its booking information to the external electronic device 2830. According to various embodiments of the present disclosure, the electronic device 100 may be located at a specified distance or direction (for example, 150 meters to the south) with respect to the external electronic device 2840. In this case, the electronic device 100 may receive sale information on a specified product from the external electronic device 2840.

According to various embodiments of the present disclosure, the electronic device 100 may be used to search for an external electronic device registered as a friend in a street or a crowded plaza. For example, the electronic device 100 may estimate the location of an external electronic device owned by a friend in a crowded space by estimating the position and distance of the external device that a user wants to find at the current location. Additionally, the electronic device 100, as mentioned above, may support a seat search in a stadium or a concert hall. In relation to this, each seat may transmit a specified signal. The electronic device 100 may provide distance or direction information with respect to a corresponding seat and the current location by receiving signals transmitted from a seat. The electronic device 100 may provide a seat search navigation function by providing map information of a stadium together. For example, the electronic device 100 may receive BLE and WLAN information relating to seat information through an NFC tag included in an admission ticket at the time of purchase. The electronic device 100 may perform a seat search based on a corresponding information search. At this point, information provided may support a desired location search in a chain form by providing a plurality of BLE-WLAN sets in addition to one BLE-WLAN information set. When utilizing the information in a chain form, the electronic device 100 may provide an indoor navigation function.

Figure 29:
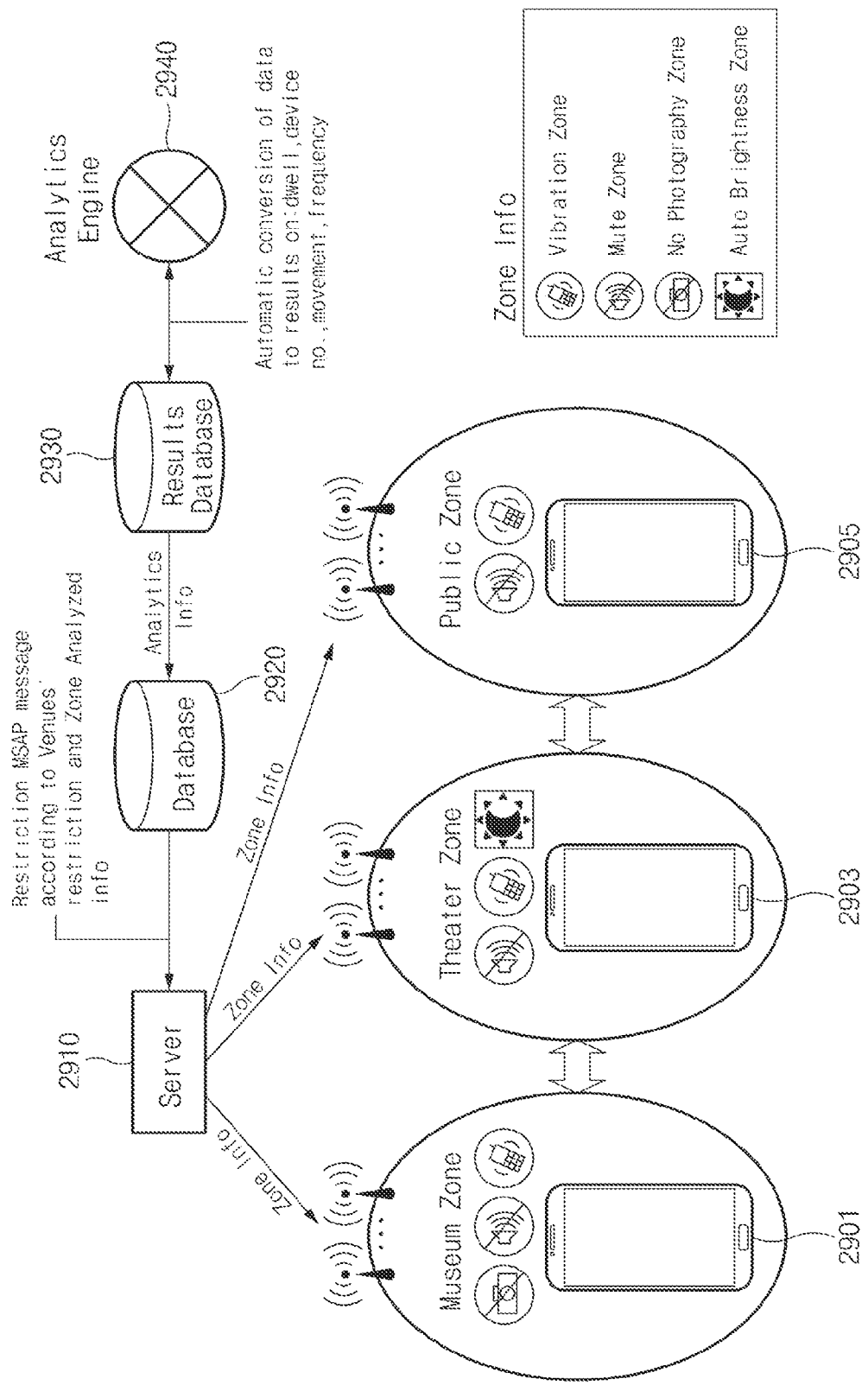
FIG. 29 is a view illustrating a specific place determination according to various embodiments of the present disclosure.

FIG. 29 is a view illustrating a specific place determination according to various embodiments of the present disclosure.

Referring to FIG. 29, electronic devices 2901, 2903, and 2905 may be respectively located at a museum area, a theater area, and a public place area. In this case, a location information providing server 2910 may respectively provide museum information, theater information, and public place information to the electronic devices 2901, 2903, and 2905. The location information providing server 2910 may receive location information and identification information of the electronic devices 2901, 2903, and 2905 from an electronic device related database 2920. The electronic device related database 2920 may receive location information of electronic devices from a result database 2930. An analytic engine 2940 may analyze location information of specific electronic devices in link with location information provided from electronic devices.

The electronic devices 2901, 2903, and 2905 may limit a user function to be used in correspondence to being located at a specific area. For example, an electronic device may automatically change into a function limit mode such as a silent mode at a specific area such as a theater.

Figure 30:
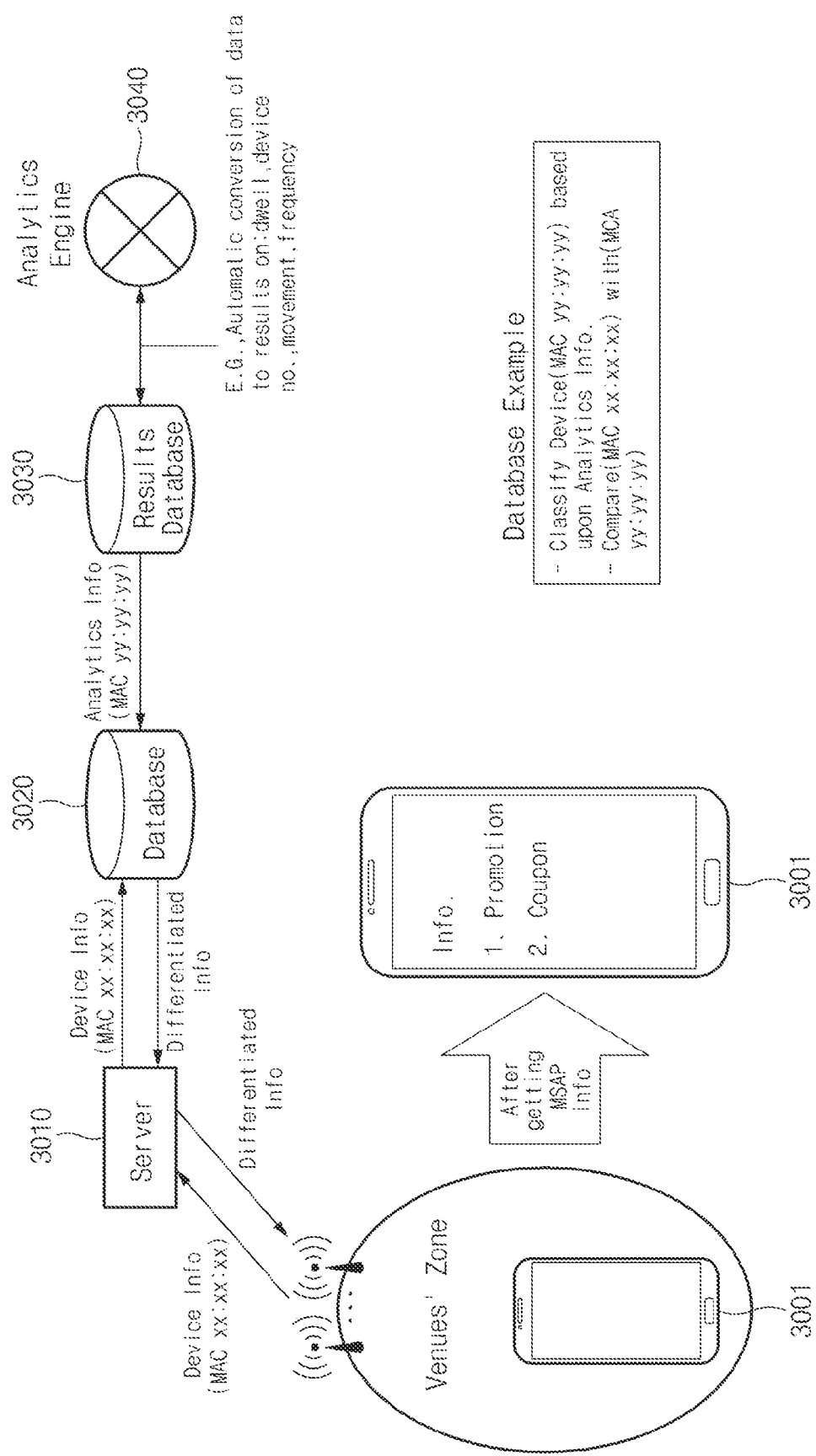
FIG. 30 is a view illustrating a location-based differentiated service according to various embodiments of the present disclosure.

FIG. 30 is a view illustrating a location-based differentiated service according to various embodiments of the present disclosure.

Referring to FIG. 30, an analytic engine 3040 may analyze a movement state of an electronic device 3001 by utilizing its device information, movement information, and frequency information. The analytic engine 3040 may deliver the obtained movement state information of the electronic device 3001 to an electronic device related database 3020 through a result database 3030. A location information providing server 3010 may provide special information based on the electronic device related database 3020 when the electronic device 3001 enters a given specific area (for example, the Venuses' Zone). For example, the location information providing server 3010 may provide special promotion information or coupon information to the corresponding electronic device 3001. The electronic device related database 3020 may determine the current location and direction of the electronic device 3001 based on MAC address analysis and comparison thereof.

Figure 31:
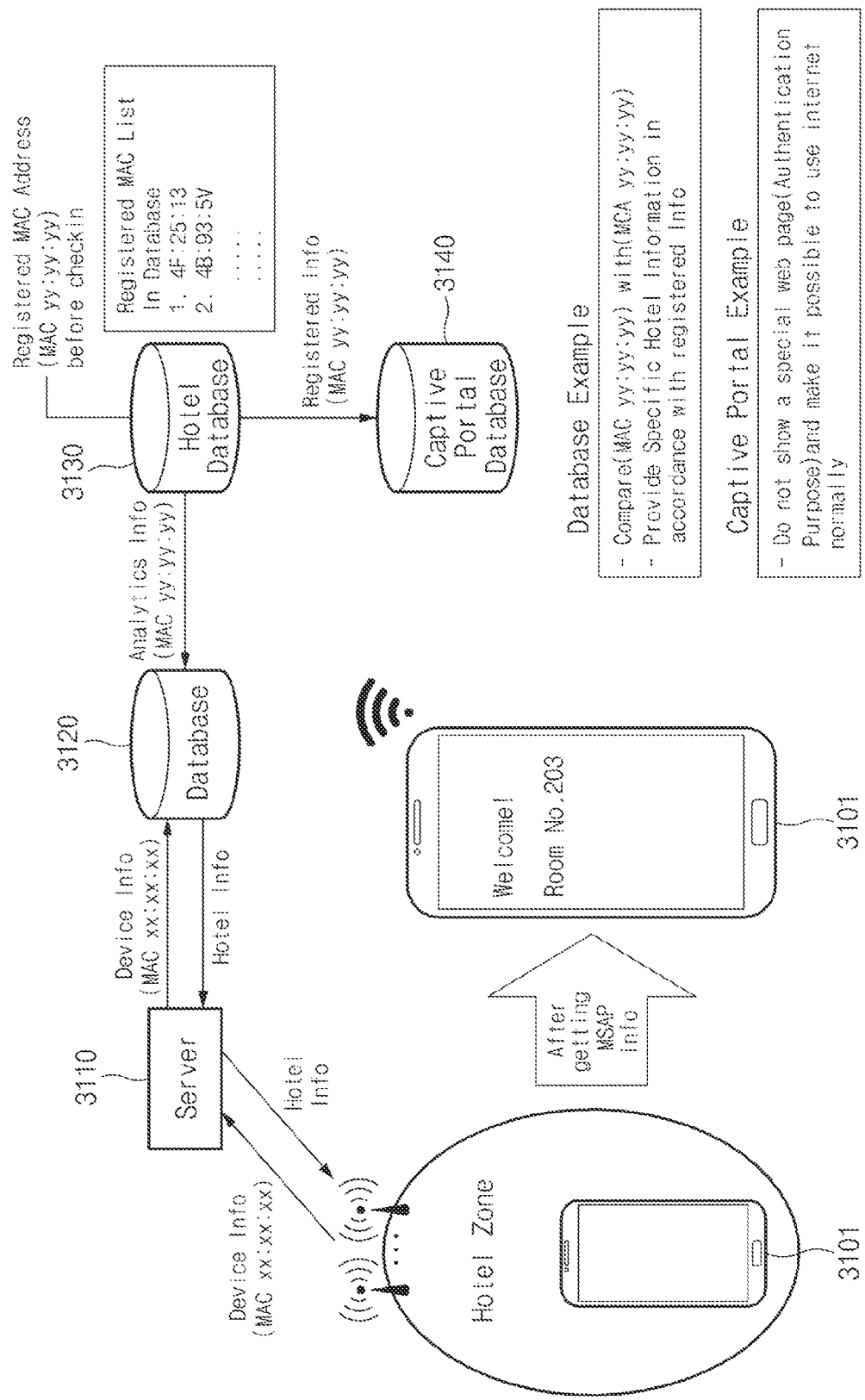
FIG. 31 is a view illustrating a differentiated service in a hotel area according to various embodiments of the present disclosure.

FIG. 31 is a view illustrating a differentiated service in a hotel area according to various embodiments of the present disclosure.

Referring to FIG. 31, an electronic device 3101 may be located in a specified area, for example, a hotel. In this case, a location information providing server 3110 may provide hotel related information to the electronic device 3101 located at a hotel. For example, when the electronic device 3101 is located in a specified hotel area, the location information providing server 3110 may deliver service advertisement information that a hotel provides to the electronic device 3101. Alternatively, the location information providing server 3110 may receive identification information or hotel reservation information from the electronic device 3101. In this case, the location information providing server 3110 may provide available service information in the case of a hotel subscriber, for example, room information and information on free of charge according to a booking class.

The electronic device related database 3120 may determine the current location and direction of the electronic device 3101 based on MAC address analysis and comparison thereof.

In relation to the service provision, the location information providing server 3110 may access a hotel database 3130. The location information providing server 3110 may collect service information to be provided to the electronic device 3101, from the hotel database 3130. The hotel database 3130 may support hotel service information update through a portal database 3140 providing an internet connection service.

According to various embodiments of the present disclosure, the hotel database 3130 may store and manage MAC address information of access points supporting a wireless interface service. When the electronic device 3101 is located within a specified area, the hotel database 3130 may provide MAC address information to be allocated to the corresponding electronic device 3101 to the electronic device 3101 through the location information providing server 3110.

According to various embodiments of the present disclosure, the location information providing server 3110 may provide hotel service information as entering a hotel direction by recognizing a direction that the electronic device 3101 accesses. For example, the location information providing server 3110 may transmit a welcome message to the electronic device 3101, send room reservation information if there is booking information based on the corresponding electronic device 3101, and provide room key information if the electronic device 3101 is equipped with NFC.

Figure 32:
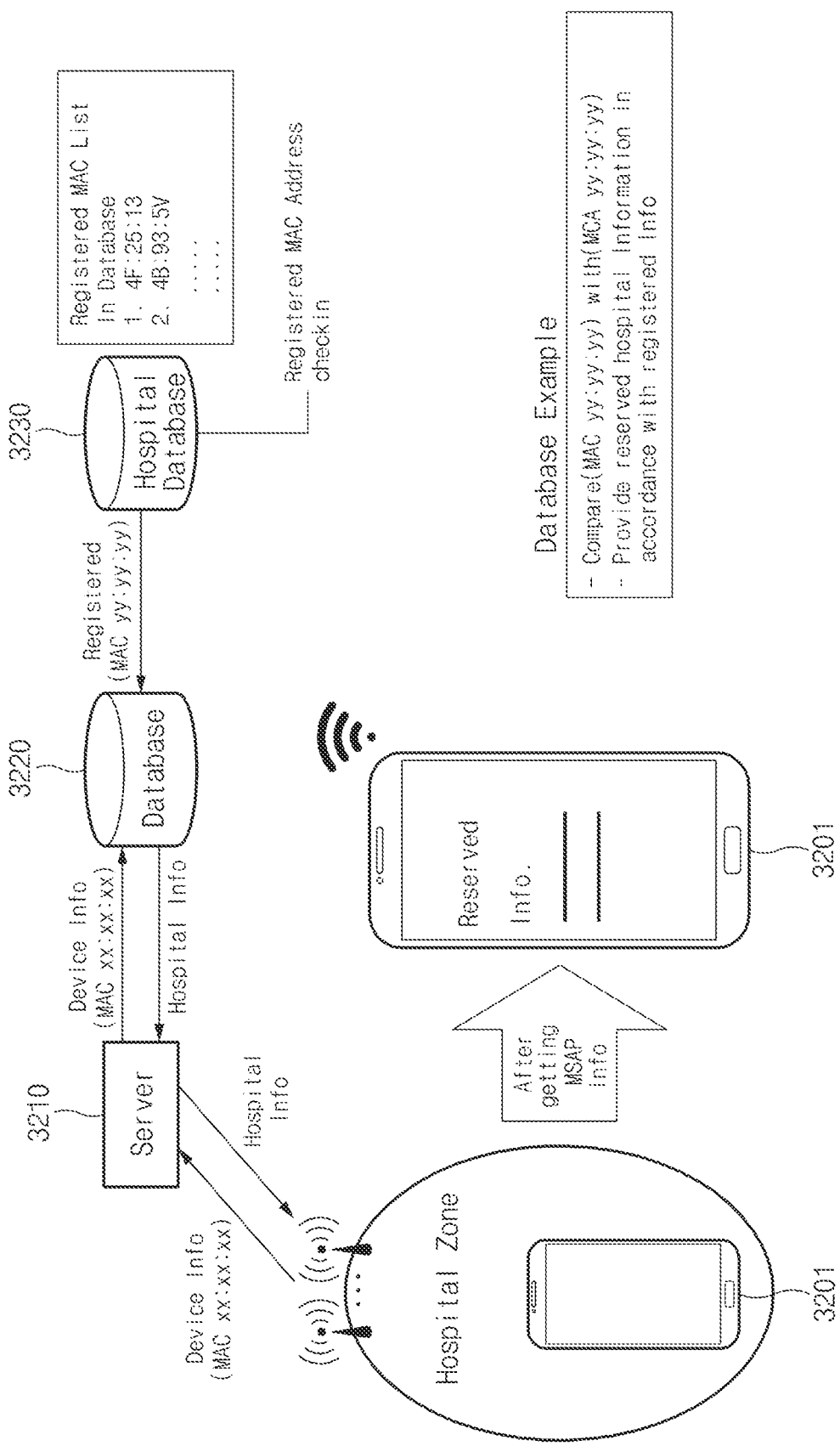
FIG. 32 is a view illustrating a differentiated service in a hospital area according to various embodiments of the present disclosure.

FIG. 32 is a view illustrating a differentiated service in a hospital area according to various embodiments of the present disclosure.

Referring to FIG. 32, when an electronic device 3201 is located in a specified area, for example, a hospital, it may provide device information to a location information providing server 3210. The location information providing server 3210 may provide hospital related information to an electronic device 3201 based on device information of the electronic device 3201. In relation to this, the location information providing server 3210 may access an electronic device related database 3220 and may provide hospital related information corresponding to device information after providing the device information to the electronic device related database 3220. The electronic device related database 3220 may collect registered information from a hospital database 3230. For example, the electronic device related database 3220 may receive a MAC address relating to an access point or an external electronic device that a hospital operates from the hospital database 3230.

As the electronic device 3201 is located in a specified area such as a hospital, it may receive specified information from the location information providing server 3210 and may output this to a display. For example, when the electronic device 3201 enters a communication available range, the location information providing server 3201 may provide hospital booking information relating to the electronic device 3201 (for example, hospital appointment information and physician information) to the electronic device 3201.

According to various embodiments of the present disclosure, the hospital database 3230 may maintain and manage various hospital records for the electronic device 3201. According to the permission of the electronic device 3201, medical records in the electronic device 3201 after treatment in a specified hospital may be automatically shared with another hospital based on the hospital database 3230. Alternatively, if the electronic device 3201 enters a specified hospital area while storing medical records, it may receive a stored medical record sharing request.

Figure 33:
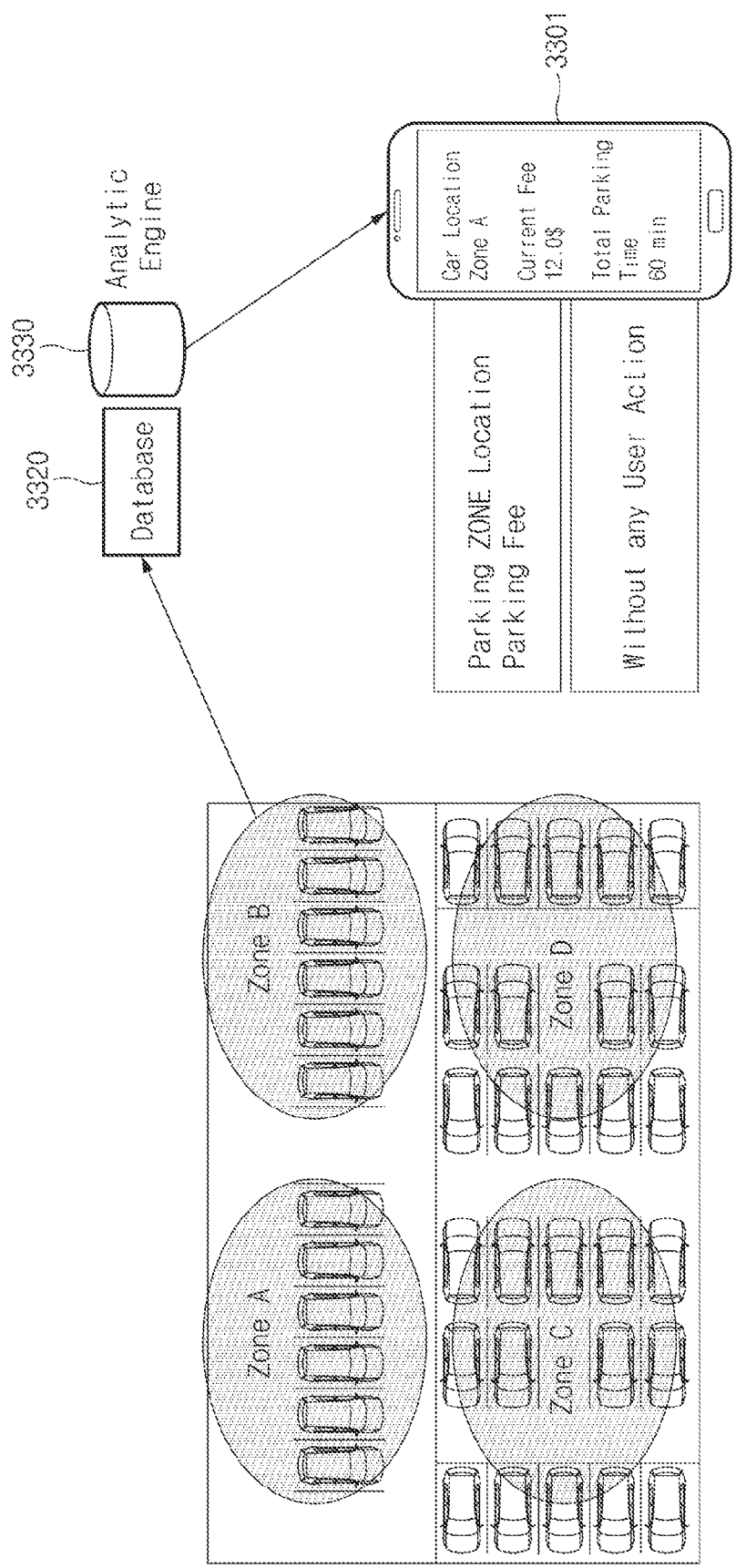
FIG. 33 is a view illustrating parking service according to various embodiments of the present disclosure.

FIG. 33 is a view illustrating parking service according to various embodiments of the present disclosure.

Referring to FIG. 33, an analytic engine 3330 may perform an approach information check and a distance or direction information check of an electronic device 3301 and may store this in an electronic device related database 3320. The electronic device related database 3320 may include at least one external electronic device located at a parking lot, for example, an access point. Alternatively, when the electronic device 3301 enters a specified parking area, the electronic device related database 3320 may determines a distance or a direction between the electronic device 3301 and may provide parking lot related information to the electronic device 3301. For example, the electronic device related database 3320 may provide information on a parking area (e.g., zones A, B, C, and/or D) and information on a parking fee according to a time elapse to the electronic device 3301. Additionally, the electronic device related database 3320 may provide a navigation relating to a vehicle location detection. In relation to this, the electronic device 3301 may analyze a distance or direction with respect to a vehicle. If a vehicle is parked in a specific parking area, location information and stay time information for this may be collected and if the electronic device 3301 enters within a specified distance, corresponding information may be provided.

Figure 34:
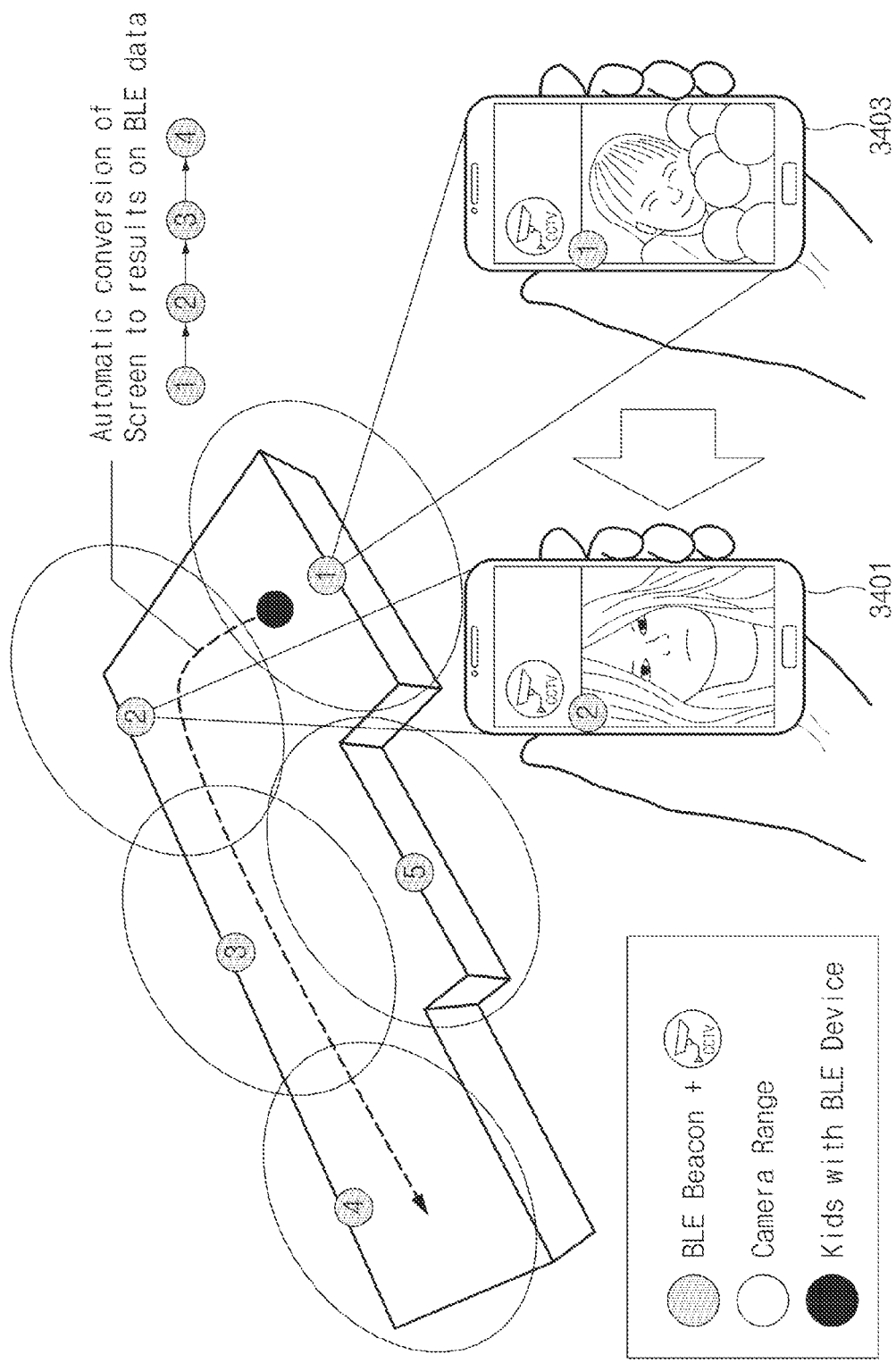
FIG. 34 is a view illustrating an image detection service according to various embodiments of the present disclosure.

FIG. 34 is a view illustrating an image detection service according to various embodiments of the present disclosure.

Referring to FIG. 34, an electronic device may execute an image detection function on a specific zone. For example, when a person having an external electronic device enters a zone where at least one camera is installed and moves, a camera device may perform picture capturing based on the recognition of an external electronic device. The camera device may transmit a captured picture to a specified electronic device. Based on this, when a specified external electronic device is located in a specific zone, an electronic device may output a surrounding image relating to a corresponding external electronic device. For example, when a person having a specified external electronic device is located in a first zone, an image obtained by a camera device for capturing a corresponding zone may be provided to an electronic device and outputted as shown in an electronic device 3403. Additionally, when a person having a specified external electronic device is located in a second zone, an image obtained by a camera device may be provided to an electronic device and outputted as shown in an electronic device 3401. According to various embodiments of the present disclosure, camera devices may be set to transmit images captured from the second zone to the electronic device 3401 responsible for the second zone and transmit images captured from the first zone to the electronic device 3403.

Figure 35:
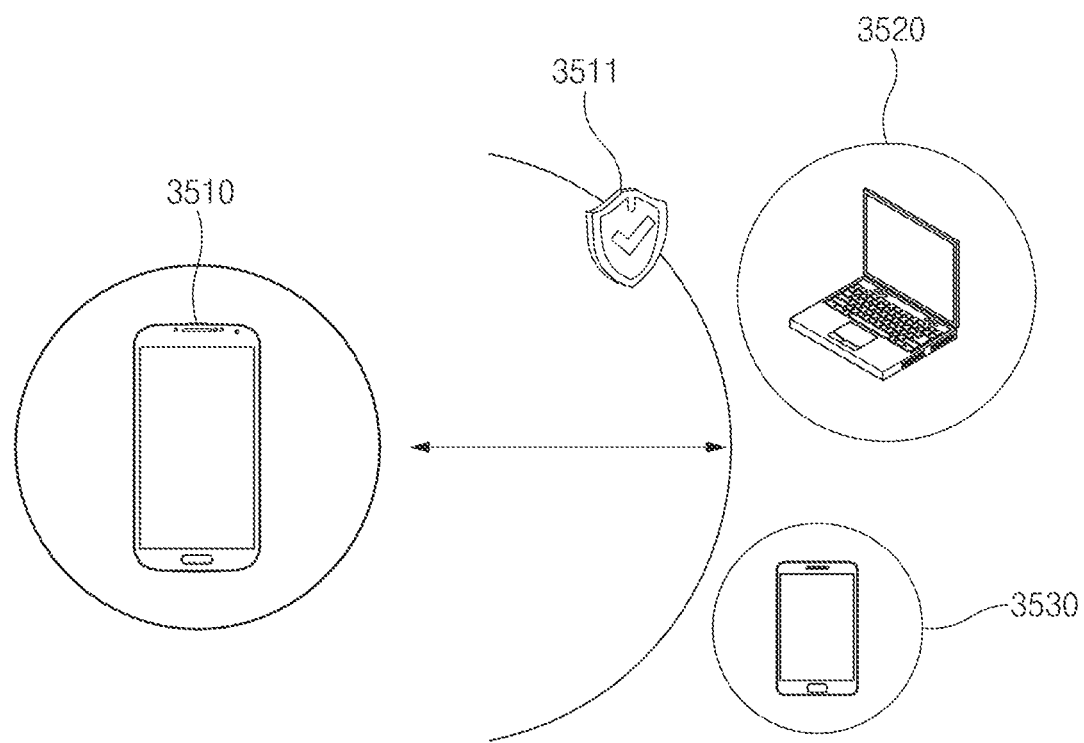
FIG. 35 is a view illustrating an access security control according to various embodiments of the present disclosure.

FIG. 35 is a view illustrating an approach security control according to various embodiments of the present disclosure.

Referring to FIG. 35, when an external electronic device 3520 or 3530 enters within a specified range, an electronic device 3510 may have a security state. For example, in the situation that a screen according to a specified function execution is outputted, when the electronic device 3510 enters within a specified distance 3511, the electronic device 3510 may switch a previous screen to another screen or may switch a previous screen into an unidentified state. According to various embodiments of the present disclosure, when the external electronic device 3530 enters within a specified range 3511, the electronic device 3510 does not execute an additional security function and may maintain a previous screen.

According to various embodiments of the present disclosure, the electronic device 3510 may differentiate an approach distance relating to a security function execution in correspondence to the type of approaching external electronic devices. For example, the electronic device 3510 may set an approach distance for a security function execution of the external electronic device 3530 to be farther or closer than an approach distance for a security function execution of the external electronic device 3520.

Figure 36:
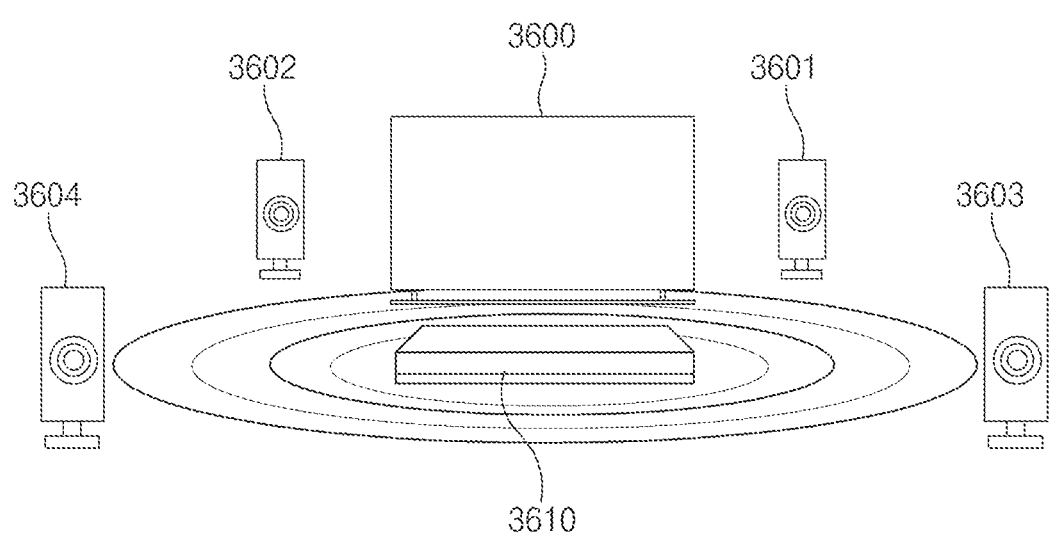
FIG. 36 is a view illustrating a peripheral device control according to various embodiments of the present disclosure.

FIG. 36 is a view illustrating a peripheral device control according to various embodiments of the present disclosure.

Referring to FIG. 36, an electronic device 3600 may be an image output device. An electronic device 3610 may be a device for processing an image to be outputted to the electronic device 3600 and then transmitting it. Additionally, the electronic device 3610 may be a device for controlling the transmission of audio data to be outputted from electronic devices 3601, 3602, 3603, and 3604. The electronic device 3610 may differently set the characteristics of audio data to be outputted in correspondence to a distance between the electronic devices 3601, 3602, 3603, and 3604 and the electronic device 3600. For example, the electronic device 3610 may be set to output a person's word or a relatively high-frequency sound to the electronic devices 3601 and 3602 disposed at the front left and right of the electronic device 3600. For example, the electronic device 3610 may be set to output a bass or low-frequency sound to the electronic devices 3603 and 3604 disposed at the rear left and right of the electronic device 3600. The electronic device 3610 may differently process the volume or sound effect of audio data to be outputted according to the location and distance of the electronic devices 3601, 3602, 3603, and 3604 to have a specified optimized audio data output situation.

Figure 37:
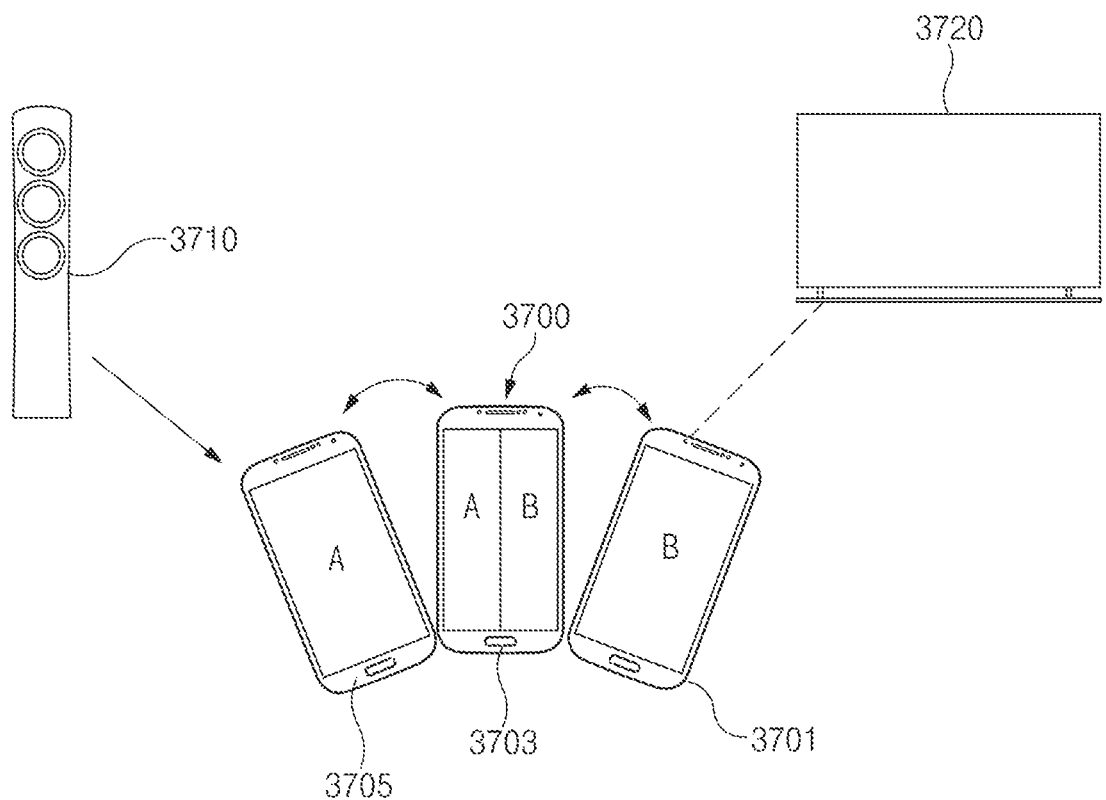
FIG. 37 is a view illustrating a remote device control according to various embodiments of the present disclosure.

FIG. 37 is a view illustrating a remote device control according to various embodiments of the present disclosure.

Referring to FIG. 37, an electronic device 3700 may have various direction states in correspondence to a user manipulation. For example, the electronic device 3700 may have states such as a state 3701 that the upper edge faces the upper right, a state 3708 that the upper edge faces the front, and a state 3705 that the upper edge faces the upper left in correspondence to a user's tilting direction.

In the case of the state 3701 that the upper edge of the electronic device 3700 faces the upper right, the electronic device 3700 may have a specified distance or direction state with respect to an external electronic device 3720. Correspondingly, the electronic device 3700 may output to a display a control screen for controlling the external electronic device 3720. In the case of the state 3705 that the upper edge faces the upper left, the electronic device 3700 may have a specified distance or direction state with respect to an external electronic device 3710. Correspondingly, the electronic device 3700 may automatically output to a display a control screen for controlling the external electronic device 3710. According to various embodiments of the present disclosure, in the case of the state 3703 that the electronic device 3700 faces, a control screen for controlling the external electronic device 3710 and a control screen for controlling the external electronic device 3720 may be respectively outputted to divided screen areas. Alternatively, the electronic device 3700 may output to a display a specified home screen or a specified electronic device function execution screen.

Figure 38A:
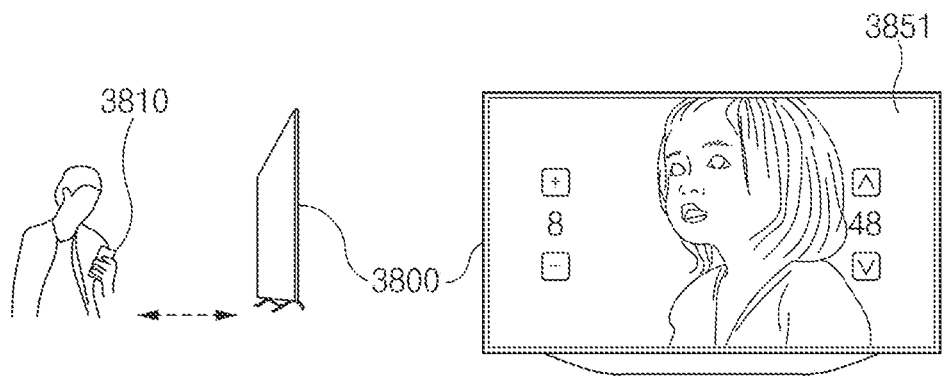
FIGS. 38A and 38B are views illustrating a control function depending on a distance conversion according to various embodiments of the present disclosure.
Figure 38B:
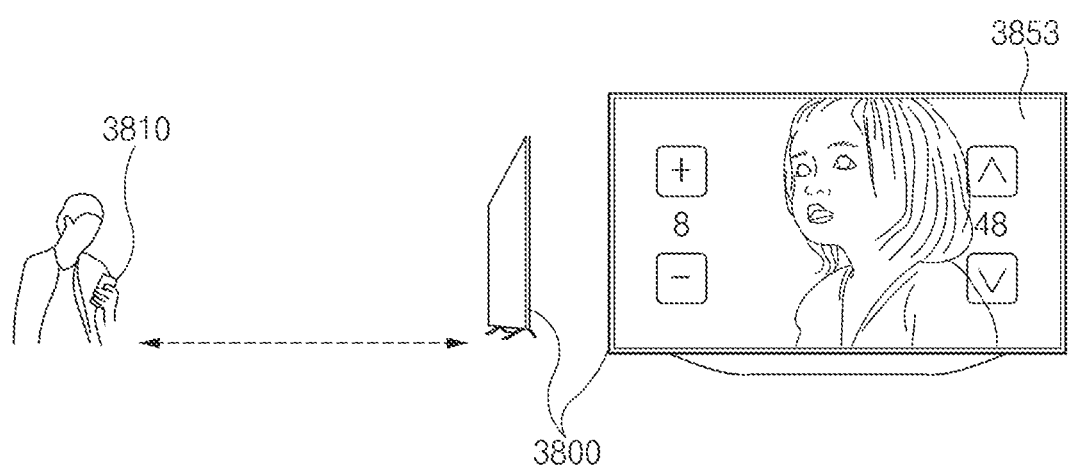

FIGS. 38A and 38B are views illustrating a control function depending on a distance conversion according to various embodiments of the present disclosure.

Referring to FIGS. 38A and 38B, the electronic device 3810 may have a predetermined distance or direction state with respect to an external electronic device 3800 in correspondence to a user who carries the electronic device 3810. For example, as shown in FIG. 38A, the electronic device 3810 may have a first distance and first direction state with respect to the external electronic device 3800. In this case, the external electronic device 3800 may output a specified first size of a screen as shown in a screen 3851. Alternatively, the external electronic device 3800, as shown in the screen 3851, may output at least some components in a specified first size, for example, a volume adjustment or channel adjustment virtual button or a virtual image, among screen components.

As shown in FIG. 38B, the electronic device 3810 may have a second distance and second direction state with respect to the external electronic device 3800. In this case, the external electronic device 3800 may output a specified second size of a screen as shown in a screen 3853. Alternatively, the external electronic device 3800, as shown in the screen 3853, may output at least some components (for example, a text or icon user interface (UI) size) in a specified second size, for example, a volume adjustment or channel adjustment virtual button or a virtual image, among screen components. The second size, for example, may be greater than the first size.

Figure 39:
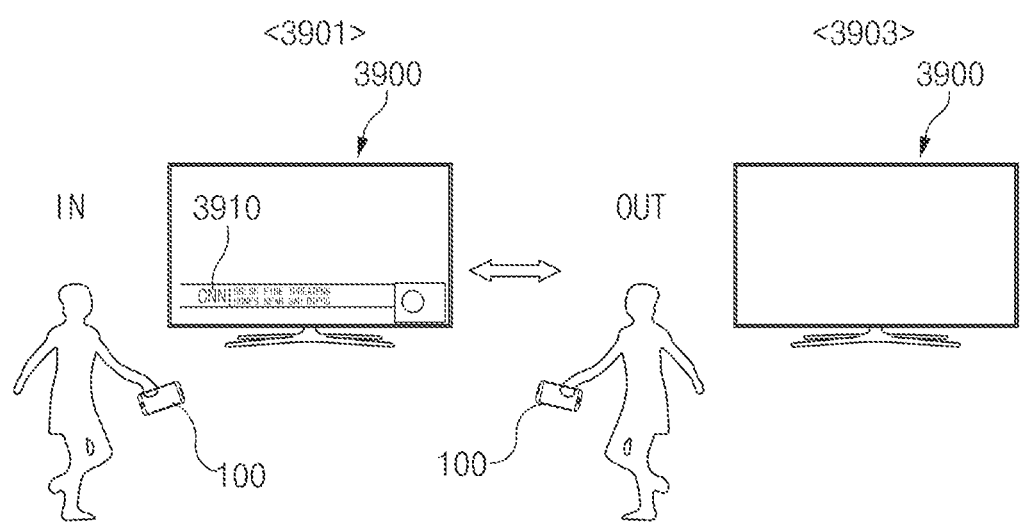
FIG. 39 is a view illustrating a location-specific information provision according to various embodiments of the present disclosure.

FIG. 39 is a view illustrating a location-specific information provision according to various embodiments of the present disclosure.

Referring to FIG. 39, the electronic device 100 may be located in a state having a specified distance or direction value with respect to the external electronic device 3900 in correspondence to a user possession and movement. According to an embodiment of the present disclosure, as shown in a state 3901, the electronic device 100 may enter within a predetermined distance from a point at which the external electronic device 3900 is disposed. In this case, the electronic device 3900 may receive given specific information 3910 from the electronic device 100 and may output it. Additionally, as shown in a state 3903, if the external electronic device 3900 is spaced a predetermined distance or in a direction apart from the electronic device 100, the output of given specified information 3910 may be terminated. In relation to this, when the external electronic device 3900 drives an operation for a distance or direction detection with respect to the electronic device 100 with low power and the electronic device 100 enters in a specified distance or direction, the external electronic device 3900 may provide specific information 3910 relating to the electronic device 100. The electronic device 100 may be a wearable electronic device, a smartphone, or a tablet electronic device.

For example, the external electronic device 3900 may provide weather and news provided from the electronic device 100 in a low power ticker form. Additionally, the external electronic device 3900 may provide a TV based image call reception available state. Additionally, the external electronic device 3900 may notify an unconnected call (for example, a missed call or a call connection request reception state) of the electronic device 100.

When the electronic device 100 is out of a specified location, the external electronic device 3900 may stop the above-mentioned information providing function. Additionally, the external electronic device 3900 may stop an image call processor and may stop a not-received telephone notification. The external electronic device 3900 may stop power supply relating to the above-mentioned information provision.

Figure 40:
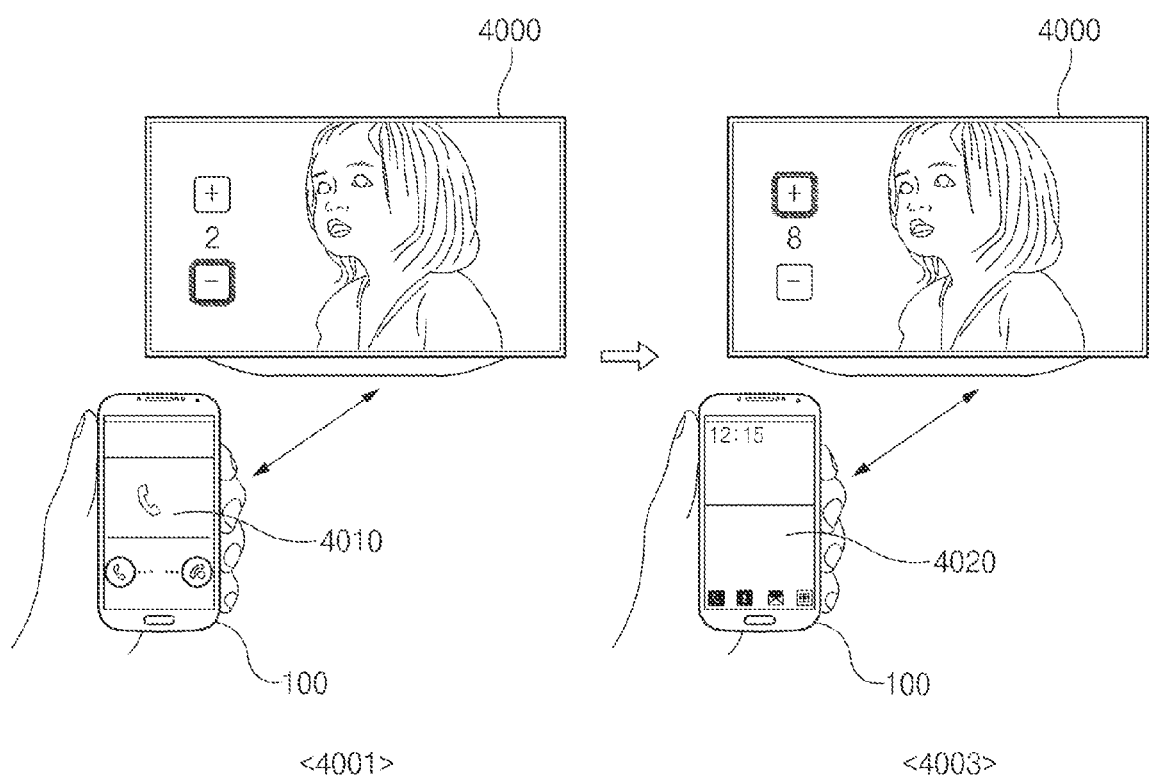
FIG. 40 is a view illustrating an external device control according to a call function according to various embodiments of the present disclosure.

FIG. 40 is a view illustrating an external device control according to a call function according to various embodiments of the present disclosure.

Referring to FIG. 40, the electronic device 100 may be equipped with a communication function. Accordingly, the electronic device 100 may perform a call function according to a user manipulation or in correspondence to a call connection request of the other electronic device. In this case, an external electronic device 4000 in a specified distance and a specified direction with respect to the electronic device 100 may have a specified state.

For example, when the electronic device 100 performs a call function as shown in a state 4001, it may output a call function screen 4010. Furthermore, when the electronic device 100 establishes a communication channel with another electronic device as shown in a state 4003, the electronic device may output screen 4020 associated with being on the phone.

The electronic device 100, for example, may be located within a specified distance or direction with respect to the external electronic device 4000. When the electronic device 100 is in call function execution, the external electronic device 4000 may switch to a specified volume state, for example, a first size of a volume state.

According to various embodiments of the present disclosure, when a call function of the electronic device 100 located in a specified distance or direction as shown in a state 4003, the external electronic device 4000 may automatically switch into a specified volume state, for example, a second size of a volume state. In relation to the above-mentioned function execution, the electronic device 100 may transmit a message for a call function start and a call function end to the external electronic device 4000. When the electronic device 100 is located within a specified distance or direction, the external electronic device 4000 may perform a volume automatic adjustment function according to the above-mentioned call function execution.

According to various embodiments of the present disclosure, the external electronic device 4000 may differently and gradually adjust a volume size according to a distance with respect to the electronic device 100. For example, when a distance with respect to the electronic device 100 where a call function is in execution is a first distance and a first direction, the external electronic device 4000 may adjust a volume size to a first size. Additionally, when a distance with respect to the electronic device 100 where a call function is in execution is a second distance greater than the first distance and a second direction, the external electronic device 4000 may adjust a volume size to a second size greater than the first size. Additionally, when a distance with respect to the electronic device 100 where a call function is in execution is a third distance greater than the second distance, the external electronic device 4000 may adjust a volume size to a third size greater than the second size regardless of directions.

Figure 41A:
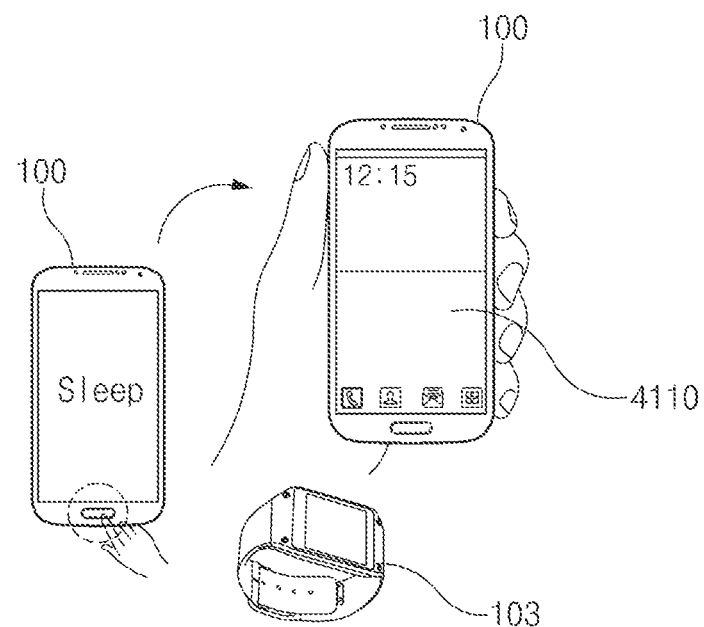
FIGS. 41A and 41B are views illustrating an authentication function execution according to various embodiments of the present disclosure.
Figure 41B:
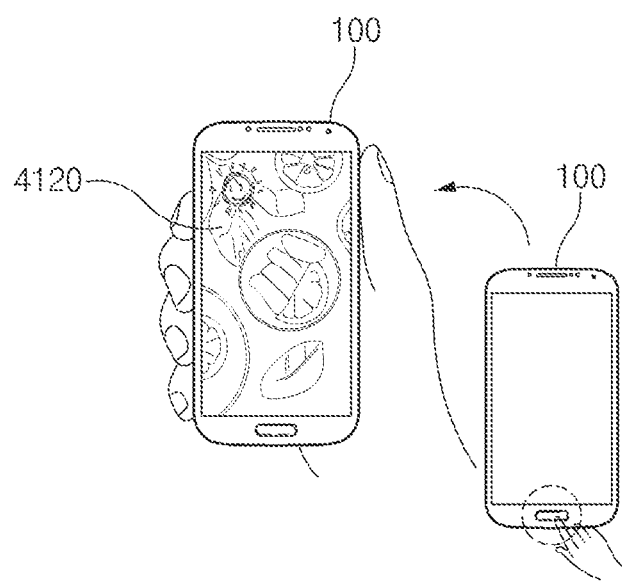

FIGS. 41A and 41B are views illustrating an authentication function execution according to various embodiments of the present disclosure.

Referring to FIGS. 41A and 41B, as shown in FIG. 41A, the electronic device 100 may have a wakeup state in correspondence to a home button selection in a sleep mode. Correspondingly, the electronic device 100 may output a lock screen. Upon the receipt of specified authentication information from a connection device 103 in a specific state (for example, a wearing state), the electronic device 100 may release the lock screen and may output a screen 4110 according thereto. Herein, the electronic device 100 may process information delivered from the connection device 103 located in a specified distance or direction as valid user authentication information. The connection device 103 may automatically transmit specified user authentication information in correspondence to a sleep mode release of the electronic device 100 located within a specified distance or direction. Accordingly, the electronic device 100 may substantially provide a function such performing a lock screen release when a user performs a home button selection.

According to various embodiments of the present disclosure, even if a sleep mode is released in correspondence to a home button selection as shown in FIG. 41B, when the connection device 103 is not located within a specified distance or direction, the electronic device 100 may not support a lock screen function. Accordingly, the electronic device 100 may output a lock screen or a specified guide screen 4120 (for example, a guide information output screen for requesting the possession of the connection device 103 or a short-range location).

As mentioned above, when the connection device 103 is located within a specified distance or direction, the electronic device 100 may process this as user authentication information to process a lock screen and if the connection device 103 is not located within a corresponding distance or direction, may not perform a lock screen automatic release or may request a manual mode execution.

Figure 42:
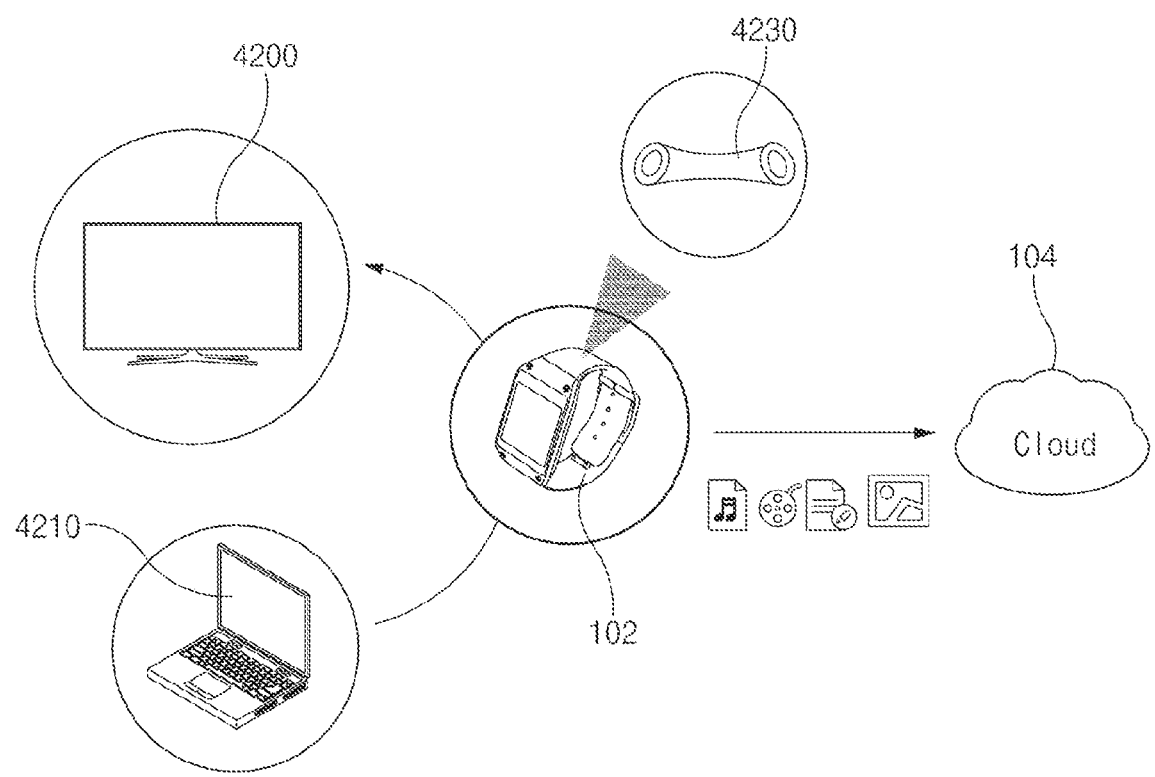
FIG. 42 is a view illustrating an image capture function according to various embodiments of the present disclosure.

FIG. 42 is a view illustrating an image capture function according to various embodiments of the present disclosure.

Referring to FIG. 42, an external electronic device 102 may capture content currently played in electronic devices 4200, 4210, and 4230. In relation to this, when a specified event occurs in a state that the external electronic device 102 is located within a specified distance and direction with respect to a specific electronic device, for example, the electronic device 4230, the external electronic device 102 may request a content capture from the electronic device 4230 in correspondence to a corresponding event occurrence. The electronic device 4230 may deliver captured information to the external electronic device 102 according to a request of the external electronic device 102.

According to various embodiments of the present disclosure, the electronic device 4210 may capture content according to a request of the external electronic device 102 and may transmit the captured content to another electronic device 4200 through the external electronic device 102. According to various embodiments of the present disclosure, upon the receipt of the captured content from the electronic devices 4210, 4220, and 4230, the external electronic device 102 may transmit this to a cloud server device 104.

According to various embodiments of the present disclosure, after capturing content being played in the electronic device 4210 in correspondence to a control (for example, a capture request in a state of being located within a specified distance and direction) of the external electronic device 102, if performing a playback request (for example, a content playback request in a state that the external electronic device 102 is located within a specified distance or direction with respect to the electronic device 4200) to another electronic device 4200, the electronic device 4200 may process a corresponding content playback. In relation to this, the electronic device 4210 may provide captured content related information (for example, identification information such as the type or name of content) to the external electronic device 102 and may provide content identification information together while providing capture information to the electronic device 4200 through the external electronic device 102. The electronic device 4200 play corresponding content in correspondence to content identification information but may perform a control to perform a playback from a point corresponding to capture information.

Figure 43:
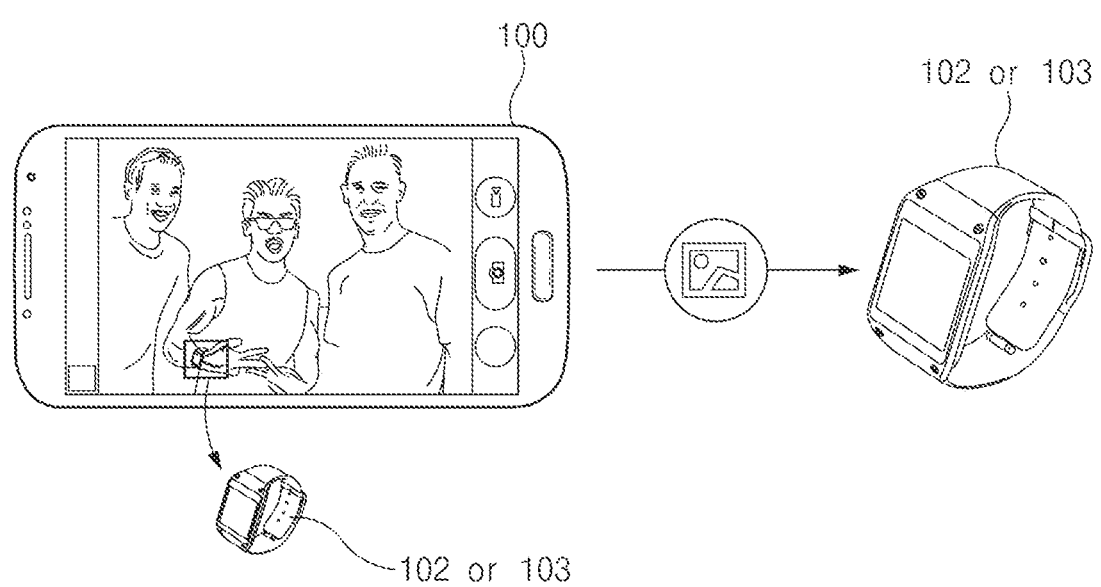
FIG. 43 is a view illustrating a picture sharing function according to various embodiments of the present disclosure.

FIG. 43 is a view illustrating a picture sharing function according to various embodiments of the present disclosure.

Referring to FIG. 43, an electronic device 100 may provide a picture capturing function. When the electronic device 100 performs picture capturing, an external electronic device 102 or a connection device 103 located within a specified distance and direction may automatically share pictures that the electronic device 100 captures.

According to various embodiments of the present disclosure, when the electronic device 100 performs picture capturing, a surrounding image may be focused based on a specific electronic device disposed at a subject, for example, the external electronic device 102 or the connection device 103. When the external electronic device 102 enters an image (for example, it is located with a specified distance or direction with respect to the external electronic device 102), the electronic device 100 may transmit a captured image to the external electronic device 102 or the connection device 103 and share it.

Figure 44:
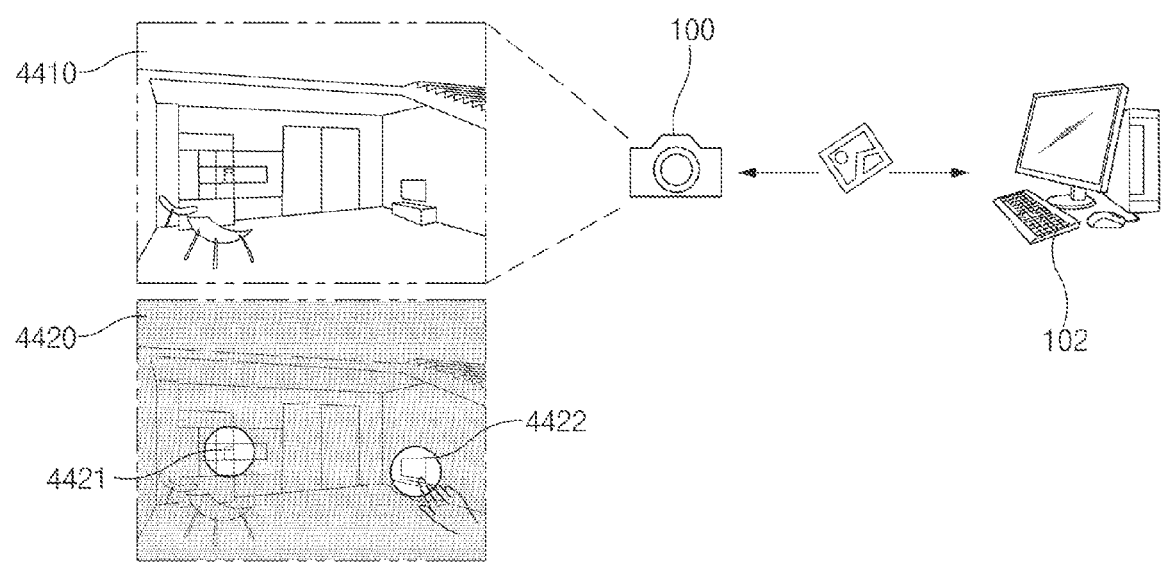
FIG. 44 is a view illustrating a selective picture transmission function according to various embodiments of the present disclosure.

FIG. 44 is a view illustrating a selective picture transmission function according to various embodiments of the present disclosure.

Referring to FIG. 44, the electronic device 100 may support a picture capturing function for a predetermined subject or a predetermined area 4410. While performing picture capturing on the predetermined area 4410, the electronic device 100 may detect objects 4421 and 4422 corresponding to at least one external electronic device located in a corresponding area 4410. The electronic device 100 may output the objects 4421 and 4422 of external electronic devices on a specified image screen 4420.

The electronic device 100 may display areas corresponding to the objects 4421 and 4422 of external electronic devices on the image screen 4420. Additionally, the electronic device 100 may support to select areas corresponding to the objects 4421 and 4422 of external electronic devices. Accordingly, when an area corresponding to specific external electronic devices is selected, the electronic device 100 may perform a specified function execution.

According to various embodiments of the present disclosure, when the electronic device 100 is provided as a preview image or if at least one of the objects 4421 and 4422 corresponding to external electronic devices in a captured image is selected, the electronic device 100 may provide a related function such as copy or move and may transmit a capture image or a preview image in correspondence to a selected function. Alternatively, the electronic device 100 may transmit a captured image or a preview image to the specified external electronic device 102. Herein, the external electronic device 102 may be an actual electronic device corresponding to the object 4422 of an external electronic device.

Figure 45A:
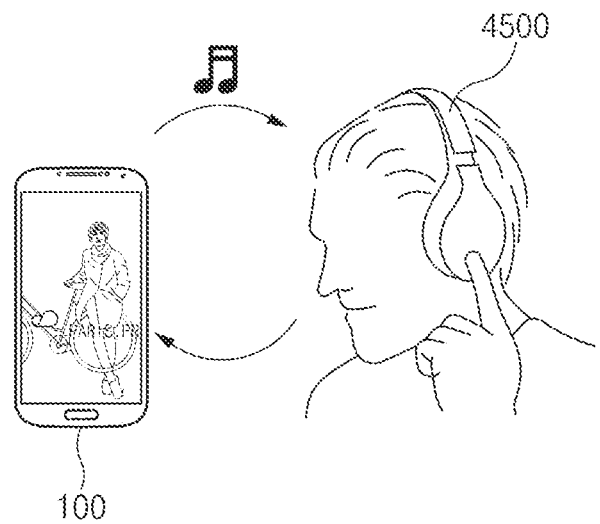
FIGS. 45A and 45B are views illustrating a music playback function according to various embodiments of the present disclosure.
Figure 45B:
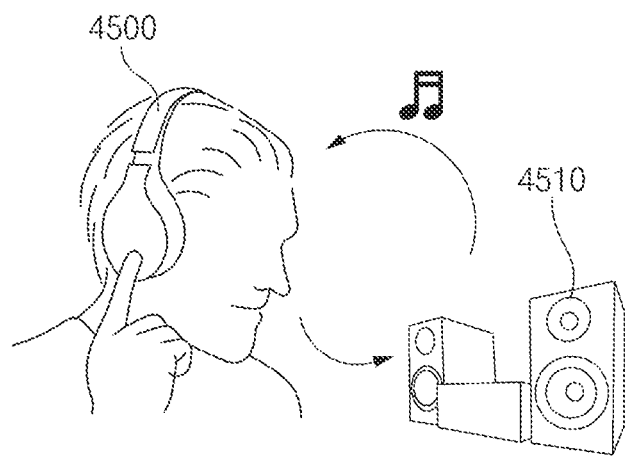

FIGS. 45A and 45B are views illustrating a music playback function according to various embodiments of the present disclosure.

Referring to FIGS. 45A and 45B, the electronic device 4500 may be in a user wearing available device according to a form. For example, the electronic device 4500 may be a headset device. Alternatively, the electronic device 4500 may be a Bluetooth headset.

As shown in FIG. 45A, the electronic device 4500, for example, may be located within a specified distance or direction with respect to an electronic device 100. The electronic device 4500 may establish a communication channel with the electronic device 100 located within a specified distance or direction and may receive content from the electronic device 100 and output it. During this operation, the electronic device 4500 may prepare a button relating to a pairing execution request and may perform pairing with the electronic device 100 when a corresponding button is selected.

According to various embodiments of the present disclosure, as shown in FIG. 45B, the electronic device 4500 may be located within a specified distance or direction with respect to an electronic device 4510. In this case, the electronic device 4500 may be automatically connected to the electronic device 4510 and may receive content in playback from the electronic device 4510 to output it. During this operation, the electronic device 4510 may provide a pairing button and when a corresponding button is selected, a connection with the electronic device 4510 may be performed.

Figure 46A:
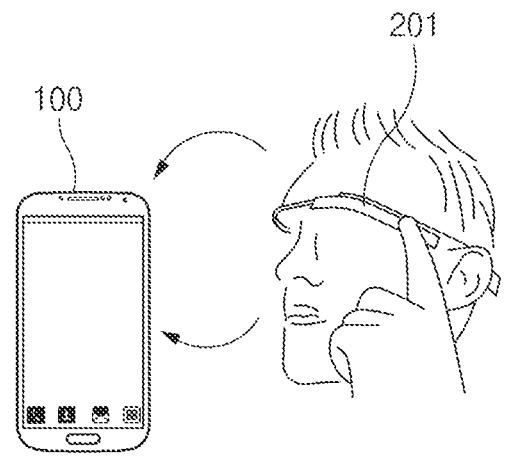
FIGS. 46A and 46B are views illustrating a glass type device operation according to various embodiments of the present disclosure.
Figure 46B:
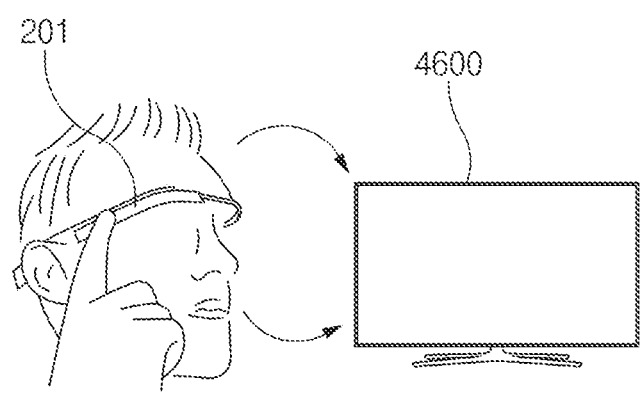

FIGS. 46A and 46B is a view illustrating a glass type device operation according to various embodiments of the present disclosure.

Referring to FIGS. 46A and 46B, an electronic device 201 may be a glass type electronic device. Accordingly, the electronic device 201 may be worn on a user's specific portion, for example, an eye area. As shown in FIG. 46A, the electronic device 201, for example, may include at least one communication module for detecting a distance or a direction with respect to an electronic device 100. When the electronic device 201 is located within a specified distance or direction with respect to the electronic device 100, it may receive a glass image from the electronic device 100. The electronic device 201 may output the glass image provided from the electronic device 100.

According to various embodiments of the present disclosure, the electronic device 201 may change its direction or distance with respect to another electronic device according to a user's movement. Correspondingly, the electronic device 201, as shown in FIG. 46B, may be located within a specified distance or direction with respect to the external electronic device 4600. When the electronic device 201 is located within a specified distance or direction with respect to the external electronic device 4600, it may be connected to the electronic device 4600 and may receive a glass image from the electronic device 4600. Alternatively, according to various embodiments of the present disclosure, the electronic device 201 may mirror a glass image to the electronic device 4600. Accordingly, content being executed on the electronic device 201 may be outputted to the electronic device 4600. During this operation, the electronic device 201 may transmit a content image matching the device characteristics of the electronic device 4600. For example, the electronic device 201 may transmit a TV image instead of a glass image to the electronic device 4600.

Figure 47:
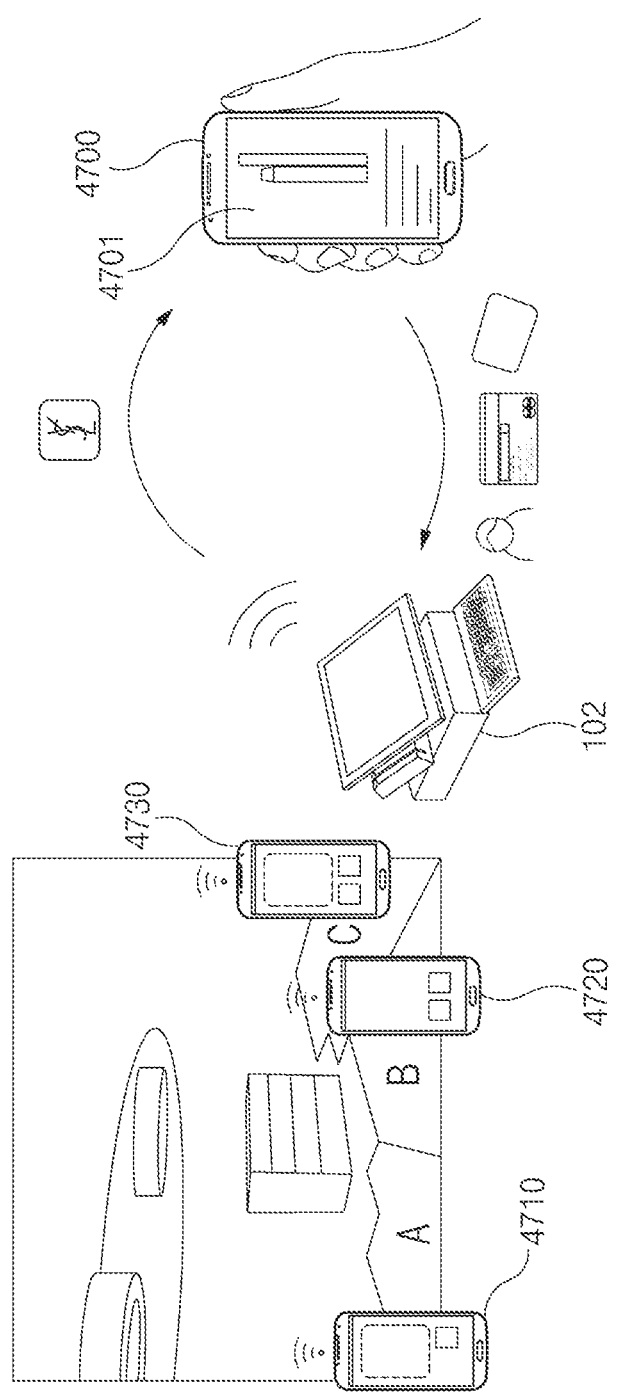
FIG. 47 is a view illustrating a product purchase related function according to various embodiments of the present disclosure.

FIG. 47 is a view illustrating a product purchase related function according to various embodiments of the present disclosure.

Referring to FIG. 47, a user carrying an electronic device 4700 may move and accordingly, the electronic device 4700 may be located in various places. For example, an electronic device 4710 may be located adjacent to a first store A. Additionally, an electronic device 4720 may be located adjacent to a second store B and an electronic device 4730 may be located adjacent to a third store C. Accordingly, each electronic device may receive and output service information that external electronic devices disposed at corresponding stores provide. For example, the electronic device 4700 may be located within a specified distance or direction with respect to the external electronic device 102 located at a specific store. The electronic device 4700 may perform a service application auto download and a temporary installation from a corresponding external electronic device 102. The electronic device 4700 may output a simple order screen 4701 using an automatically installed service application. When a product is selected based on the screen 4701, corresponding order information, the location of the electronic device 4700 in a store, payment, and coupon information may be provided to the external electronic device 102. According to the approval of the external electronic device 102, a user may purchase a product and leave the store without standing in a line or going to the counter.

Figure 48:
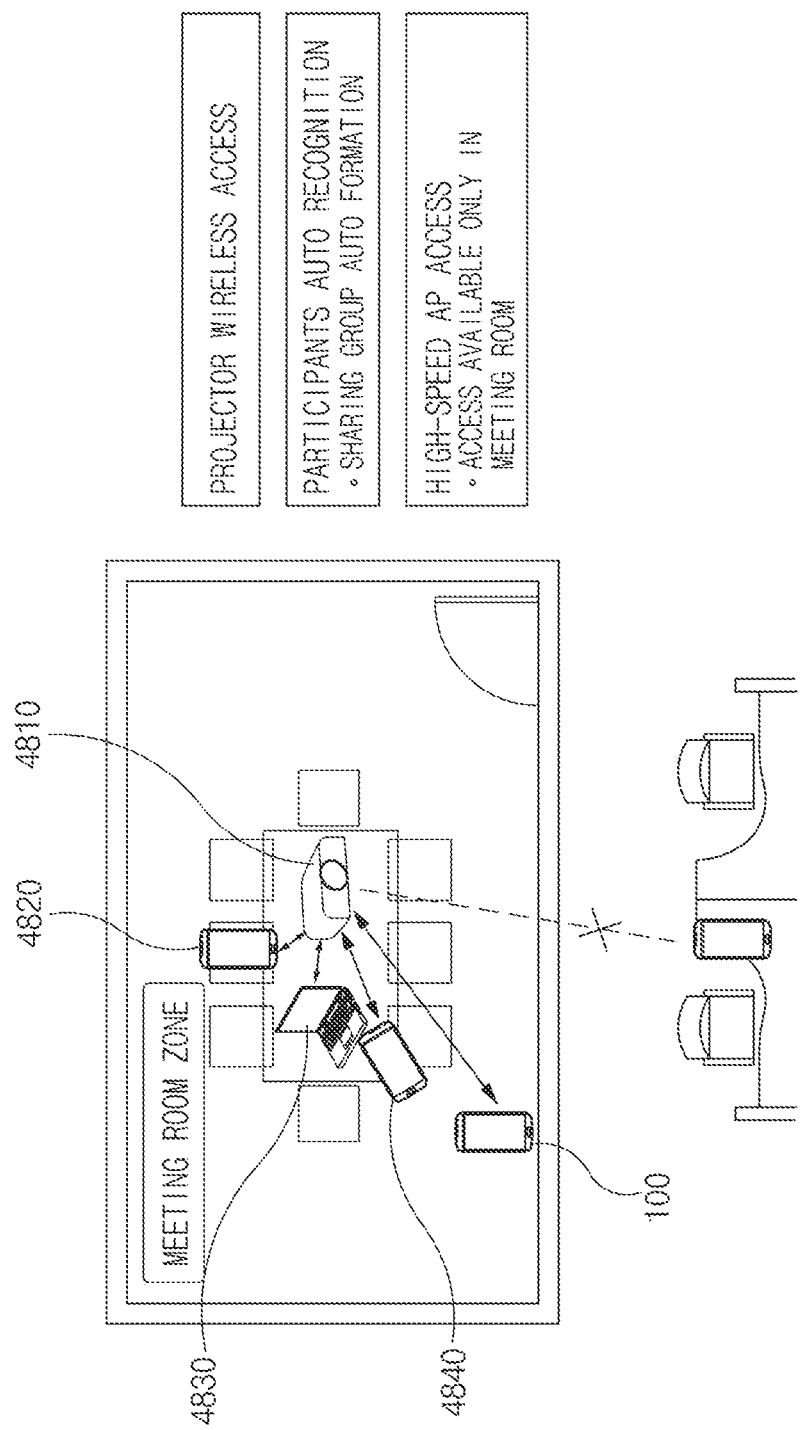
FIG. 48 is a view illustrating a meeting room operating function according to various embodiments of the present disclosure.

FIG. 48 is a view illustrating a meeting room operating function according to various embodiments of the present disclosure.

Referring to FIG. 48, an electronic device 100 may be located in a meeting room where at least one of electronic devices 4810, 4820, 4830, and 4840 is located. When the electronic device 100 is located in a corresponding meeting room, the electronic devices 4810, 4820, 4830, and 4840 may be activated automatically. For example, the electronic devices 4810, 4820, 4830, and 4840 may be connected to the electronic device 100. As the electronic device 100 is located in a meeting room, it may support to use a communication function that the meeting room provides, for example, a high-speed communication function, or a participants log registration or project operating function.

When the electronic device 100 is out of a meeting room or is out of a specified distance or direction with respect to the electronic devices 4810, 4820, 4830, and 4840, various functions provided from a meeting room may be blocked. The electronic devices 4810, 4820, 4830, and 4840 may transition to a deactivation state or a low power standby state. When the electronic device 100 is located with a specified distance or direction, the electronic devices 4810, 4820, 4830, and 4840 may share stored information in relation to meeting progress after performing connection.

Figure 49:
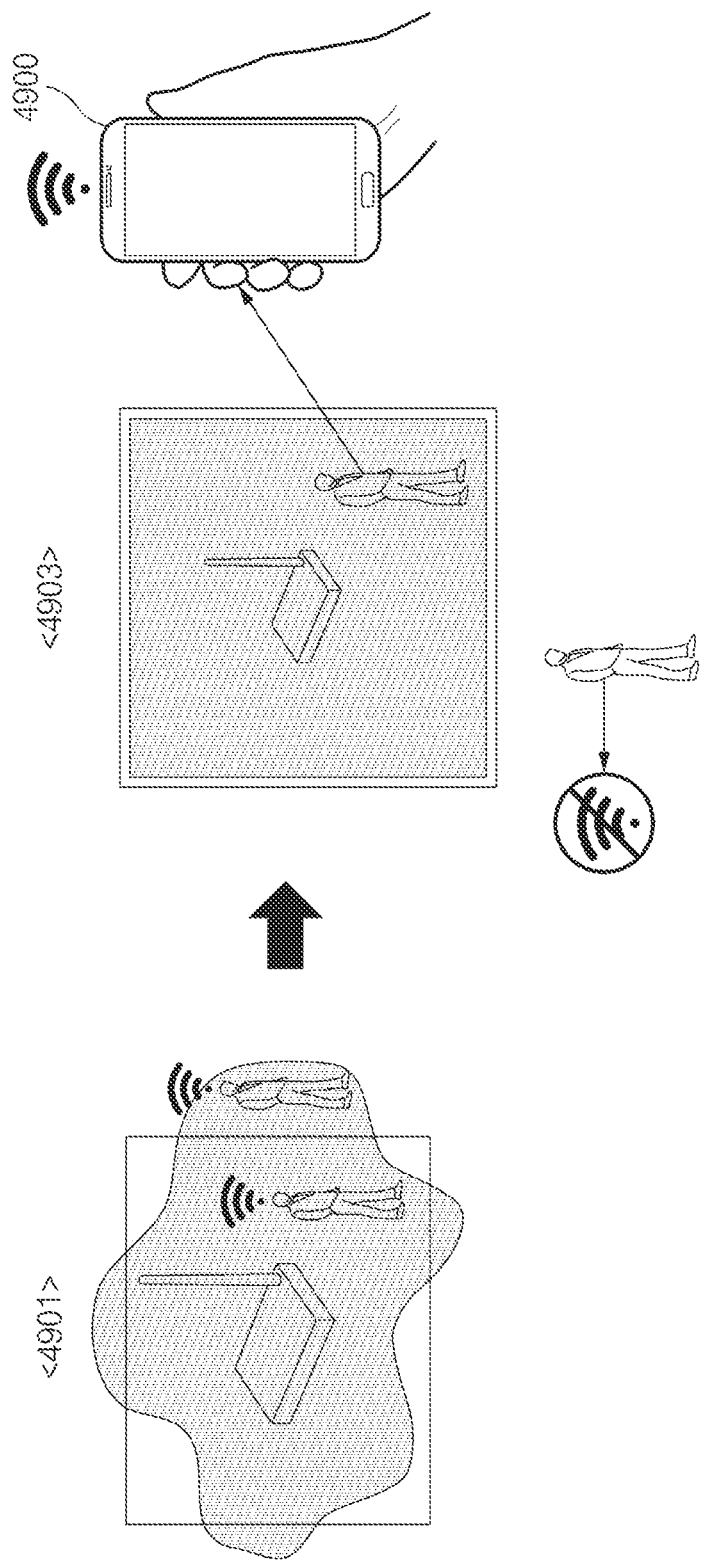
FIG. 49 is a view illustrating a WiFi operating zone according to various embodiments of the present disclosure.

FIG. 49 is a view illustrating a WiFi operating zone according to various embodiments of the present disclosure.

Referring to FIG. 49, a user having an electronic device may be located in a WiFi connection available zone that is irregular and difficult to expect as shown in a state 4901. Accordingly, even if an electronic device is located within a predetermined distance of an access point supporting a specific WiFi connection, a connection to a corresponding access point may not be accurate sometimes.

As shown in the state 4903, an access point may specify a distance or a direction with respect to an electronic device and may limit a corresponding distance or direction to a specified range. For example, an access point may support only a connection with an electronic device 4900 located within a specified distance and may block connection even if an electronic device output a specified distance is connectable. Additionally, an access point may only support a connection with electronic devices located within a specified direction and distance. According to various embodiments of the present disclosure, an access point may support an electronic device located within a specified distance or direction without an additional personal identification number (PIN) (or PIN codes) input or WiFi list selection.

Figure 50:
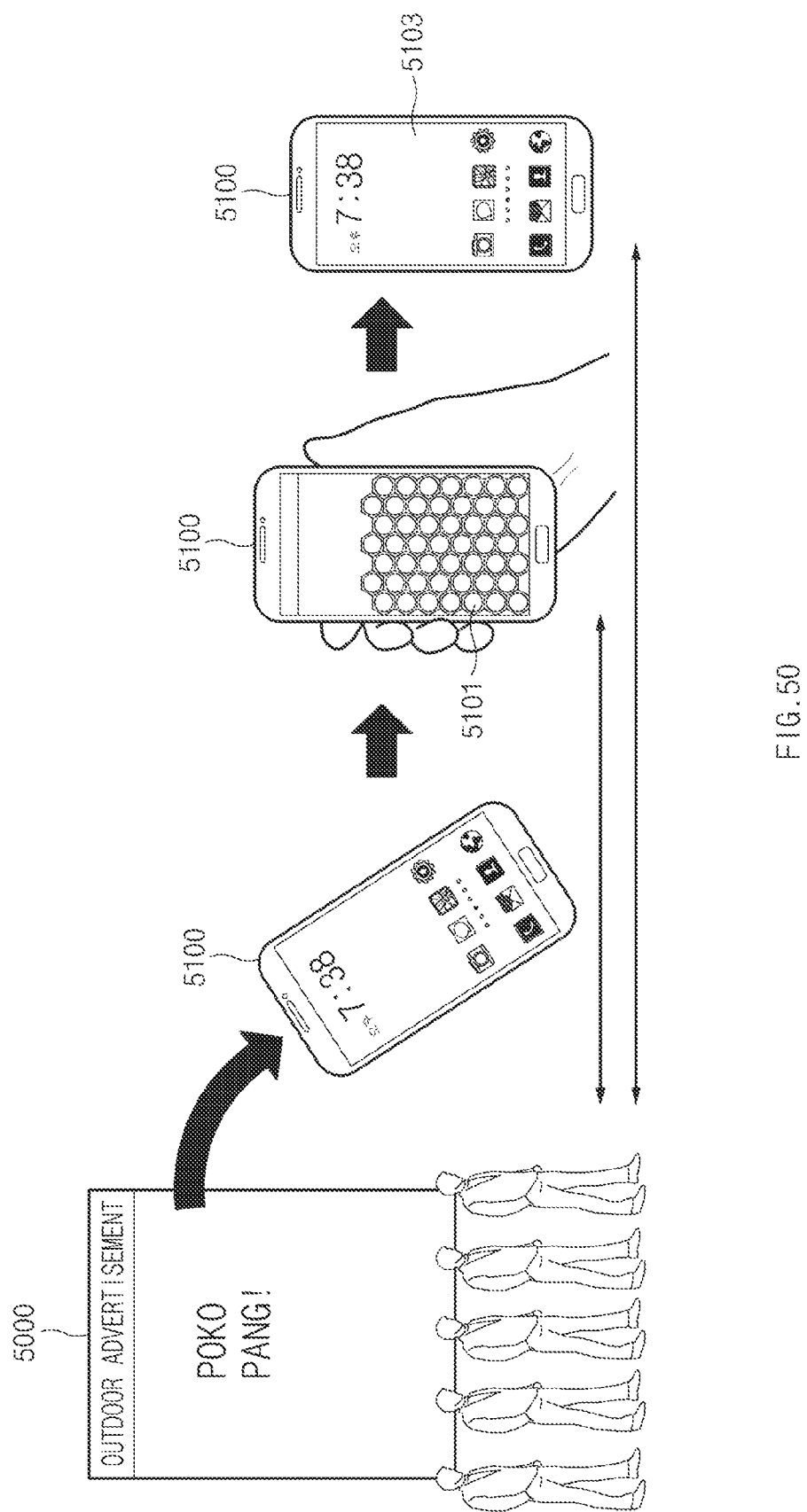
FIG. 50 is a view illustrating an area based service providing function according to various embodiments of the present disclosure.

FIG. 50 is a view illustrating an area based service providing function according to various embodiments of the present disclosure.

Referring to FIG. 50, users having electronic devices may be located within a specified distance or direction with respect to an external electronic device 500 for outputting outdoor advertisements, subway advertisements, or advertisements at various stores. In this case, the electronic device 5000 may provide specified service information such as content (for example, game, advertisement, coupon, event, and so on) to an electronic device 5100.

When a specific event (for example, pointing to the external electronic device 500) occurs in a state of facing the external electronic device 500, the electronic device 5100 may output a game execution screen, a content reception screen, or a content execution screen as shown in a screen 5101.

According to various embodiments of the present disclosure, when the electronic device 5100 is out of a specified distance or direction of the external electronic device 5000, it may terminate content in execution in relation to the external electronic device 5000. Therefore, the electronic device 5110 may output home-screen or idle screen, or previous executing screen as shown in a screen 5103. Alternatively, when the electronic device 5100 is out of a specified distance or direction of the external electronic device 5000, it may output confirmation relating to the content termination and may process content termination and continuous playback according to a user selection. As mentioned above, when pointing to a public display device in an area based service form, the electronic device 5100 may temporarily or provisionally provide content and when it is out of a specified distance or direction, may support to terminate content playback.

Figure 51A:
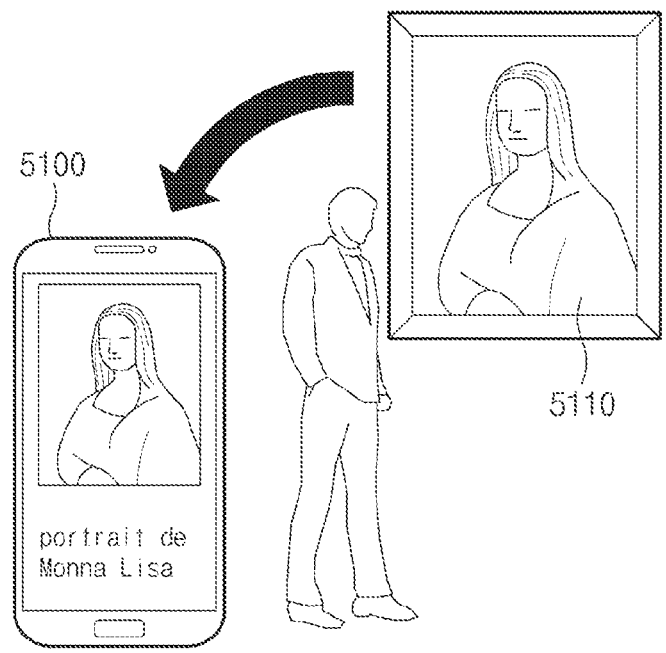
FIGS. 51A and 51B are views illustrating an electronic device operation in a museum according to various embodiments of the present disclosure.
Figure 51B:
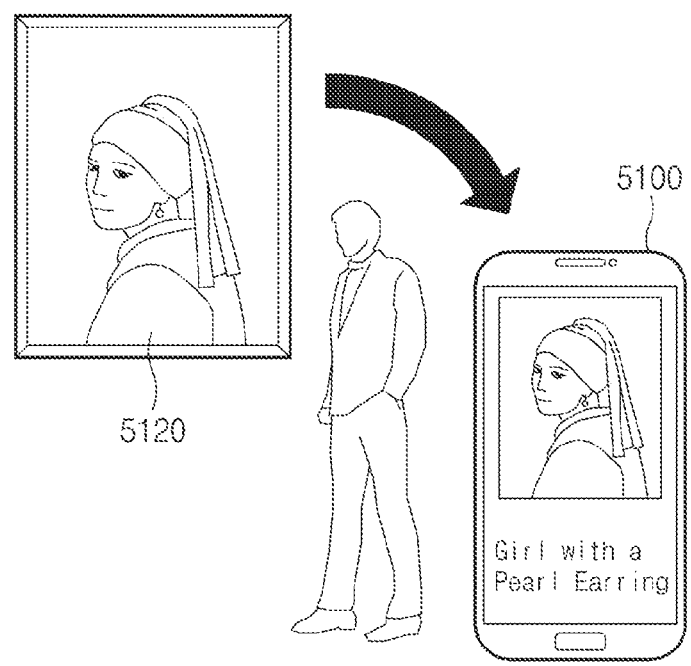

FIGS. 51A and 51B are views illustrating an electronic device operation in a museum according to various embodiments of the present disclosure.

Referring to FIGS. 51A and 51B, an electronic device 5100 may be located in a specified area, for example, a museum. A variety of works may be disposed in a museum. For example, a work 5110 including a communication chip that provides information may be disposed in the museum. As shown in FIG. 51A, when the electronic device 5100 is located within a specified distance or direction, the work 5110 may transmit information relating thereto to the electronic device 5100. Upon the receipt of the information relating to the work 5110, the electronic device 5100 may output this to a display.

According to various embodiments of the present disclosure, the electronic device 5100 may change its location in correspondence to a user movement. Accordingly, as shown in FIG. 51B, when the electronic device 5100 is located within a specified distance or direction, a work 5120 may transmit information relating thereto to the electronic device 5120. The electronic device 5100 may output the received information relating to the work 5120. In relation to the above-mentioned function support, the works 5110 and 5120, as described above, may include a communication module and a processor in order to process the approach recognition and the direction recognition of the electronic device 5100. According to various embodiments of the present disclosure, an external electronic device for providing information on the work 5110 or the work 5120 to the electronic device 5100 may be disposed at a specific location of the museum (for example, a location where the location check and the direction check of the electronic device 5100 are possible) and may determine a distance or a direction with respect to a specific work in correspondence to the movement of the electronic device 5100.

Figure 52:
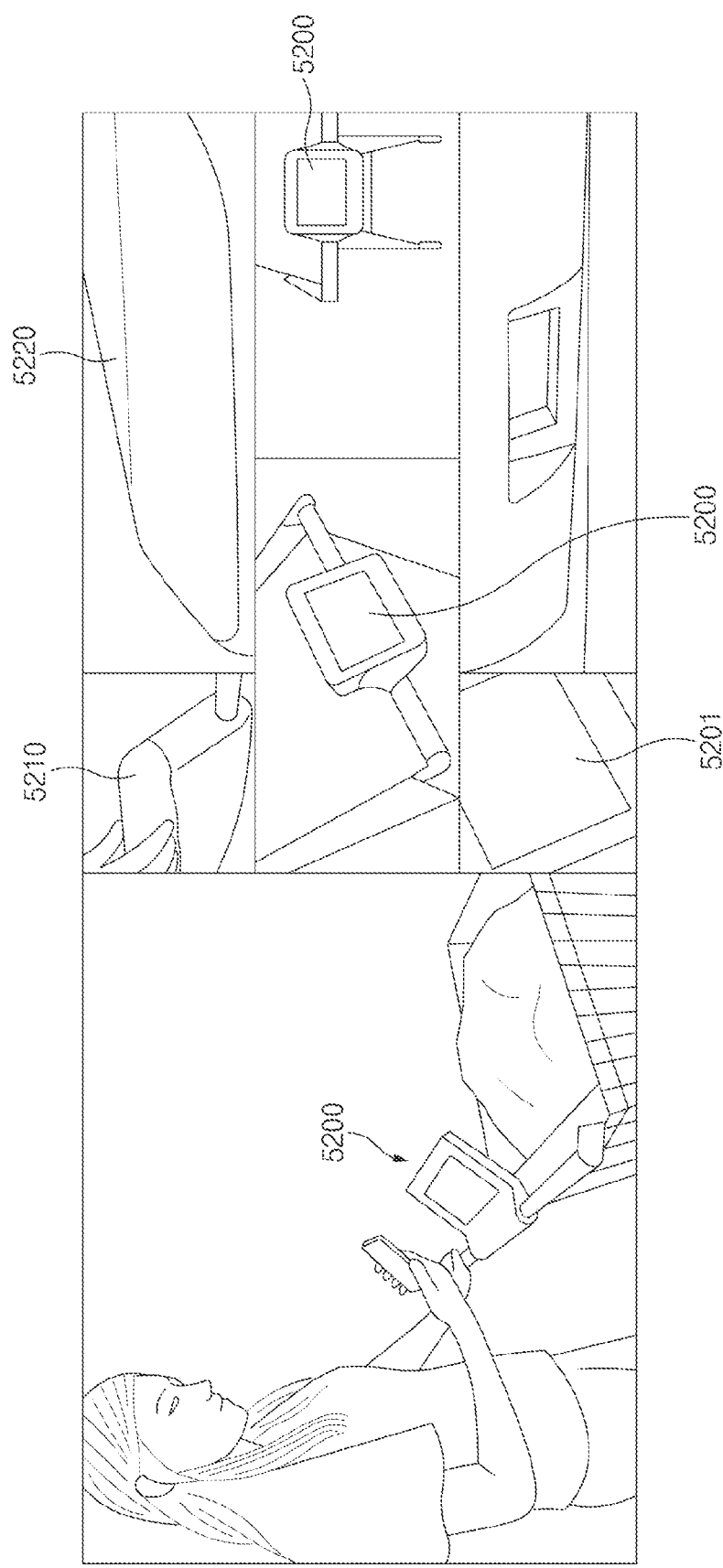
FIG. 52 is a view illustrating an electronic device operation in a shopping mall according to various embodiments of the present disclosure.

FIG. 52 is a view illustrating an electronic device operation in a shopping mall according to various embodiments of the present disclosure.

Referring to FIG. 52, various product information disposed around may be collected and provided in a shopping mall based on an electronic device 5200. For example, a cart in a shopping mall may include the electronic device 5200. The electronic device 5200 may supply power to a display according to how to grab a cart, and may receive a shopping list in communication with an electronic device carried by a user. In relation to this, when the electronic device 5200 is located within a specified distance or direction with respect to a user carrying electronic device, it may at least one of transmit and receive device characteristic information. When the electronic device 5200 in a shopping mall is found (for example, check through its identification information delivery of the electronic device 5200), the user carrying electronic device may provide the latest list or at least one list among stored shipping lists to the electronic device 5200.

When products 5210 and 5220 in the shopping list are found, the electronic device 5200 may output location information of a corresponding product to a screen 5201. The electronic device 5200 may provide the current cart location and location information of the products 5210 and 5220 in a store. Additionally, the electronic device 5200 may provide a navigation function for the products 5210 and 5220.

Figure 53:
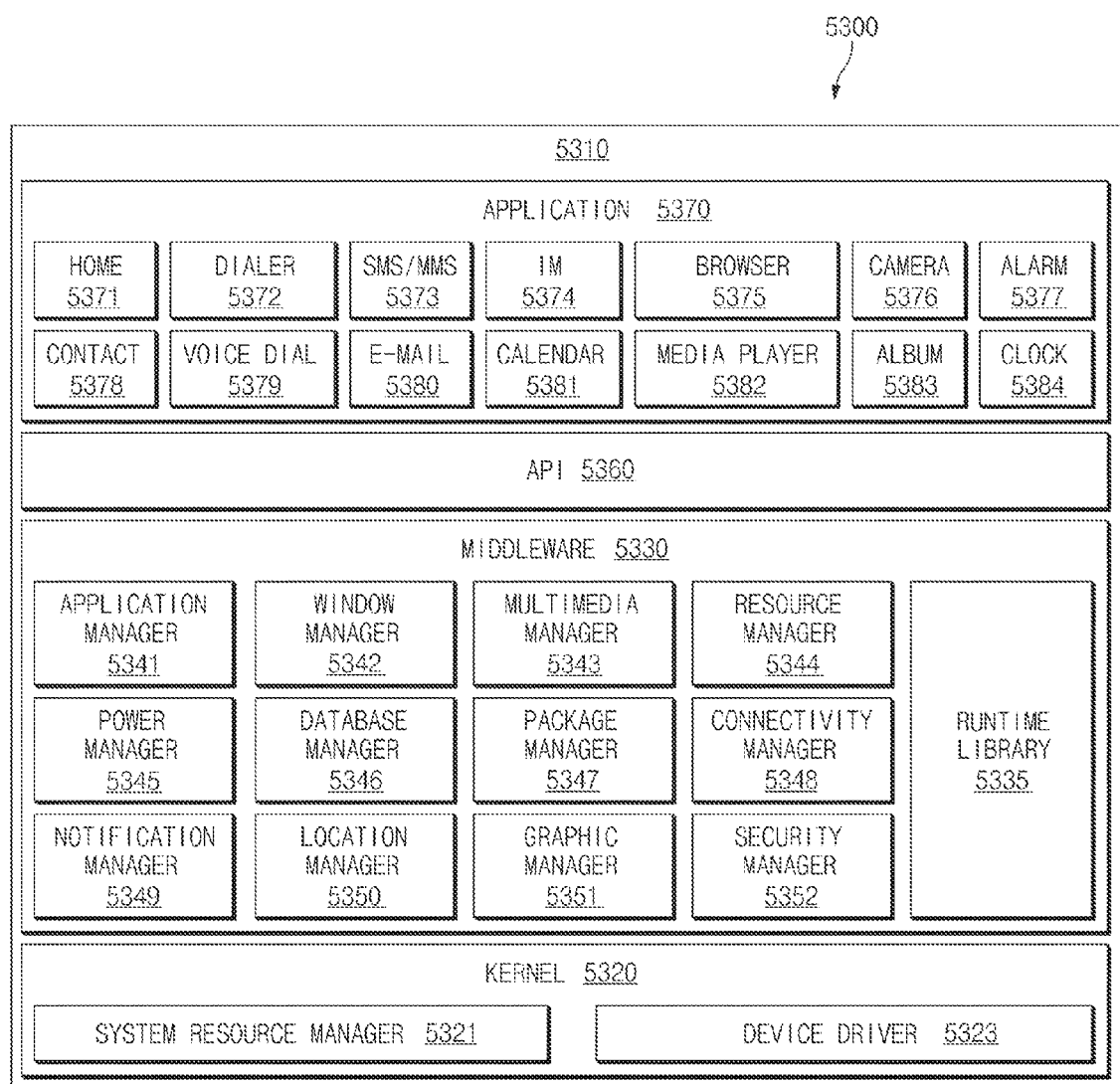
FIG. 53 is a block diagram illustrating a program module according to various embodiments of the present disclosure.

FIG. 53 is a block diagram illustrating a program module according to various embodiments of the present disclosure.

Referring to FIG. 53, according to an embodiment of the present disclosure, the program module 5310 may include an OS for controlling a resource relating to an electronic device (for example, the electronic device 100) and/or various applications (for example, the application 147) running on the OS. The OS, for example, may include android, iOS, windows, symbian, tizen, or bada.

The program module 5310 may include an OS and an application 5370. The OS may include a kernel 5320, a middleware 5330, and an API 5360. At least part of the program module 5310 may be preloaded on an electronic device or may be downloaded from a server (for example, the server device 104).

The kernel 5320, for example, may include a system resource manager 5321 or a device driver 5323. The system resource manager 5321 may perform the control, allocation, or retrieval of a system resource. According to an embodiment of the disclosure, the system resource manager 5321 may include a process management unit, a memory management unit, or a file system management unit. The device driver 5323, for example, a display driver, a camera driver, a Bluetooth driver, a sharing memory driver, a USB driver, a keypad driver, a WiFi driver, an audio driver, or an inter-process communication (IPC) driver.

The middleware 5330, for example, may provide a function that the application 5370 uses commonly, or may provide various functions to the application 5370 through the API 5360 in order to allow the application 5370 to efficiently use a limited system resource inside the electronic device. According to an embodiment of the disclosure, the middleware 5330 may include at least one of a runtime library 5335, an application manager 5341, a window manager 5342, a multimedia manager 5343, a resource manager 5344, a power manager 5345, a database manager 5346, a package manager 5347, a connectivity manager 5348, a notification manager 5349, a location manager 5350, a graphic manager 5351, and a security manager 5352.

The runtime library 5335, for example, may include a library module that a complier uses to add a new function through a programming language while the application 5370 is running. The runtime library 5335 may perform a function on input/output management, memory management, or an arithmetic function.

The application manager 5341, for example, may mange the life cycle of at least one application among the applications 5370. The window manager 5342 may manage a graphical UI (GUI) resource used in a screen. The multimedia manager 5343 may recognize a format for playing various media files and may encode or decode a media file by using the codec corresponding to a corresponding format. The resource manager 5344 may manage a resource such as a source code, a memory, or a storage space of at least any one of the applications 5370.

The power manager 5345, for example, may operate together with a basic input/output system (BIOS) to manage the battery or power and may provide power information used for an operation of the electronic device. The database manager 5346 may create, search, or modify a database used in at least one application among the applications 5370. The package manager 5347 may manage the installation or update of an application distributed in a package file format.

The connectivity manger 5348 may manage a wireless connection such as WiFi or Bluetooth. The notification manager 5349 may display or notify an event such as arrival messages, appointments, and proximity alerts to a user in a manner of not interrupting the user. The location manager 5350 may manage location information on an electronic device. The graphic manager 5351 may manage a graphic effect to be provided to a user or a UI relating thereto. The security manager 5352 may provide various security functions used for system security or user authentication. According to an embodiment of the present disclosure, when an electronic device (for example, the electronic device 100) includes a phone function, the middleware 5330 may further include a telephony manager for managing a voice or video call function of the electronic device.

The middleware 5330 may include a middleware module for forming a combination of various functions of the above-mentioned components. The middleware 5330 may provide a module specialized for each type of OS to provide differentiated functions. Additionally, the middleware 5330 may delete part of existing components or add new components dynamically.

The API 5360, for example, as a set of API programming functions, may be provided as another configuration according to OS. For example, in the case of android or iOS, one API set may be provided for each platform and in the case Tizen, at least two API sets may be provided for each platform.

The application 5370 (for example, the application 38) may include at least one application for providing functions such as a home 5371, a dialer 5372, an short message service (SMS)/multimedia messaging service (MMS) 5373, an instant message 5374, a browser 5375, a camera 5376, an alarm 5377, a contact 5378, a voice dial 5379, an e-mail 5380, a calendar 5381, a media player 5382, an album 5383, a clock 5384, health care (for example, measure an exercise amount or blood sugar), or environmental information provision (for example, provide air pressure, humidity, or temperature information).

According to an embodiment of the disclosure, the application 5370 may include an application (hereinafter referred to as "information exchange application") for supporting information exchange between the electronic device (for example, the electronic device 100) and an external electronic device (for example, the electronic device 102). The information exchange application, for example, may include a notification relay application for relaying specific information to the external device or a device management application for managing the external electronic device.

For example, the notification relay application may have a function for relaying to an external electronic device (for example, the electronic device 102) notification information occurring from another application (for example, an SMS/MMS application, an e-mail application, a health care application, or an environmental information application) of the electronic device. Additionally, the notification relay application may receive notification information from an external electronic device and may then provide the received notification information to a user. The device management application, for example, may manage (for example, install, delete, or update) at least one function (turn-on/turn off of the external electronic device itself (or some components) or the brightness (or resolution) adjustment of a display) of an external electronic device (for example, the electronic device 102) communicating with the electronic device, an application operating in the external electronic device, or a service (for example, call service or message service) provided from the external device.

According to an embodiment of the disclosure, the application 5370 may include a specified application (for example, a health care application) according to the property (for example, as the property of an electronic device, when the type of the electronic device is a mobile medical device) of the external electronic device (for example, the electronic device 102). According to an embodiment of the present disclosure, the application 5370 may include an application received from an external electronic device (for example, the server device 104 or the electronic device 102). According to an embodiment of the disclosure, the application 5370 may include a preloaded application or a third party application downloadable from a server. The names of components in the program module 5310 according to the shown embodiment may vary depending on the type of OS.

According to various embodiments of the present disclosure, at least part of the program module 5310 may be implemented with software, firmware, hardware, or a combination thereof. At least part of the programming module 5310, for example, may be implemented (for example, executed) by a processor (for example, an AP). At least part of the programming module 5310 may include a module, a program, a routine, sets of instructions, or a process to perform at least one function, for example.

Figure 54:
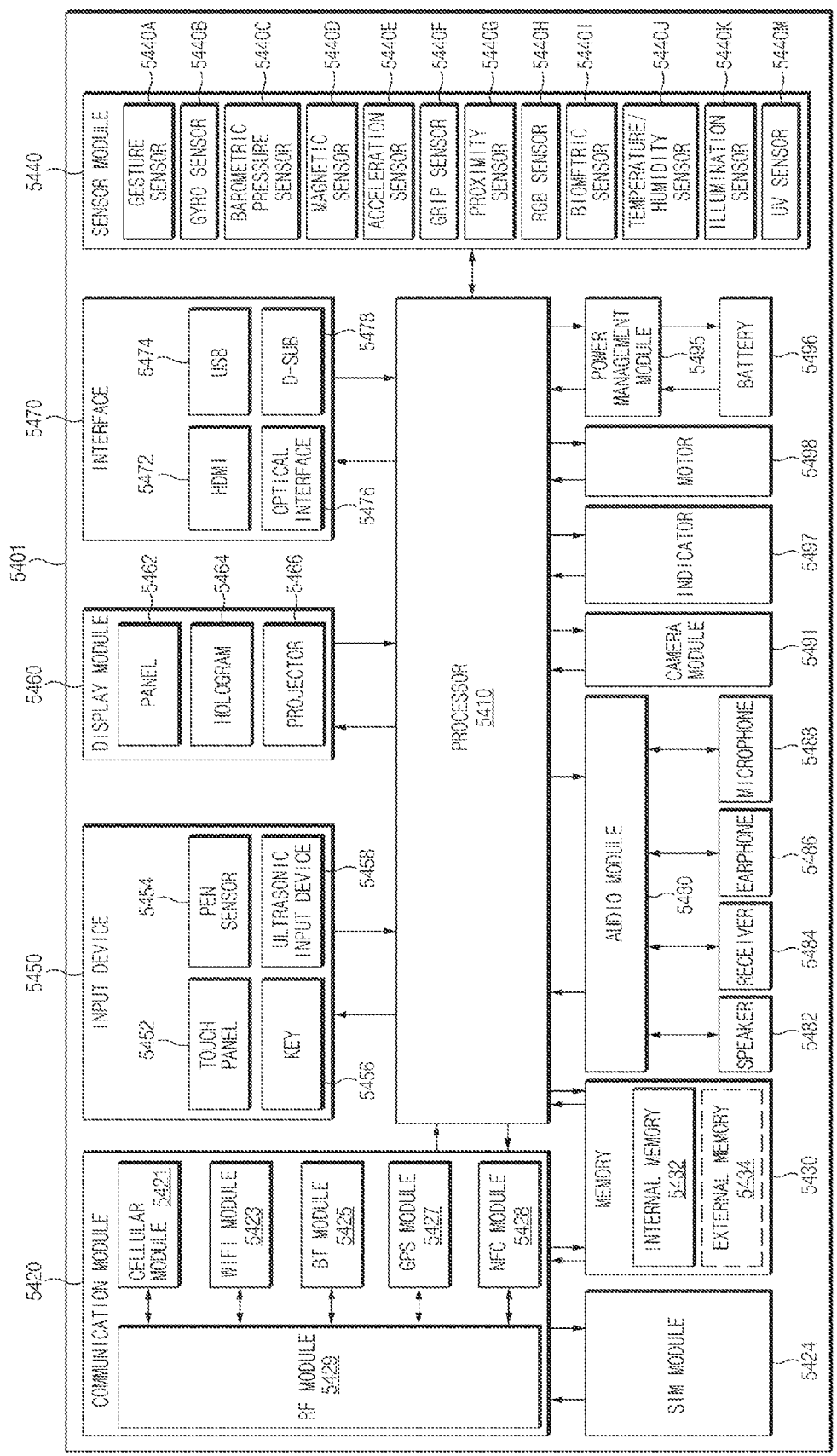
FIG. 54 is a view illustrating an electronic device according to various embodiments of the present disclosure.

FIG. 54 is a view illustrating an electronic device according to various embodiments of the present disclosure.

Referring to FIG. 54, the electronic device 5401, for example, may configure all or part of the above-mentioned electronic device 100 shown in FIG. 2. The electronic device 5401 may include AP 210, a communication module 5420, a subscriber identification module (SIM) card 5424, a memory 5430, a sensor module 5440, an input device 5450, a display 5460, an interface 5470, an audio module 5480, a camera module 5491, a power management module 5495, a battery 5496, an indicator 5497, and a motor 5498.

The AP 5410 may control a plurality of hardware or software components connected to the AP 5410 and also may perform various data processing and operations by executing an OS or an application program. The AP 5410 may be implemented with a system on chip (SoC), for example. According to an embodiment of the present disclosure, the AP 5410 may further include a graphics processing unit (GPU) (not shown) and/or an image signal processor (ISP). The AP 5410 may include at least part (for example, the cellular module 5421) of components shown in FIG. 54. The AP 5410 may load commands or data received from at least one of other components (for example, nonvolatile memory) and process them and may store various data in a nonvolatile memory.

The communication module 5420 may have the same or similar configuration to the communication interface 160 of FIG. 2. The communication module 5420 may include a cellular module 5421, a WiFi module 5423, a BT module 5425, a GPS module 5427, an NFC module 5428, and a RF module 5429.

The cellular module 5421, for example, may provide voice call, video call, text service, or internet service through communication network. According to an embodiment of the present disclosure, the cellular module 5421 may perform a distinction and authentication operation on an electronic device 5401 in a communication network by using a SIM (for example, the SIM card 5424). According to an embodiment of the present disclosure, the cellular module 5421 may perform at least part of a function that the AP 5410 provides. According to an embodiment of the present disclosure, the cellular module 5421 may further include a CP.

Each of the WiFi module 5423, the BT module 5425, the GPS module 5427, and the NFC module 5428 may include a processor for processing data transmitted/received through a corresponding module. According to an embodiment of the present disclosure, at least part (for example, at least one) of the cellular module 5421, the WiFi module 5423, the BT module 5425, the GPS module 5427, and the NFC module 5428 may be included in one integrated chip (IC) or IC package.

The RF module 5429, for example, may at least one of transmit and receive communication signals (for example, RF signals). The RF module 5429, for example, may include a transceiver, a power amp module (PAM), a frequency filter, a low noise amplifier (LNA), or an antenna. According to another embodiment of the present disclosure, at least one of the cellular module 5421, the WiFi module 5423, the BT module 5425, the GPS module 5427, and the NFC module 5428 may at least one of transmit and receive RF signals through a separate RF module.

The SIM card 5424 may include a card including a SIM and/or an embedded SIM and also may include unique identification information (for example, an integrated circuit card identifier (ICCID)) or subscriber information (for example, an international mobile subscriber identity (IMSI)).

The memory 5430 (for example, the memory 130) may include an internal memory 5432 or an external memory 5434. The internal memory 5432 may include at least one of a volatile memory (for example, dynamic random access memory (DRAM), static RAM (SRAM), synchronous dynamic RAM (SDRAM)) and a non-volatile memory (for example, one time programmable read only memory (OTPROM), programmable ROM (PROM), erasable and programmable ROM (EPROM), electrically erasable and programmable ROM (EEPROM), mask ROM, flash ROM, NAND flash memory, and NOR flash memory).

The external memory 5434 may further include flash drive, for example, compact flash (CF), secure digital (SD), micro Micro-SD, Mini-SD, extreme digital (xD), or a memorystick. The external memory 5434 may be functionally and/or physically connected to the electronic device 5401 through various interfaces.

The sensor module 5440 measures physical quantities or detects an operating state of the electronic device 5401, thereby converting the measured or detected information into electrical signals. The sensor module 5440 may include at least one of a gesture sensor 5440A, a gyro sensor 5440B, a barometric pressure sensor 5440C, a magnetic sensor 5440D, an acceleration sensor 5440E, a grip sensor 5440F, a proximity sensor 5440G, a color sensor 5440H (for example, a red, green, blue (RGB) sensor), a biometric sensor 5440I, a temperature/humidity sensor 5440J, an illumination sensor 5440K, and an ultra violet (UV) sensor 5440M. Additionally or alternatively, the sensor module 5440 may include an E-nose sensor, an electromyography (EMG) sensor, an electroencephalogram (EEG) sensor, an electrocardiogram (ECG) sensor, an infrared (IR) sensor, an iris sensor, or a fingerprint sensor. The sensor module 5440 may further include a control circuit for controlling at least one sensor therein. According to an embodiment of the present disclosure, the electronic device 5401 may further include a processor configured to control the sensor module 5440 as part of or separately from the AP 5410 and thus may control the sensor module 5440 while the AP 5410 is in a sleep state.

The input device 5450 may include a touch panel 5452, a (digital) pen sensor 5454, a key 5456, or an ultrasonic input device 5458. The touch panel 5452 may use at least one of capacitive, resistive, infrared, or ultrasonic methods, for example. Additionally, the touch panel 5452 may further include a control circuit. The touch panel 5452 may further include a tactile layer to provide tactile response to a user.

The (digital) pen sensor 5454, for example, may include a sheet for recognition as part of a touch panel or a separate sheet for recognition. The key 5456 may include a physical button, an optical key, or a keypad, for example. The ultrasonic input device 5458 may check data by detecting sound waves through a microphone (for example, a microphone 5488) in the electronic device 5401 through an input tool generating ultrasonic signals.

The display 5460 (for example, the display 150) may include a panel 5462, a hologram device 5464, or a projector 5466. The panel 5462 may have the same or similar configuration to the display 150 of FIG. 2. The panel 5462 may be implemented to be flexible, transparent, or wearable, for example. The panel 5462 and the touch panel 5452 may be configured with one module. The hologram device 5464 may show three-dimensional images in the air by using the interference of light. The projector 5466 may display an image by projecting light on a screen. The screen, for example, may be placed inside or outside the electronic device 5401. According to an embodiment of the present disclosure, the display 5460 may further include a control circuit for controlling the panel 5462, the hologram device 5464, or the projector 5466.

The interface 5470 may include a HDMI 5472, an USB 5474, an optical interface 5476, or a D-subminiature (D-sub) 5478, for example. The interface 5470, for example, may be included in the communication interface 160 shown in FIG. 2. Additionally or alternatively, the interface 5470 may include a mobile high-definition link (MHL) interface, an SD card/multi-media card (MMC) interface, or an infrared data association (IrDA) standard interface.

The audio module 5480 may convert sound into electrical signals and convert electrical signals into sounds. At least some components of the audio module 5480, for example, may be included in the input/output interface 170 shown in FIG. 2. The audio module 5480 may process sound information inputted/outputted through a speaker 5482, a receiver 5484, an earphone 5486, or a microphone 5488.

The camera module 5491, as a device for capturing a still image and a video, may include at least one image sensor (for example, a front sensor or a rear sensor), a lens (not shown), an ISP (not shown), or a flash (not shown) (for example, an LED or a xenon lamp).

The power management module 5495 may manage the power of the electronic device 5401. According to an embodiment of the present disclosure, the power management module 5495 may include a power management IC (PMIC), a charger IC, or a battery or fuel gauge, for example. The PMIC may have a wired and/or wireless charging method. As the wireless charging method, for example, there is a magnetic resonance method, a magnetic induction method, or an electromagnetic method. An additional circuit for wireless charging, for example, a circuit such as a coil loop, a resonant circuit, or a rectifier circuit, may be added. The battery gauge may measure the remaining amount of the battery 5496, or a voltage, current, or temperature thereof during charging. The battery 5496, for example, may include a rechargeable battery and/or a solar battery.

The indicator 5497 may display a specific state of the electronic device 5401 or part thereof (for example, the AP 5410), for example, a booting state, a message state, or a charging state. The motor 5498 may convert electrical signals into mechanical vibration and may generate vibration or haptic effect. Although not shown in the drawings, the electronic device 5401 may include a processing device (for example, a GPU) for mobile TV support. A processing device for mobile TV support may process media data according to the standards such as digital multimedia broadcasting (DMB), digital video broadcasting (DVB), or media-FLO.

Various embodiments of the present disclosure may support to perform a more accurate device search with a relatively low power method.

Additionally, various embodiments of the present disclosure may support various services on the basis found devices.

Each of the above-mentioned components of the electronic device according to various embodiments of the present disclosure may be configured with at least one component and the name of a corresponding component may vary according to the kind of an electronic device. According to various embodiments of the present disclosure, an electronic device according to various embodiments of the present disclosure may include at least one of the above-mentioned components, may not include some of the above-mentioned components, or may further include another component. Additionally, some of components in an electronic device according to various embodiments of the present disclosure are configured as one entity, so that functions of previous corresponding components are performed identically.

The term "module" used in various embodiments of the present disclosure, for example, may mean a unit including a combination of at least one of hardware, software, and firmware. The term "module" and the term "unit", "logic", "logical block", "component", or "circuit" may be interchangeably used. A "module" may be a minimum unit or part of an integrally configured component. A "module" may be a minimum unit performing at least one function or part thereof. A "module" may be implemented mechanically or electronically. For example, "module" according to various embodiments of the present disclosure may include at least one of an application-specific integrated circuit (ASIC) chip performing certain operations, field-programmable gate arrays (FPGAs), or a programmable-logic device, all of which are known or to be developed in the future.

According to various embodiments of the present disclosure, at least part of a device (for example, modules or functions thereof) or a method (for example, operations) according to this disclosure, for example, as in a form of a programming module, may be implemented using an instruction stored in computer-readable storage media. When at least one processor (for example, the processor 90) executes an instruction, it may perform a function corresponding to the instruction. The non-transitory computer-readable storage media may include the memory 130, for example.

The non-transitory computer-readable storage media may include hard disks, floppy disks, magnetic media (for example, magnetic tape), optical media (for example, compact disc (CD)-ROM, and DVD), magneto-optical media (for example, floptical disk), and hardware devices (for example, ROM, RAM, or flash memory). Additionally, a program instruction may include high-level language code executable by a computer using an interpreter in addition to machine code created by a complier. The hardware device may be configured to operate as at least one software module to perform an operation of various embodiments of the present disclosure and vice versa.

As mentioned above, according to various embodiments of the present disclosure, a computer readable recording medium stores at least one instruction executable by at least one processor. The instruction may be set to perform establishing a first communication channel with an access point based on a specified frequency band and performing a search according to a specified period or event for connection in another frequency band of the same access point while the first communication channel is established.

A module or a programming module according to various embodiments of the present disclosure may include at least one of the above-mentioned components, may not include some of the above-mentioned components, or may further include another component. Operations performed by a module, a programming module, or other components according to various embodiments of the present disclosure may be executed through a sequential, parallel, repetitive or heuristic method. Additionally, some operations may be executed in a different order or may be omitted. Or, other operations may be added.

Moreover, the embodiments disclosed in this specification are suggested for the description and understanding of technical content but do not limit the range of the present disclosure. Accordingly, the range of the present disclosure should be interpreted as including all modifications or various other embodiments based on the technical idea of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a first communication module configured to support a first communication method;
   a second communication module configured to support a second communication method;
   a memory configured to store data used for operations of the first communication module and the second communication module; and
   a processor electrically connected to the first communication module, the second communication module, and the memory,
   wherein the processor is configured to:
      recognize an approach of an external electronic device based on the first communication method, and
      after recognizing a location by at least one of transmitting a specified signal to and receiving the specified signal from the approach-recognized external electronic device based on the second communication method, correct at least one of location or direction information associated with the approach based on state information itself calculated using sensor information collected from a sensor module.

2. The electronic device of claim 1, wherein the processor is configured to operate the first communication module to at least one of transmit and receive a specified pattern signal based on a Bluetooth low energy (BLE).

3. The electronic device of claim 1, wherein the processor is configured to transmit a location measurement request message to the external electronic device, and when receiving a location measurement response signal from the external electronic device, to calculate a relative location based on a location value calculated by the external electronic device and a location value calculated based on the location measurement response signal.

4. The electronic device of claim 3, wherein the processor is configured to transmit a location measurement request message including a location measurement value based on the location measurement response signal to the external electronic device a specified number of times.

5. The electronic device of claim 1, wherein the processor is configured to calculate a location based on a phase difference of signals received using a multi antenna or calculate a location based on a phase difference of signals transmitted from the external electronic device.

6. The electronic device of claim 1, wherein the processor is configured to:
   at least one of transmit and receive the specified signal a specified number of times or until a specified event occurs, and
   calculate an average value of a plurality of collected location measurement values as a location value.

7. The electronic device of claim 6, wherein the processor is configured to transmit a message for guiding a location measurement stop to the external electronic device according to a setting.

8. The electronic device of claim 1, wherein the processor is configured to obtain changed state information by using sensor information obtained by at least one sensor based on sensor information corresponding to a specified state.

9. The electronic device of claim 1, wherein the processor is configured to correct a calculated location according to the state information.

10. The electronic device of claim 9, wherein the processor is configured to display a location according to the correction value.

11. A device searching method comprising:
   recognizing, by an electronic device, an approach of an external electronic device based on a first communication method;
   recognizing, by the electronic device, a location by at least one of transmitting a specified signal to and receiving the specified signal from the approach-recognized external electronic device based on a second communication method; and
   correcting, by the electronic device, at least one of location or direction information associated with the approach based on state information itself calculated using sensor information collected from a sensor module.

12. The method of claim 11, wherein the recognizing of the approach comprises receiving a specified pattern signal based on a Bluetooth low energy (BLE).

13. The method of claim 11, wherein the recognizing of the location comprises:
   transmitting a location measurement request message to the external electronic device;
   receiving a location measurement response signal from the external electronic device; and
   calculating a relative location based on a location value calculated by the external electronic device and a location value calculated based on the location measurement response signal.

14. The method of claim 13, further comprising transmitting a location measurement request message including a location measurement value based on the location measurement response signal to the external electronic device a specified number of times.

15. The method of claim 11, wherein the recognizing of the location comprises at least one of:

receiving a first set of signals by using a multi antenna and calculating a location based on a phase difference of the first set of received signals; and receiving a second set of signals transmitted by using a multi antenna and calculating a location based on a phase difference of the second set of received signals.

16. The method of claim 11, wherein the recognizing of the location comprises at least one of transmitting and receiving the specified signal a specified number of times or until a specified event occurs and calculating an average value of a plurality of collected location measurement values as a location value.

17. The method of claim 16, further comprising transmitting a message for guiding a location measurement stop to the external electronic device.

18. The method of claim 11, further comprising obtaining changed state information by using sensor information obtained by at least one sensor based on sensor information corresponding to a specified state.

19. The method of claim 11 further comprising at least one of collecting a calculated location according to the state information; and displaying a location according to a correction value.

20. The method of claim 11, further comprising:

checking whether a distance or direction with respect to the external electronic device satisfies a specified condition; and performing a specified service activation in correspondence to satisfaction of the specified condition and outputting information according to the specified service activation.

* * * * *

UNITED STATES PATENT AND TRADEMARK OFFICE
CERTIFICATE OF CORRECTION

PATENT NO. : 9,571,974 B2  
APPLICATION NO. : 14/887853  
DATED : February 14, 2017  
INVENTOR(S) : Jong Mu Choi et al.

Page 1 of 1

It is certified that error appears in the above-identified patent and that said Letters Patent is hereby corrected as shown below:

In the Claims

1. Claim 1, at Column 51, Lines 48-50, please replace "after recognizing a location by at least one of transmitting a specified signal to and receiving the specified signal from the approach-recognized external" with --after recognizing a location by at least one of transmitting a first signal to and receiving a second signal from the approach-recognized external--

2. Claim 6, at Column 52, Line 13, please replace "at least one of transmit and receive the specified signal a" with --at least one of transmit the first signal and receive the second signal a--

Signed and Sealed this  
Second Day of March, 2021

Drew Hirshfeld  
*Performing the Functions and Duties of the*  
*Under Secretary of Commerce for Intellectual Property and*  
*Director of the United States Patent and Trademark Office*